US012387230B2

(12) United States Patent
Waishampayan et al.

(10) Patent No.: US 12,387,230 B2
(45) Date of Patent: Aug. 12, 2025

(54) LOCATION DETERMINATION USING ANONYMOUS BROWSER DATA

(71) Applicant: FullThrottle Technologies, LLC, West Chester, PA (US)

(72) Inventors: Amol Waishampayan, Philadelphia, PA (US); Pat O'Flaherty, Dublin (IE); Alexey Yakovlev, Dnipro (UA); Louis David DiGiacomo, Plymouth Meeting, PA (US)

(73) Assignee: FullThrottle Technologies, LLC, West Chester, PA (US)

( * ) Notice: Subject to any disclaimer, the term of this patent is extended or adjusted under 35 U.S.C. 154(b) by 0 days.

(21) Appl. No.: 19/043,369

(22) Filed: Jan. 31, 2025

(65) Prior Publication Data

US 2025/0182147 A1   Jun. 5, 2025

Related U.S. Application Data

(63) Continuation of application No. 18/210,317, filed on Jun. 15, 2023, now Pat. No. 12,282,933, which is a
(Continued)

(51) Int. Cl.
*G06Q 10/00* (2023.01)
*G06F 16/00* (2019.01)
(Continued)

(52) U.S. Cl.
CPC ....... *G06Q 30/0205* (2013.01); *G06F 16/955* (2019.01); *H04L 63/0421* (2013.01); *H04L 67/52* (2022.05)

(58) Field of Classification Search
CPC .............................. G06Q 10/00; G06Q 50/00
(Continued)

(56) References Cited

U.S. PATENT DOCUMENTS 6,757,740 B1   6/2004  Parekh et al.
8,682,714 B2   3/2014  Smith et al.
(Continued)

FOREIGN PATENT DOCUMENTS

EP    2938045 A1   10/2015

OTHER PUBLICATIONS

30 Years of Browsers: A Quick History, by C. Steele, available at https://www.pcmag.com/news/30-years-of-browsers-a-quickhistory 1/10 (last visited Feb. 20, 2025).
(Continued)

*Primary Examiner* — Mustafa Iqbal
(74) *Attorney, Agent, or Firm* — Flaster Greenberg P.C.

(57) ABSTRACT

Systems, methods, and apparatus are described herein for determining a location from anonymous data. For example, a computing device may receive anonymous data associated with a browser session initialized by a user via a browser on a user computing device. The computing device may determine that the user has not been assigned a unique identifier. The computing device may determine whether the user opted-in to location tracking. If the user opted-out of location tracking, the computing device may determine a latitude coordinate and a longitude coordinate of the user computing device during the browser session. The computing device may identify a physical address for the user based on the latitude coordinate and the longitude coordinate, for example, using a map application programming interface (API). The computing device may assign the unique identifier to the user. The computing device may associate the unique identifier to the physical address.

30 Claims, 16 Drawing Sheets

Related U.S. Application Data continuation of application No. 17/984,418, filed on Nov. 10, 2022, now Pat. No. 11,823,219, which is a continuation of application No. 17/687,992, filed on Mar. 7, 2022, now Pat. No. 11,556,947.

(60) Provisional application No. 63/208,275, filed on Jun. 8, 2021.

(51) Int. Cl.
| | |
|---|---|
| G06F 16/955 | (2019.01) |
| G06Q 30/0204 | (2023.01) |
| H04L 9/40 | (2022.01) |
| H04L 67/00 | (2022.01) |
| H04L 67/52 | (2022.01) |

(58) Field of Classification Search
USPC .......................................................... 705/7.34
See application file for complete search history.

(56) References Cited

U.S. PATENT DOCUMENTS

| | | | |
|---|---|---|---|
| 8,898,074 B2 | 11/2014 | Doughty et al. | |
| 8,935,797 B1 | 1/2015 | Silver et al. | |
| 10,311,465 B2 | 6/2019 | Maginnis | |
| 10,942,223 B1 | 3/2021 | Malloy et al. | |
| 11,276,082 B1* | 3/2022 | Sun | G06Q 30/0264 |
| 2005/0261962 A1 | 11/2005 | Chuah | |
| 2007/0006077 A1 | 1/2007 | Grubbs | |
| 2007/0185978 A1 | 8/2007 | Montulli | |
| 2010/0094727 A1 | 4/2010 | Shapiro | |
| 2010/0212716 A1 | 8/2010 | Lerner et al. | |
| 2010/0323716 A1 | 12/2010 | Jaffri | |
| 2012/0191582 A1 | 7/2012 | Rance et al. | |
| 2012/0240151 A1 | 9/2012 | Tapper | |
| 2013/0151645 A1 | 6/2013 | Siliski et al. | |
| 2014/0143655 A1 | 5/2014 | Alon et al. | |
| 2014/0350830 A1 | 11/2014 | David | |
| 2015/0025980 A1 | 1/2015 | Zaretsky et al. | |
| 2016/0180376 A1 | 6/2016 | Lu et al. | |
| 2017/0064032 A1 | 3/2017 | Ulrich et al. | |
| 2019/0199774 A1 | 6/2019 | Demsey et al. | |
| 2020/0065736 A1 | 2/2020 | Relangi | |
| 2020/0219337 A1* | 7/2020 | Kwak | G07C 5/008 |
| 2020/0233911 A1 | 7/2020 | Siroker et al. | |
| 2020/0336551 A1 | 10/2020 | Knox et al. | |
| 2020/0372556 A1 | 11/2020 | Watts et al. | |
| 2020/0386565 A1 | 12/2020 | Rao et al. | |
| 2021/0398154 A1* | 12/2021 | Mishra | G06Q 10/0637 |
| 2022/0138700 A1 | 5/2022 | Oehler et al. | |
| 2022/0383238 A1* | 12/2022 | Malloy | G06Q 10/083 |

OTHER PUBLICATIONS

Aimee Picchi, Google reneges on plan to remove third-party cookies in Chrome (Jul. 22, 2024), available at https://www.cbsnews.com/news/google-third-party-cookieschrome/ (last visited Feb. 20, 2025).

Announcing Azure Location Based Services public preview, https://azure.microsoft.com/en-us/blog/announcing-azure-locationbased-services-public-preview/, Nov. 28, 2017 (last visited Feb. 20, 2025).

API Keys for Map and Geocoding Vendors, https://www.photools.com/imatch-retired/api-keys-explained/, 2020 (last visited Feb. 20, 2025).

Apple at WWDC 2012: iOS 6, new MacBook Air and Pro models, Mountain Lion, and more, by T. Houston, Jun. 12, 2012. Retrieved from the internet<URL: https://www.theverge.com/2012/6/11/3078109/apple-at-wwdc-2012-announcements-ios-6-mountain-lion-more> (last visited Feb. 20, 2025).

Apple Push Notification Service (Jul. 24, 2024), https://theapplewiki.com/wiki/Apple_Push_Notification_Service (last visited Feb. 20, 2025).

Apple to ad industry: "Tough luck, privacy comes first", by S. Shankland, Sep. 15, 2017. Retrieved from the internet<URL: https://www.cnet.com/tech/services-and-software/apple-rejects-ad-industry-complaint-over-safari-privacy/> (last visited Feb. 20, 2025).

Are cookies crumbling our privacy? We asked an expert to find out (Mar. 29, 2015), available at https://www.digitaltrends.com/computing/history-of-cookies-and-effect-on-privacy/ (last visited Feb. 20, 2025).

AT&T launches AT&T Navigator, PhoneArena Team (Apr. 3, 2008), https://www.phonearena.com/news/AT-T-launches-AT-TNavigator_id2643 (last visited Feb. 20, 2025).

Can I use Google Maps API to reverse geocode a lat/long value in a Service?, https://community.ptc.com/t5/ThingWorxDevelopers/Can-I-use-Google-Maps-API-to-reverse-geocode-alat-long-value-in/td-p/521908, Apr. 3, 2017 (last visited Feb. 20, 2025).

Catalin Cimpanu, Apple blocks third-party cookies in Safari (Mar. 24, 2020), available at https://www.zdnet.com/article/apple-blocks-third-party-cookies-in-safari/ (last visited Feb. 20, 2025).

Clear Channel Outdoor Launches Its First Indoor Digital Billboard Network (Feb. 8, 2007), available at https://investor.clearchannel.com/news/detail/465/clear-channeloutdoor-launches-its-first-indoor-digital-billboard-network (last visited Feb. 20, 2025).

CloudFlare, What is an autonomous system? | What are ASNs?, available at https://www.cloudflare.com/learning/networklayer/what-is-an-autonomous-system/ (last visited Feb. 20, 2025).

Codrut Neagu, What is the MAC address, and how is it used? (Feb. 20, 2019), available at https://www.digitalcitizen.life/simple-questions-what-mac-address-how-change-it-windows/ (last visited Feb. 20, 2025).

Excerpts from This Bug in Your PC is a Smart Cookie (Feb. 12, 1996), Financial Times (London), by T. Jackson, available at https://www.cyberrights.cyberjournal.org/cr-18feb96-tidbits/ (last visited Feb. 20, 2025).

Gary Krakow, Two new cellular phones built for abuse, NBC News (Apr. 14, 2004), http://www.nbcnews.com/id/4324939/ns/technology_and_science-tech_and_gadgets/t/two-new-cellular-phones-builtabuse/ (last visited Feb. 20, 2025).

Geocoding and Routing Improvements Added to Bing Maps, https://www.microsoft.com/en-us/maps/news/geocoding-and-routing-improvements-added-to-bing-maps, Jan. 3, 2018 (last visited Feb. 20, 2025).

Glossary, Universally unique identifier (UUID), available at https://amplitude.com/glossary/terms/universally-uniqueidentifier-uuid (last visited Feb. 20, 2025).

HERE SDK for iOS, Developer's Guide, Version 4.0.0.0, 2019 Retrieved from the internet<URL: https://www.scribd.com/document/712967845/HERE-SDK-for-IOS-HLP-v4-0-0-0-Developers-Guide> (last visited Feb. 20, 2025).

High Browse Apple introduces update to Safari browser which could change the internet Forever, by J. Hamill, Sep. 19, 2017. Retrieved from the internet<URL: https://www.thesun.co.uk/tech/4500986/apple-introduces-update-to-safari-browser-which-could-change-the-internet-forever/> (last visited Feb. 20, 2025).

History of APIs—Google Maps API (Jan. 30, 2011), available at https://apievangelist.com/2011/01/30/history-of-apis-googlemaps-api/ (last visited Nov. 6, 2024).

History of the Web, available at https://webfoundation.org/about/vision/history-of-the-web (last visited Feb. 20, 2025), 5 pages.

History of Web Browsers, GeeksforGeeks, available at https://www.geeksforgeeks.org/history-of-web-browsers/ (last visited Feb. 20, 2025).

Katie Terrell Hanna, applet, available at https://www.techtarget.com/whatis/definition/applet (last visited Feb. 20, 2025).

Kinza Yasar, device ID (device identification), available at https://www.techtarget.com/searchcio/definition/device-ID-device-identification (last visited Feb. 20, 2025).

Kinza Yasar, What is a MAC address and how do I find it? https://www.techtarget.com/searchnetworking/definition/MAC-address (last visited Feb. 20, 2025).

Nautical Flags: Origins, Meanings, and Resources, available at https://https://asa.com/news/2023/06/14/nautical-flags-origins-uses-meanings/ (last visited Feb. 20, 2025).

(56) References Cited

OTHER PUBLICATIONS

Nicole Lee, Verizon launches Chaperone child-monitoring service, CNET (Jun. 12, 2006), https://www.cnet.com/news/verizon-launches-chaperone-child-monitoring-service/ (last visited Feb. 20, 2025).
Now websites can send push notifications—not just apps (Jun. 10, 2013), https://www.niemanlab.org/2013/06/now-websites-can-send-push-notifications-not-just-apps/ (last visited Feb. 20, 2025).
Python code for reverse Geo-coding using Google API, https://stackoverflow.com/questions/54320931/python-code-forreverse-geo-coding-using-google-api, Jan. 23, 2019 (last visited Feb. 20, 2025).
ReasonLabs, What is Hash Value?, available at https://cyberpedia.reasonlabs.com/EN/hash%20value.html (last visited Feb. 20, 2025).
RFC 2109: "HTTP State Management Mechanism", Feb. 1997 ("RFC 2109"), 21 pages. Retrieved from the internet <URL: https://www.rfc-editor.org/rfc/rfc2109> (last visited Feb. 20, 2025).
RFC 2782: A DNS RR for specifying the location of services (DNS SRV), Feb. 2000. Retrieved from the internet<URL: https://www.rfc-editor.org/rfc/rfc2782> (last visited Feb. 20, 2025).
Robert Sheldon, session ID, available at https://www.techtarget.com/searchsoftwarequality/definition/session-ID (last visited Feb. 20, 2025).
Sprint Launches GPS-Based Child-Locator Service (Apr. 13, 2006), https://www.cio.com/article/257110/mobile-sprintlaunches-gps-based-child-locator-service.html (last visited Feb. 20, 2025).
Stephen Lawson, Worker tracking service coming to Nextel phones, IDG News Service (Mar. 4, 2003), https s://www.networkworld.com/article/895404/uc-voip-worker-tracking-service-coming-to-nextel-phones.html (last visited Feb. 20, 2025).
Tanya Kant, A History of the Data-Tracked User (Oct. 8, 2021), available at https://thereader.mitpress.mit.edu/a-history-of-the-data-tracked-user/#_edn2 (last visited Feb. 20, 2025).
The evolution of pixel tracking in digital marketing (Feb. 2, 2023) available at https://www.adlucent.com/resources/blog/the-history-and-evolution-of-pixel-tracking-in-digital-marketing/ (last visited Feb. 20, 2025).
The History of Web Browsers, https://www.mozilla.org/en-US/firefox/browsers/browser-history/ (last visited Feb. 20, 2025).
The world is your JavaScript-enabled Oyster, by B. Taylor et al., Jun. 29, 2005. Retrieved from the internet<URL: https://googleblog.blogspot.com/2005/06/world-is-your-javascript-enabled_29.html> (last visited Feb. 20, 2025).
Web Tracking: Mechanisms, Implications, and Defenses by Bujlow et al., Jul. 28, 2015 ("Bujlow"), 29 pages. Retrieved from the internet <URL: https://arxiv.org/abs/1507.07872> (last visited Feb. 20, 2025).
What are Browser Cookies? The History of Cookies in Digital Advertising, by M. Bober, available at https://zeropark.com/blog/what-are-browser-cookies-in-digital-advertising/ (last visited Feb. 20, 2025).
What are cookies? What are the differences between them (session vs. persistent)? (Jul. 17, 2018), available at https://www.cisco.com/c/en/us/support/docs/security/web-security-appliance/117925-technote-csc-00.html (last visited Feb. 20, 2025).
What Are Push Notifications? (Sep. 13, 2021), https://www.howtogeek.com/751954/what-are-push-notifications/#:~:text=Basically%2C%20any%20time%20you%20get,app%2C%20it's%20a%20push%20notification. (last visited Feb. 20, 2025).
What is an Instance, Lenovo US, available at https://www.lenovo.com/us/en/glossary/what-is-instance/ (last visited Feb. 20, 2025).
What is Targeted Advertising, and How Does It Work?, RGB House Editorial Team (May 13, 2024), available at https://blog.rtbhouse.com/what-is-targeted-advertising-and-how-does-it-work/ (last visited Feb. 20, 2025).
Learn how the Safari web browser protects your privacy, Safari Privacy Overview, (available at https://www.apple.com/safari/docs/Safari_White_Paper_Nov_2019.pdf), Nov. 2019, 12 pages.
Defendant's Brief in Support of Motion to Dismiss filed by Rocket Media, LLC, *Fullthrottle Technologies, LLC* v. *Rocket Media, LLC*, Northern District of North Carolina, Sep. 6, 2024, 36 pages.
*Fullthrottle Technologies, LLC* v. *Rocket Media, LLC*, US District Court, Northern District of North Carolina, First Amended Complaint filed by Fullthrottle Technologies, LLC, Aug. 7, 2024, 117 Pages.
Motion to Dismiss filed by Rocket Media, LLC, *Fullthrottle Technologies, LLC* v. *Rocket Media, LLC*, US District Court, Northern District of North Carolina, Sep. 6, 2024, 2 pages.
Reply to Response in Opposition to Motion to Dismiss filed by Rocket Media, LLC, *Fullthrottle Technologies, LLC* v. *Rocket Media, LLC*, US District Court, Northern District of North Carolina, Oct. 18, 2024, 20 Pages.
Response In Opposition to Motion to Dismiss filed by Fullthrottle Technologies, LLC, *Fullthrottle Technologies, LLC* v. *Rocket Media, LLC*, US District Court, Northern District of North Carolina, Sep. 27, 2024, 43 Pages.
Petition for IPR filed by Rocket Media, LLC, *Rocket Media* v. *Fullthrottle Technologies, LLC*, US Patent and Trademark Office, Patent Trial and Appeal Board, Nov. 12, 2024, 86 pages.
Patent Owner's Preliminary Response filed by Fullthrottle Technologies, LLC, *Rocket Media* v. *Fullthrottle Technologies, LLC*, US Patent and Trademark Office, Patent Trial and Appeal Board, Mar. 12, 2025, 44 Pages.
Patent Owner's Preliminary Response filed by Fullthrottle Technologies, LLC, *Rocket Media* v. *Fullthrottle Technologies, LLC*, US Patent and Trademark Office, Patent Trial and Appeal Board, Mar. 12, 2025, 45 pages.
Petition for IPR filed by Rocket Media, LLC, *Rocket Media* v. *Fullthrottle Technologies, LLC*, US Patent and Trademark Office, Patent Trial and Appeal Board, Nov. 12, 2024, 82 pages.

\* cited by examiner

LOCATION DETERMINATION USING ANONYMOUS BROWSER DATA

CROSS-REFERENCE TO RELATED APPLICATIONS

This application is a continuation of U.S. Non-Provisional application Ser. No. 18/210,317, filed Jun. 15, 2023, which is a continuation of U.S. Non-Provisional application Ser. No. 17/984,418, filed Nov. 10, 2022, now issued as U.S. Pat. No. 11,823,219 on Nov. 21, 2023, which is a continuation of U.S. Non-Provisional application Ser. No. 17/687,992, filed Mar. 7, 2022, now issued as U.S. Pat. No. 11,556,947 on Jan. 17, 2023, which claims priority to U.S. Provisional Patent Application No. 63/208,275, filed Jun. 8, 2021, the disclosures of which are hereby incorporated by reference herein in their respective entireties.

BACKGROUND

Various businesses market products using websites. Each product may have a dedicated webpage that is accessible from the business's website. Consumers access the specific webpages for more information regarding the specific products offered by the business entity. In an example, the business may be a car dealership (e.g., a car dealer). The car dealer may operate specific webpages for specific vehicles. Potential customers access the specific webpages for more information regarding the specific vehicles. The car dealer may be interested in understanding how many times a potential customer visits specific vehicle webpages via the dealer website. The car dealer may also be interested in learning more information about the potential customer.

Car dealers also usually offer vehicle services, for example, such as maintenance services, corrective services, and collision services. Car owners or operators can choose to have their car serviced by the car dealer with whom they purchased their car, another local car dealer, a service shop, and/or the like. The car owners or operators may access a car dealer's service website for more information regarding the services available.

SUMMARY

Systems, methods, and apparatus are described herein for determining a location from anonymous data. For example, a computing device may receive anonymous data associated with a browser session initialized by a user via a browser on a user computing device. The computing device may determine that the user has not been assigned a unique identifier. The computing device may determine whether the user opted-in to location tracking. If the user opted-out of location tracking, the computing device may determine a latitude coordinate and a longitude coordinate of the user computing device during the browser session. The computing device may identify a physical address for the user based on the latitude coordinate and the longitude coordinate, for example, using a map application programming interface (API). The computing device may assign the unique identifier to the user. The computing device may associate the unique identifier to the physical address. The computing device may determine one or more of an address type, a name of the user, an age of the user, a gender of the user, demographics associated with the user, and/or psychographics associated with the user. The computing device may determine a confidence rating for the user based on a frequency of visits to a specific URL, the physical address, demographics associated with the user, and/or psychographics associated with the user. The confidence rating may be an indication of the user's interest in a product. The confidence rating may be determined using an algorithm (e.g., a learning algorithm).

Systems, methods, and apparatus are described herein for determining a vehicle health score. A computing device may receive information associated with a vehicle. The computing device may determine a vehicle age and/or a vehicle mileage based on the received vehicle information. The computing device may determine whether the vehicle age is greater than a threshold age. The computing device may determine whether the vehicle mileage is greater than a threshold mileage. The computing device may identify prior service information for the vehicle. The computing device may determine a health score for the vehicle based on the vehicle age, the vehicle mileage, and the prior service information for the vehicle. The prior service information may include a last service date and/or a number of miles driven since the last service date. The health score may be determined using an algorithm (e.g., a learning algorithm). The computing device may be configured to send a notification to an operator of the vehicle based on the determined health score. The notification may include a service reminder or a service coupon when the determined health score is less than or equal to a predefined health threshold. The notification may include a marketing offer when the determined health score is greater than a predefined health threshold.

Systems, methods, and apparatus are described herein for determining a probability that a browsing session was initiated in response to watching and/or listening to media associated with a campaign. A computing device may receive data associated with a campaign. The data associated with the campaign may indicate a first set of impression proportions on a plurality of dates and a second set of impression proportions during a plurality of dayparts. The plurality of dates may include the dates within a time period of the campaign. The computing device may identify a browsing session that visited a specific URL. The browsing session may be associated with an address that is within a zone covered by the campaign. The computing device may determine a date and a time of day that the browsing session visited the specific URL. The computing device may determine that the date is within a time period associated with the campaign. The computing device may identify a first impression proportion of the first set of impression proportions that is associated with the determined date. The first set of impression proportions may include respective impression proportions of campaign impressions for each of the plurality of dates. A campaign impression may include an instance of media associated with the campaign being watched and/or listened to. The computing device may identify a second impression proportion of the second set of impression proportions that is associated with the time of day. The second set of impression proportions comprises respective impression proportions of campaign impressions for each of the plurality of dayparts. Each of the plurality of dayparts may include a portion of a day. The computing device may determine a probability that the browsing session was initiated in response to a user watching or listening to media associated with the campaign. The computing device may determine whether the user performed a transaction associated with the campaign. The computing device may determine whether the browsing session was initiated by a direct search or an organic search.

DETAILED DESCRIPTION

Figure 1:
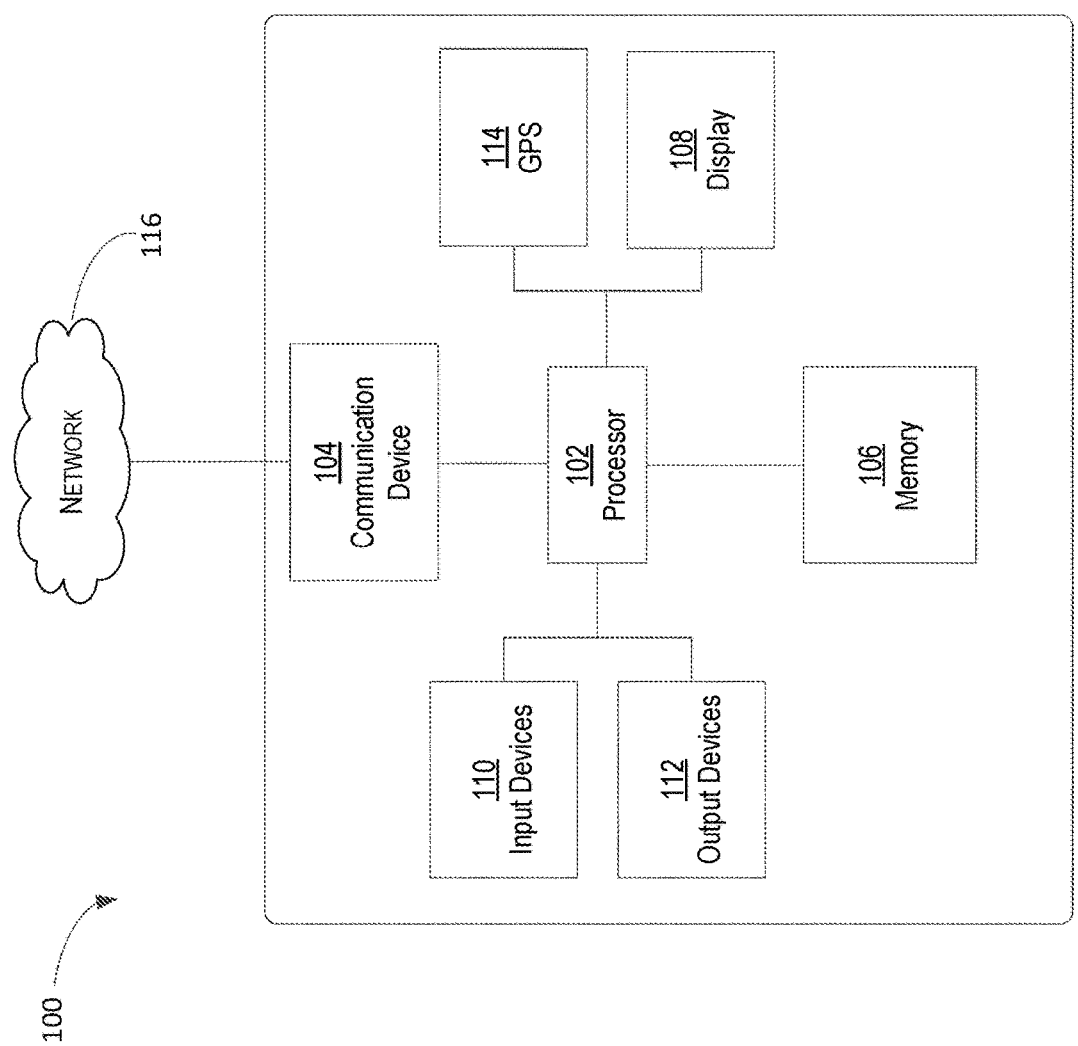
FIG. 1 illustrates a block diagram of an example computing device.

FIG. 1 illustrates a block diagram of an example computing device 100. The computing device 100 may include a personal computer, such as a laptop or desktop computer, a tablet device, a cellular phone or smartphone, a server, or another type of computing device. The computing device 100 may include a processor 102, a communication interface 104, a memory 106, a display 108, input devices 110, output devices 112, and/or a GPS circuit 114. The computing device 100 may include additional, different, or fewer components.

The processor 102 may include one or more general purpose processors, special purpose processors, conventional processors, digital signal processors (DSPs), microprocessors, integrated circuits, a programmable logic device (PLD), application specific integrated circuits (ASICs), or the like. The processor 102 may perform signal coding, data processing, image processing, power control, input/output processing, and/or any other functionality that enables the computing device 100 to perform as described herein.

The processor 102 may store information in and/or retrieve information from the memory 106. The memory 106 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory may be local memory or remote memory external to the computing device 100. The memory 106 may store instructions which are executable by the processor 102. Different information may be stored in different locations in the memory 106.

The memory 106 may comprise a computer-readable storage media or machine-readable storage media that stores computer-executable instructions for performing as described herein. The computer-executable instructions may comprise one or more portions of the procedures 300, 400, 500, 600, 800, 900, 1000, 1100, 1200, 1300, 1400, 1500, and/or 1600 for performing as described herein. The processor 102 may access the instructions from memory 106 for being executed to cause the processor 102 to operate as described herein, or to operate one or more devices as described herein.

The processor 102 that may communicate with other devices via the communication device 104. The communication device 104 may transmit and/or receive information over the network 116, which may include one or more other computing devices. The communication device 104 may perform wireless and/or wired communications. The communication device 104 may include a receiver, transmitter, transceiver, or other device capable of performing wireless communications via an antenna. The communication device 104 may be capable of communicating via one or more protocols, such as a cellular communication protocol, a Wi-Fi communication protocol, Bluetooth®, a near field communication (NFC) protocol, an internet protocol, another proprietary protocol, or any other radio frequency (RF) or communications protocol. The computing device 100 may include one or more communication devices 104.

The processor 102 may be in communication with a display 108 for providing information to a user. The information may be provided via a user interface on the display 108. The information may be provided as an image generated on the display 108. The display 108 and the processor 102 may be in two-way communication, as the display 108 may include a touch-screen device capable of receiving information from a user and providing such information to the processor 102.

The processor 102 may be in communication with a GPS circuit 114 for receiving geospatial information. The processor 102 may be capable of determining the GPS coordinates of the wireless communication device 100 based on the geospatial information received from the GPS circuit 114. The geospatial information may be communicated to one or more other communication devices to identify the location of the computing device 100.

The processor 102 may be in communication with input devices 110 and/or output devices 112. The input devices 110 may include a camera, a microphone, a keyboard or other buttons or keys, and/or other types of input devices for sending information to the processor 102. The display 108 may be a type of input device, as the display 108 may include touch-screen sensor capable of sending information to the processor 102. The output devices 112 may include speakers, indicator lights, or other output devices capable of receiving signals from the processor 102 and providing output from the computing device 100. The display 108 may be a type of output device, as the display 108 may provide images or other visual display of information received from the processor 102.

Figure 2:
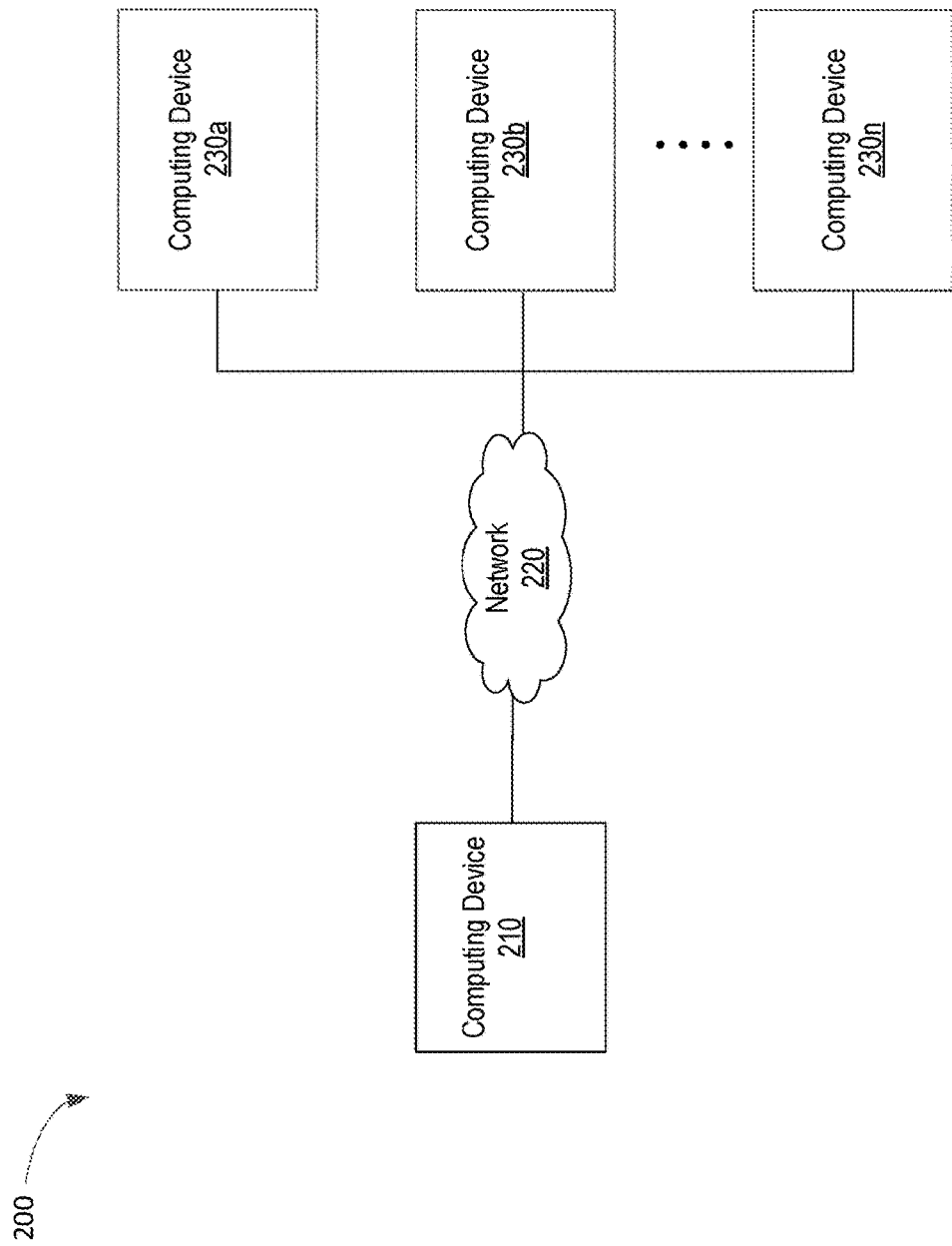
FIG. 2 illustrates a block diagram of an example computing network system.

FIG. 2 illustrates a block diagram of an example computing network system 200. The computing network system 200 may include one or more computing devices 230a-230n that may be capable of communicating digital messages with one another, either directly or via the network 220. The computing devices 230-230n may be user devices capable of logging into a session (e.g., a browsing session) of an interactive computing environment and providing real-time interactive data via the network 220. The network 220 may include a wired and/or wireless network. For example, the network 220 may include a Wi-Fi communication network, a Wi-MAX communication network, a cellular communication network (e.g., CDMA, HSPA+, LTE, etc.), and/or a television white space (TVWS) communication network. The network 220 may include one or more communication networks.

The one or more computing devices 230a-230n may be capable of communicating digital messages to and/or receiving digital messages from the computing device 210 via the network 220. The computing device 210 may be a server, such as a web server, for providing a user interface to the computing devices 230a-230n. The computing device 210 may be in communication with an application executing locally on the computing devices 230a-230n for providing a user interface at the computing devices. The display of information may be generated locally at the computing devices 230a-230n or at the computing device 210 and provided via an application (e.g., a web browser) at the computing devices 230a-230n.

One or more of the computing devices 230a-230n may be operated by an administrative user capable of configuring sessions of an interactive computing environment that may be stored at the computing device 210. The computing device operated by the administrative user may submit credentials to the computing device 210 to allow the session to be configured. The session may be accessed by the computing devices 230a-230n via the network 220.

Figure 3:
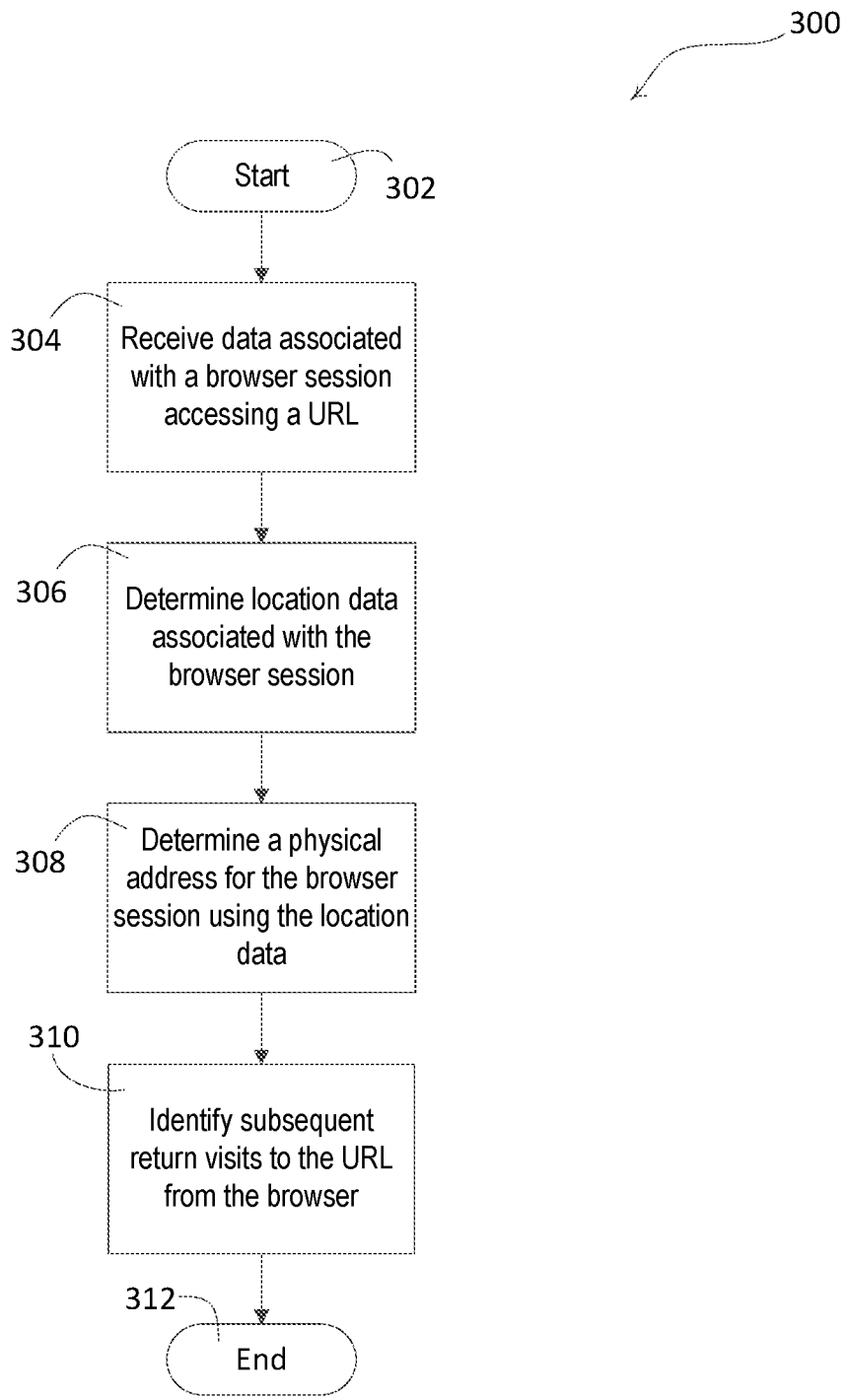
FIG. 3 is a flow diagram illustrating an example method that may be implemented to identify a physical address of a user based on anonymous data.

FIG. 3 is a flow diagram of an example method 300 that may be implemented by one or more computing devices (e.g., such as the computing devices 230a-230n shown in FIG. 2) to identify a physical address of a user based on anonymous data. The method 300, or portions thereof, may be performed to enable engagement with the user based on one or more return visits to a uniform resource locator (URL). Engagement with the user may include sending notification(s) to the user, determining one or more advertisements for the user, track service needs for a vehicle operated by the user or someone in the user's household, and/or the like. For example, the user may be an owner/operator of the vehicle. The notification(s) may include emails, text messages, mobile phone notifications, phone calls, advertisements, and/or the like. The method 300, or portions thereof, may be performed at a single computing device or may be distributed across multiple computing devices (e.g., multiple servers and/or a user device). The method 300, or portions thereof, may be performed to enable users, such as administrative users, to determine that the user has a specific interest in one or more products. The method 300, or portions thereof, may be performed to enable the administrative users to quantify the user's interest in the product(s). The method 300, or portions thereof, may be performed to enable adaptive generation of notifications to the user based on the specific interest in the product and/or the physical address associated with the user. The method 300 may comprise instructions that may be stored in memory as computer-readable or machine-readable storage media that may be executed by the one or more computing devices for executing the method 300. The method 300, or portions thereof, may reduce the amount of processing resources used by the computing device during a predetermined period (e.g., day). The method 300, or portions thereof, may improve the functionality of a computer network system (e.g., such as the computing network system 200 shown in FIG. 2) associated with engagement of the user. In addition, the method 300, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s).

The method 300 may start, at 302, when a user computing device (e.g., such as computing device 210 shown in FIG. 2) accesses a URL. For example, a user may initialize a browser application on the user computing device and may navigate to a website (e.g., the URL) within the browser application using a browser session. The user may visit various URLs associated with a brand (e.g., manufacturer, company, etc.). Each of the URLs may correspond to a product sold by the brand.

As illustrated in FIG. 3, a computing device (e.g., such as computing device 230a, 230b, or 230n shown in FIG. 2) may receive, at 304, data from the browser session on the user computing device. The computing device may be associated with the URL. For example, the computing device may be a server that administers and/or manages a resource associated with the URL. The computing device may initialize a script (e.g., javascript, PHP, Python, Ruby, Groovy, Perl, and/or the like) when the data is received via the browser session. The computing device may retrieve the data using the script. The data may be associated with the user, the user computing device, and/or the browser application associated with the browser session. The data may be anonymous data (e.g., data that includes no personally identifiable information associated with the user). The anonymous data may include a time, a date, one or more website URLs, a referring URL, a browser type, a language, an IP address, and/or location data. The computing device may determine a device type based on the browser type. For example, the computing device may determine whether the user computing device is a mobile device based on the browser type. The location data may include a latitude coordinate, a longitude coordinate, and/or a device accuracy indication. The device accuracy indication may indicate the accuracy associated with the user computing device's measurements of the latitude coordinate and the longitude coordinate. For example, the device accuracy indication may indicate the accuracy of the user computing device's GPS (e.g., such as the GPS 114 shown in FIG. 1). The device accuracy may depend on the device type. For example, a mobile device may indicate a device accuracy of approximately 2 meters or less and a computer that accesses the URL via a router may indicate a device accuracy of approximately 70 meters. The anonymous data may be included in a header (e.g., a HTTP request header) received from the user computing device, included in the IP address of the user computing device, included in scripts at the application-level, etc.

The computing device may determine, at 306, location data associated with the browser session. For example, the data received from the browser session may include the location data, as described herein. Additionally or alternatively, the computing device may determine the location data using a tracking cookie installed in the browser application on the user computing device. Using IP address and/or router location information may not provide accurate enough location data to identify a precise physical address for the user/user computing device. For example, an accuracy of approximately 70 meters could include a plurality of physical addresses within that radius. Using latitude and longitude location data of a mobile device may provide more accurate location data to enable identification of the precise physical address for the user/user computing device.

At 308, the computing device may determine a physical address (e.g., a postal address) for the browser session using the location data. The physical address may indicate a postal address at which the user accessed the URL in the browser session. For example, the computing device may generate, at 308, the physical address using a map API (e.g., such as Bing Maps API, Mapbox API, OpenStreetMap API, Leaflet API, OpenLayers API, Google Maps API, and/or another map API). For example, the computing device may translate, at 308, the received latitude and longitude coordinates into the physical address using the map API. The computing device may determine an address type (e.g., residential, apartment/condo building, single family home, commercial, and/or the like) based on the physical address. For example, the computing device may determine the address type using a postal service API. The computing device may use the address type to determine a type and/or frequency of notifications sent to the user. The user may access the URL at multiple locations/addresses (e.g., home, work, store, restaurant, friend's home, etc.). The user computing device may identify which location/address is a primary address (e.g., home) and which location(s)/address(es) are secondary addresses, for example, based on the frequency of accessing the URL at each location/address. The user computing device may associate the secondary address(es) to the primary address.

The computing device may determine other user information based on the physical address such as a name associated with the user, an age of the user, a gender of the user, demographics associated with the user, and/or psychographics associated with the user. The demographics associated with the user may include race, marital status, household size, occupation, income, education, and/or living status. The psychographics associated with the user may include personality traits, lifestyles, interests, opinions, beliefs, values, etc. The computing device may determine the type and/or the frequency of notifications sent to the user based on the other information. The computing device may determine the content of the notifications based on the other information.

The computing device may generate a profile for the user, for example, based on the physical address and/or the other user information. The user profile may be used to track a plurality of factors associated with the user and the user's activity. For example, the user profile may track which URLs the user accesses, the frequency with which the user accesses the URL(s), demographics associated with the user, the address(es) associated with the user, the devices associated with the user etc. For example, the computing device may associate multiple unique identifiers having the same location data with the same user profile. The user profile may be used to generate a targeted marketing campaign.

At 310, the computing device may be configured to identify subsequent return visits to the URL (e.g., and related URLs) from the browser, the user computing device, and/or the physical address. For example, the computing device may store a unique ID in the browser application (e.g., using a cookie or using the local browser cache) to recognize that another browser session accessing the URL is from the user computing device at the same physical address. When another user computing device at the same physical address accesses the URL, the computing device may determine that that other user computing device is the same user and/or user household. The computing device may identify, at 310, that the user computing device is accessing the URL at a secondary address (e.g., associated with the user and/or user profile). The computing device may store a timestamp and the URL of each subsequent return visit from the browser, the user computing device, and/or the physical address. That is, the computing device may create a log of URLs accessed by a user profile associated with the browser, the user computing device, and/or the physical address. The log may track the timestamp and URL of each website accessed via the browser. The method 300 may end, at 312.

Figure 4:
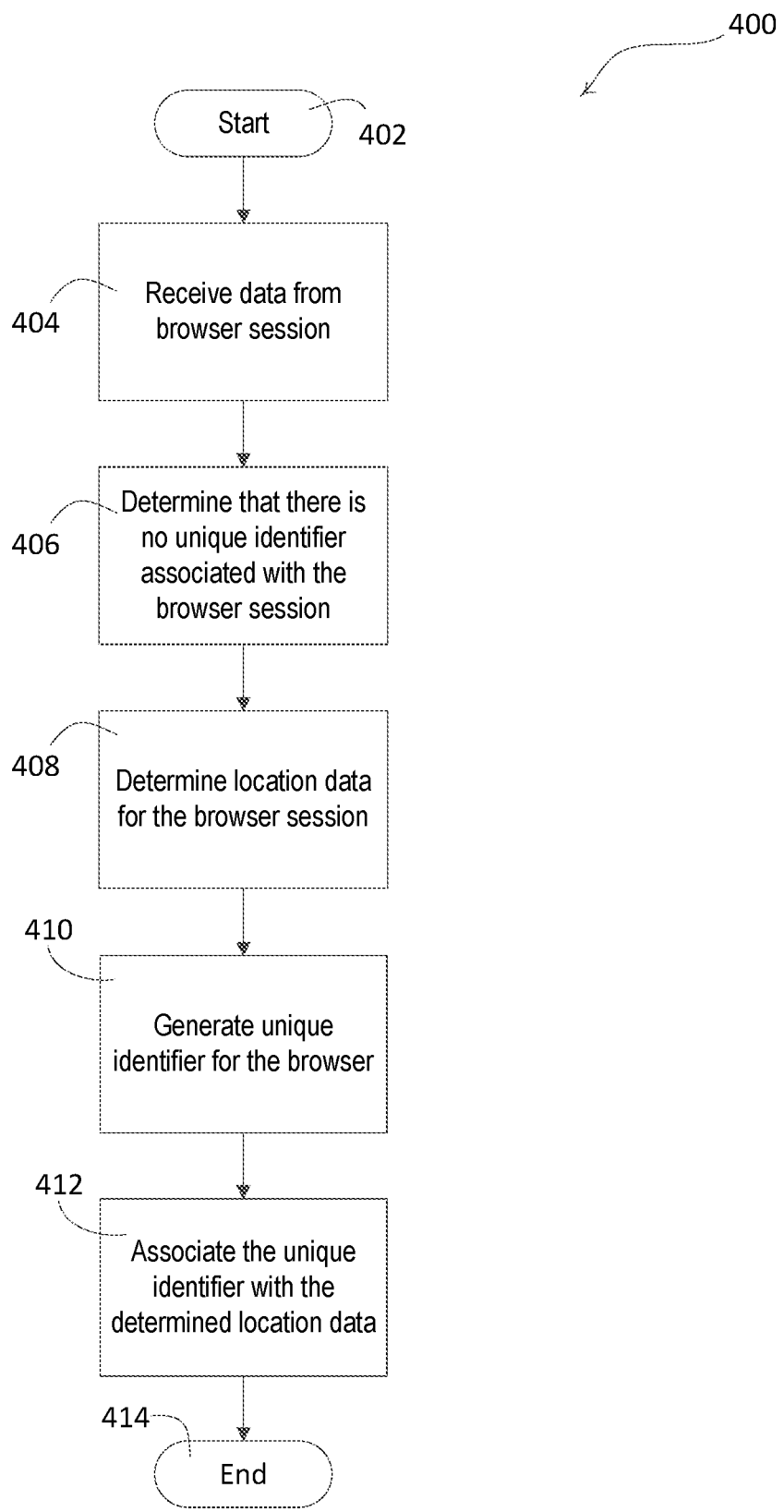
FIG. 4 is a flow diagram illustrating an example method for associating a unique identifier with location data from a browser session.

FIG. 4 is a flow diagram of an example method 400 that may be implemented by one or more computing devices (e.g., such as the computing devices 230a-230n shown in FIG. 2) to associate a unique identifier with location data from a browser session. The method 400, or portions thereof, may be performed to enable engagement with the user based on one or more visits to a URL. Engagement with the user may include sending notification(s) to the user, determining one or more advertisements for the user, track service needs for a vehicle owned and/or operated by the user or someone in the user's household, and/or the like. The notification(s) may include emails, text messages, mobile phone notifications, phone calls, advertisements, and/or the like. The method 400, or portions thereof, may be performed at a single computing device or may be distributed across multiple computing devices (e.g., multiple servers and/or a user device). The method 400, or portions thereof, may be performed to enable users, such as administrative users, to determine that the user has a specific interest in one or more products. The method 400, or portions thereof, may be performed to enable the administrative users to quantify the user's interest in the product(s). The method 400, or portions thereof, may be performed to enable adaptive generation of notifications to the user based on the specific interest in the product and/or the physical address associated with the user. The method 400 may comprise instructions that may be stored in memory as computer-readable or machine-readable storage media that may be executed by the one or more computing devices for executing the method 400. The method 400, or portions thereof, may reduce the amount of processing resources used by the computing device during a predetermined period (e.g., day). The method 400, or portions thereof, may improve the functionality of a computer network system (e.g., such as the computing network system 200 shown in FIG. 2) associated with engagement of the user. In addition, the method 400, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s).

The method 400 may start, at 402, when a user computing device (e.g., such as computing device 210 shown in FIG. 2) accesses a URL. For example, a user may initialize a browser application on the user computing device and may navigate to the URL within the browser application using a browser session.

As illustrated in FIG. 4, a computing device (e.g., such as computing device 230a, 230b, or 230n shown in FIG. 2) may receive, at 404, data from the browser session on the user computing device. The computing device may be associated with the URL. For example, the computing device may be a server that administers and/or manages a resource associated with the URL. The computing device may initialize a script (e.g., javascript, PHP, Python, Ruby, Groovy, Perl, and/or the like) when the data is received via the browser session. The computing device may retrieve the data using the script. The data may be associated with the user, the user computing device, and/or the browser application associated with the browser session. The data may be anonymous data (e.g., data that includes no personally identifiable information associated with the user). The anonymous data may include a time, a date, a webpage URL, a referring URL, a browser type, a language, an IP address, and/or location data. The computing device may determine a device type based on the browser type. For example, the computing device may determine whether the user computing device is a mobile device based on the browser type. The location data may include a latitude coordinate, a longitude coordinate, and/or a device accuracy indication. The device accuracy indication may indicate the accuracy associated with the user computing device's measurements of the latitude coordinate and the longitude coordinate. For example, the device accuracy indication may indicate the accuracy of the user computing device's GPS (e.g., such as the GPS 114 shown in FIG. 1). The device accuracy may depend on the device type. For example, a mobile device may indicate a device accuracy of approximately 2 meters or less and a computer that accesses the URL via a router may indicate a device accuracy of approximately 70 meters. The anonymous data may be included in a header (e.g., a HTTP request header) received from the user computing device, included in the IP address of the user computing device, included in scripts at the application-level, etc.

The computing device may determine, at 406, whether there is a unique identifier that is associated with the user (e.g., the user computing device, the browser, and/or the browser session) stored on the computing device. For example, the script may inform the computing device that there is no unique identifier for the user computing device. The computing device may determine that there is no unique identifier associated with the user computing device when there is no location data stored for the user computing device. For example, the computing device may access a database or other storage location that maintains a mapping of unique identifiers to a browser session, a user computing device, and/or location data. Additionally or alternatively, the computing device may determine whether there is a unique identifier for associated with the user based on presence of a location tracker (e.g., cookie) installed in the browser application on the user computing device. The tracker may include the unique identifier associated with the user. The tracker may have been installed in the user's browser application (e.g., by the computing device) during a previous visit to the URL via the user's browser application, for example, if the user opted-in to location tracking, as described herein.

At 408, the computing device may determine location data associated with the browser session. For example, the data received from the browser session may include the location data, as described herein. Additionally or alternatively, the computing device may determine the location data using the tracker installed in the browser application on the user computing device. The computing device may determine a physical address (e.g., a postal address) for the browser session using the location data. The physical address may indicate a postal address at which the user accessed the URL in the browser session. For example, the computing device may generate, at 408, the physical address using a map API (e.g., such as Bing Maps API, Mapbox API, OpenStreetMap API, Leaflet API, OpenLayers API, Google Maps API, and/or another map API). For example, the computing device may translate, at 408, the received latitude and longitude coordinates into the physical address using the map API.

The computing device may determine an address type (e.g., residential, apartment/condo building, single family home, commercial, and/or the like) based on the physical address. For example, the computing device may determine the address type using a postal service API. The computing device may use the address type to determine a type and/or frequency of notifications sent to the user. The computing device may determine other user information based on the physical address such as a name associated with the user, an age of the user, a gender of the user, demographics associated with the user, and/or psychographics associated with the user. The demographics associated with the user may include race, marital status, household size, occupation, income, education, and/or living status. The psychographics associated with the user may include personality traits, lifestyles, interests, opinions, beliefs, values, etc. The computing device may determine the type and/or the frequency of notifications sent to the user based on the other information. The computing device may determine the content of the notifications based on the other information.

At 410, the computing device may be configured to generate a unique identifier for the browser. The unique identifier may be generated randomly. The unique identifier may be universally unique. That is, the unique identifier may be unique for all browsers, all device types, all locations, etc. Alternatively, the unique identifier may be parsed from the data received in the browser session. Stated differently, the computing device may determine the unique identifier for the browser based on the data received, at 404, via the browser session. The computing device may send the unique identifier to the user computing device (e.g., for storage in local browser cache or a cookie).

At 412, the computing device may associate the generated unique identifier with the determined location data. For example, the computing device may map, at 412, the unique identifier to the location data (e.g., physical address). The mapping between the unique identifier and the location data may enable identification of future visits to the URL by the user. The method 400 may end, at 414.

Figure 5:
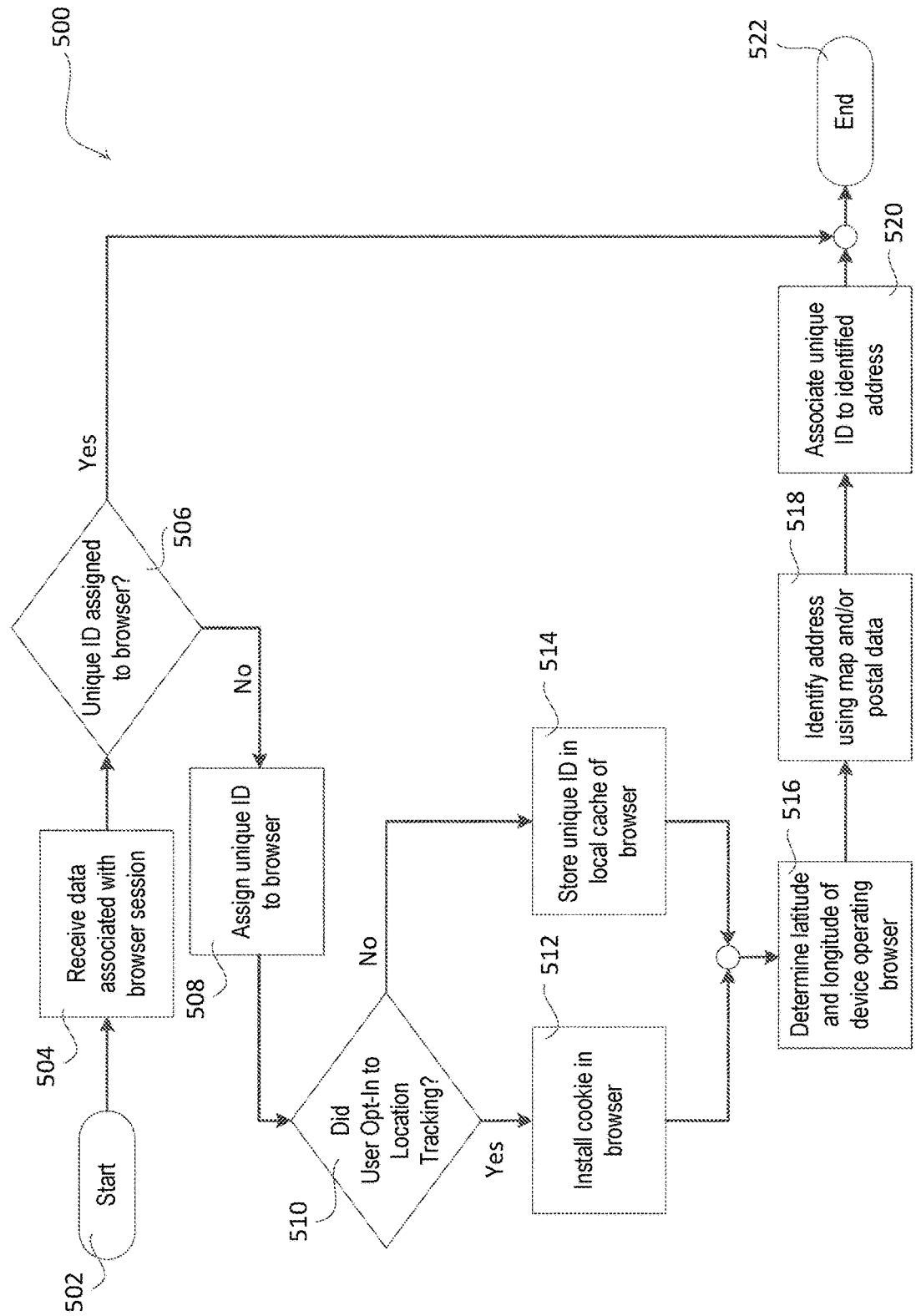
FIG. 5 is a flow diagram illustrating an example method for associating a unique identifier with a physical address of a user.

FIG. 5 is a flow diagram of an example method 500 that may be implemented by one or more computing devices (e.g., such as the computing devices 230a-230n shown in FIG. 2) to associate a unique identifier with a physical address associated with a user. The method 500, or portions thereof, may be performed to enable engagement with the user based on one or more visits to a URL. Engagement with the user may include sending notification(s) to the user, determining one or more advertisements for the user, track service needs for a vehicle operated by the user or someone in the user's household, and/or the like. The notification(s) may include emails, text messages, mobile phone notifications, phone calls, advertisements, and/or the like. The method 500, or portions thereof, may be performed at a single computing device or may be distributed across multiple computing devices (e.g., multiple servers and/or a user device). The method 500, or portions thereof, may be performed to enable users, such as administrative users, to determine that the user has a specific interest in one or more products. The method 500, or portions thereof, may be performed to enable the administrative users to quantify the user's interest in the product(s). The method 500, or portions thereof, may be performed to enable adaptive generation of notifications to the user based on the specific interest in the product(s) and/or the physical address associated with the user. The method 500, or portions thereof, may reduce the amount of processing resources used by the computing device during a predetermined period (e.g., day). The method 500 may comprise instructions that may be stored in memory as computer-readable or machine-readable storage media that may be executed by the one or more computing devices for executing the method 500. The method 500, or portions thereof, may improve the functionality of a computer network system (e.g., such as the computing network system 200 shown in FIG. 2) associated with engagement of the user. In addition, the method 500, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s). The method 500, or portions thereof, may enable tracking of a user without the use of tracking cookies. The method 500, or portions thereof, may be combined with the method 300 and/or the method 400.

The method 500 may start, at 502, when a user computing device (e.g., such as computing device 210 shown in FIG. 2) accesses a URL. For example, a user may initialize a browser application on the user computing device and may navigate to the URL within the browser application using a browser session.

As illustrated in FIG. 5, a computing device (e.g., such as computing device 230a, 230b, or 230n shown in FIG. 2) may receive, at 504, data from the browser session on the user computing device. The computing device may be associated with the URL. For example, the computing device may be a server that administers and/or manages a resource associated with the URL. The data may be associated with the user, the user computing device, and/or the browser application associated with the browser session. The data may be anonymous data (e.g., data that includes no personally identifiable information associated with the user). The anonymous data may include a time, a date, a webpage URL, a referring URL, a browser type, a language, an IP address, and/or location data. The computing device may determine a device type based on the browser type. For example, the computing device may determine whether the user computing device is a mobile device based on the browser type. The location data may include a latitude coordinate, a longitude coordinate, and/or a device accuracy indication. The device accuracy indication may indicate the accuracy associated with the user computing device's measurements of the latitude coordinate and the longitude coordinate. For example, the device accuracy indication may indicate the accuracy of the user computing device's GPS (e.g., such as the GPS 114 shown in FIG. 1). The device accuracy may depend on the device type. For example, a mobile device may indicate a device accuracy of approximately 2 meters or less and a computer that accesses the URL via a router may indicate a device accuracy of approximately 70 meters. The anonymous data may be included in a header (e.g., a HTTP request header) received from the user computing device, included in the IP address of the user computing device, included in scripts at the application-level, etc.

The computing device may determine, at 506, whether there is a unique identifier that is associated with the user (e.g., the user computing device, the browser, and/or the browser session) stored on the computing device. The computing device may determine that there is no unique identifier associated with the user computing device when there is no location data stored for the user computing device. For example, the computing device may access a database or other storage location that maintains a mapping of unique identifier to a browser session, a user computing device, and/or location data. Additionally or alternatively, the computing device may determine whether there is a unique identifier for associated with the user based on presence of a tracker (e.g., cookie) installed in the browser application on the user computing device. The tracker may include the unique identifier associated with the user. The tracker may have been installed in the user's browser application (e.g., by the computing device) during a previous visit to the URL via the user's browser application, for example, if the user opted-in to location tracking, as described herein.

When the computing device determines that there is no unique identifier assigned to the user, the computing device may be configured to generate, at 508, a unique identifier for the user. The unique identifier may be generated randomly. The unique identifier may be universally unique. That is, the unique identifier may be unique for all browsers, all device types, all locations, etc. Alternatively, the unique identifier may be parsed from the data received in the browser session. Stated differently, the computing device may determine the unique identifier for the user based on the data received, at 504, via the browser session.

The computing device may determine, at 510, whether the user opted-in to location tracking. For example, the user may be asked to opt-in to location tracking when accessing the URL. The user may respond to a prompt by opting in or opting out to location tracking.

When the user opts-in to location tracking, the computing device may install, at 510 a tracker (e.g., a cookie) in the browser application on the user computing device. The cookie may be configured to enable the computing device to retrieve geo-location data from the user computing device. The cookie may enable the computing device to recognize return visits by the user computing device. The cookie (e.g., a tracking cookie, browser cookie, HTTP cookie, etc.) may include a small string or segment of text that may be transmitted to the user computing device and stored at the user computing device by a browser application. For example, the cookie may include one or more name-value pairs containing bits of information such as, user preferences, an identifier (e.g., the unique ID assigned at 508) for a server-based user session, and/or other data used by the computing device (e.g., a server and/or website). The cookie may be used for authenticating, session tracking (e.g., state maintenance), and/or for tracking specific information about a user, such as site preferences, and/or to maintain data related to the user and/or user computing device during navigation. The cookie may be sent in an HTTP header by the computing device to the browser application at the user computing device. The cookie may be sent back to the computing unchanged by the browser application, for example, each time the browser application accesses the URL, introducing state into what may be otherwise stateless HTTP transactions. The computing device may set the cookie at the user computing device in response to a request for a target website (e.g., the URL), the computing device may generate and transmit an HTTP response that includes an HTTP header that includes the parameters for the cookie (e.g., in the form of text) and/or code (e.g., Set-Cookie) requesting the browser application to set the cookie based on the parameters in the HTTP header.

When the user opts-out to location tracking, the computing device may store, at 514, a unique ID (e.g., the unique ID assigned at 508) in a local cache of the user computing device (e.g., of the browser). The unique ID may be stored in the local browser cache, for example, even if the user computing device does not allow cookies (e.g., full cookies). Storing the unique ID in the local browser cache may enable the computing device to recognize return visits by the user computing device via the browser application. The unique ID may be used for authenticating, session tracking (e.g., state maintenance), and/or for tracking specific information about a user, such as site preferences, and/or to maintain data related to the user and/or user computing device during navigation. The unique ID may be sent in an HTTP header by the computing device to the browser application at the user computing device. The computing device may store the unique ID in the local browse cache at the user computing device in response to a request for a target website (e.g., the URL). The user computing device may store the unique ID as key/value (e.g., string to string) in the local browser cache. The unique ID may enable persistence across browser sessions. For example, the unique ID may be recognizable in subsequent browser sessions. The unique ID may remain in the local browser cache, for example, until the local browser cache is explicitly cleared. Storing the unique ID in the local browser cache may not be persistent across browser applications. For example, the unique ID stored in the local browser cache of a one browser application may not be accessible from another browser application.

The computing device may determine, at 516, a latitude coordinate and a longitude coordinate of the user computing device. For example, the data received from the browser session may include the latitude and longitude coordinates of the user computing device, as described herein. The computing device may use the latitude and longitude coordinates to track a user. Use of the latitude and longitude coordinates for tracking may improve device and/or network security, for example, by eliminating the need for cookies to track the user.

The computing device may determine, at 518, a physical address (e.g., a postal address) for the browser session using the location data. The physical address may indicate a postal address at which the user accessed the URL in the browser session. For example, the computing device may generate, at 518, the physical address using a map API (e.g., such as Bing Maps API, Mapbox API, OpenStreetMap API, Leaflet API, OpenLayers API, Google Maps API, and/or another map API). For example, the computing device may translate, at 514, the received latitude and longitude coordinates into the physical address using the map API.

The computing device may determine an address type (e.g., residential, apartment/condo building, single family home, commercial, and/or the like) based on the physical address. For example, the computing device may determine the address type using a postal service API. The computing device may use the address type to determine a type and/or frequency of notifications sent to the user. The computing device may determine other user information based on the physical address such as a name associated with the user, an age of the user, a gender of the user, demographics associated with the user, and/or psychographics associated with the user. The demographics associated with the user may include race, marital status, household size, occupation, income, education, and/or living status. The psychographics associated with the user may include personality traits, lifestyles, interests, opinions, beliefs, values, etc. The computing device may determine the type and/or the frequency of notifications sent to the user based on the other information. The computing device may determine the content of the notifications based on the other information.

At 520, the computing device may associate the generated unique identifier with the determined location data. For example, the computing device may map, at 520, the unique identifier to the location data (e.g., physical address). The mapping between the unique identifier and the location data may enable identification of future visits to the URL by the user. The mapping between the unique identifier and the location data may enable an administrative user to identify who is accessing specific URLs, for example, with or without the use of cookies. For example, the unique identifier and location data may enable convergence of an online and offline footprint for a user.

The computing device may generate a profile for the user, for example, based on the association between the unique identifier and the location data. The user profile may be used to track a plurality of factors associated with the user and the user's activity. For example, the user profile may track which URLs the user accesses, the frequency with which the user accesses the URL(s), demographics associated with the user, the address(es) associated with the user, etc. For example, the computing device may associate multiple unique identifiers having the same location data with the same user profile. The user profile may be used to generate a targeted marketing campaign. The method 500 may end, at 522.

Figure 6:
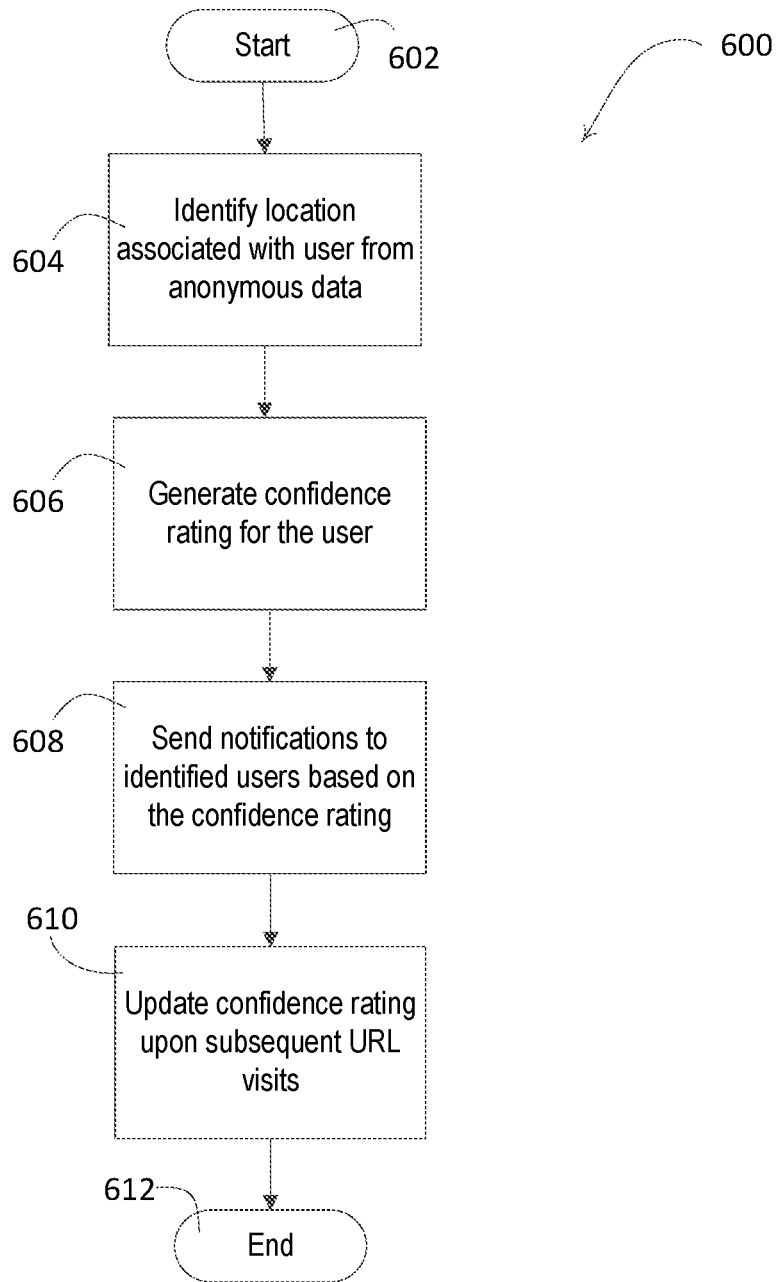
FIG. 6 is a flow diagram illustrating an example method for determining a user's interest in a product.

FIG. 6 is a flow diagram of an example method 600 that may be implemented by one or more computing devices (e.g., such as the computing devices 230a-230n shown in FIG. 2) to quantify a user's interest in a product. The method 600, or portions thereof, may be performed to enable engagement with the user based on the user's interest in the product. The product may be a vehicle. Engagement with the user may include sending notification(s) to the user, determining one or more advertisements for the user, track service needs for a vehicle owned and/or operated by the user or someone in the user's household, and/or the like. The notification(s) may include emails, text messages, mobile phone notifications, phone calls, advertisements, and/or the like. The method 600, or portions thereof, may be performed at a single computing device or may be distributed across multiple computing devices (e.g., multiple servers and/or a user device). The method 600, or portions thereof, may be performed to enable users, such as administrative users, to determine that the user has a specific interest in one or more products. The method 600, or portions thereof, may be performed to enable the administrative users to quantify the user's interest in the product(s). The method 600, or portions thereof, may be performed to enable adaptive generation of notifications to the user based on the specific interest in the product(s). The method 600 may comprise instructions that may be stored in memory as computer-readable or machine-readable storage media that may be executed by the one or more computing devices for executing the method 600. The method 600, or portions thereof, may reduce the amount of processing resources used by the computing device during a predetermined period (e.g., day). The method 600, or portions thereof, may improve the functionality of a computer network system (e.g., such as the computing network system 200 shown in FIG. 2) associated with engagement of the user. In addition, the method 600, or portions thereof, may implement a distributed network architecture, as shown in FIG. 2, which may reduce the amount of signaling between a user computing device and one or more administrative computing devices (e.g., such as the computing devices 230*a*, 230*b*, 230*n* shown in FIG. 2) and may reduce the amount of processing resources consumed by the administrative computing device(s). The method 600, or portions thereof, may be combined with the method 300, the method 400, and/or the method 500.

The method 600 may start, at 602, when a user computing device (e.g., such as computing device 210 shown in FIG. 2) accesses a URL. For example, a user may initialize a browser application on the user computing device and may navigate to the URL within the browser application using a browser session.

As illustrated in FIG. 6, a computing device (e.g., such as computing device 230*a*, 230*b*, or 230*n* shown in FIG. 2) may identify, at 604, location data associated with anonymous data received via the browser session. For example, the data received from the browser session may include the location data, as described herein. Additionally or alternatively, the computing device may determine the location data using a tracker installed in the browser application on the user computing device. The computing device may determine a physical address (e.g., a postal address) for the browser session using the location data. The physical address may indicate a postal address at which the user accessed the URL in the browser session. For example, the computing device may generate the physical address using a map API (e.g., such as Bing Maps API, Mapbox API, OpenStreetMap API, Leaflet API, OpenLayers API, Google Maps API, and/or another map API). For example, the computing device may translate received latitude and longitude coordinates into the physical address using the map API.

The computing device may determine an address type (e.g., residential, apartment/condo building, single family home, commercial, and/or the like) based on the physical address. For example, the computing device may determine the address type using a postal service API. The computing device may use the address type to determine a type and/or frequency of notifications sent to the user. The computing device may determine other user information based on the physical address such as a name associated with the user, an age of the user, a gender of the user, demographics associated with the user, and/or psychographics associated with the user. The demographics associated with the user may include race, marital status, household size, occupation, income, education, living status, and/or housing value. The psychographics associated with the user may include personality traits, lifestyles, interests, opinions, beliefs, values, etc.

The computing device may generate a profile for the user, for example, using a unique identifier, location data (e.g., one or more addresses), and/or other information. The user profile may be used to track a plurality of factors associated with the user and the user's activity. For example, the user profile may track which URLs the user accesses, the frequency with which the user accesses the URL(s), demographics associated with the user, the address(es) associated with the user, etc. For example, the computing device may associate multiple unique identifiers having the same location data with the same user profile. The user profile may enable generation of a targeted marketing campaign, quantification of a user's interest in one or more products/brands, and/or tracking health of one or more vehicles owned/operated by the user.

At 606, the computing device may generate a confidence rating for the user. The confidence rating may be a measure (e.g., probability) of the user's interest in a product (e.g., such as purchase readiness). The computing device may generate the confidence rating using an algorithm. The algorithm may incorporate learning such that the algorithm improves (e.g., automatically) as more data is applied to the algorithm. The algorithm may determine the confidence rating using one or more general attributes and/or one or more automobile-specific attributes. The one or more general attributes may include distance, devices across family/household, unique pages accessed, a recency multiplier, one or more confidential calculations, the physical address type, demographics associated with the user, psychographics associated with the user, the age of the user, the gender of the user, and/or a frequency of URL visits by the user. The one or more automobile-specific attributes may include finance upgrade segment status, lease upgrade segment status, lease term remaining, lease mileage projection, finance term remaining, equity status, mileage of current vehicle, private shopping mode, opened email, and/or automobile wallet utilization. The confidence rating may be associated with one or more discrete decision values (e.g., researching, interested, ready to buy, and/or purchased). Each of the discrete decision values may be associated with respective thresholds of the confidence rating such that each user's confidence rating is associated with one of the discrete decision values for a present confidence rating. The present confidence rating may be displayed on an administrative graphical user interface (GUI) operating on an administrative user device. The GUI may display information for a plurality of users. For each of the plurality of users, the GUI may display the name of the user, a product the user is interested in, the confidence rating, and/or other information associated with the user. The GUI may include a visual indication (e.g., an indicator) of the confidence rating for each of the plurality of users. The GUI may indicate the decision value associated with the present confidence rating.

At 608, the computing device may send one or more notifications to the user based on the confidence rating for the user. The one or more notifications may include advertisements associated with the product the user is interested in, coupons for the product the user is interested in, queries for questions about the product the user is interested in, and/or the like. The computing device may determine the type and/or the frequency of notifications sent to the user based on the other information (e.g., a name associated with the user, an age of the user, a gender of the user, demographics associated with the user, and/or psychographics associated with the user). The computing device may determine the content of the notifications based on the other information. For example, the computing device may use the confidence rating and/or other information associated with a plurality of users as filtering criteria for a targeted marketing campaign. The filtering criteria may be overlaid on top of the confidence rating, for example, to identify which users to target in the marketing campaign.

At 610, the computing device may update the confidence rating upon subsequent visits to the URL. The computing device may be configured to identify subsequent return visits by the user to the URL based on the determined physical address, a unique ID stored in the local browser cache, and/or a cookie. For example, the computing device may recognize that another browser session accessing the URL is from the user computing device at the same physical address or another user computing device at the same physical address. When another user computing device at the same physical address accesses the URL, the computing device may determine that that other user computing device is the same user and/or user household. The computing device may store a timestamp and the URL of each subsequent return visit from the physical address and/or browser application. For example, the computing device may create a log of URLs visited by user computing devices associated with a user profile. The log of URLs may track the unique identifier and/or device type associated with each URL visit. When a frequency of visits by the user to the URL increase over a predetermined period, the computing device may determine that the confidence rating has increased for that user. When a frequency of visits by the user to the URL decrease over a predetermined period, the computing device may determine that the confidence rating has decreased for that user. The method 600 may end, at 612.

Figure 7:
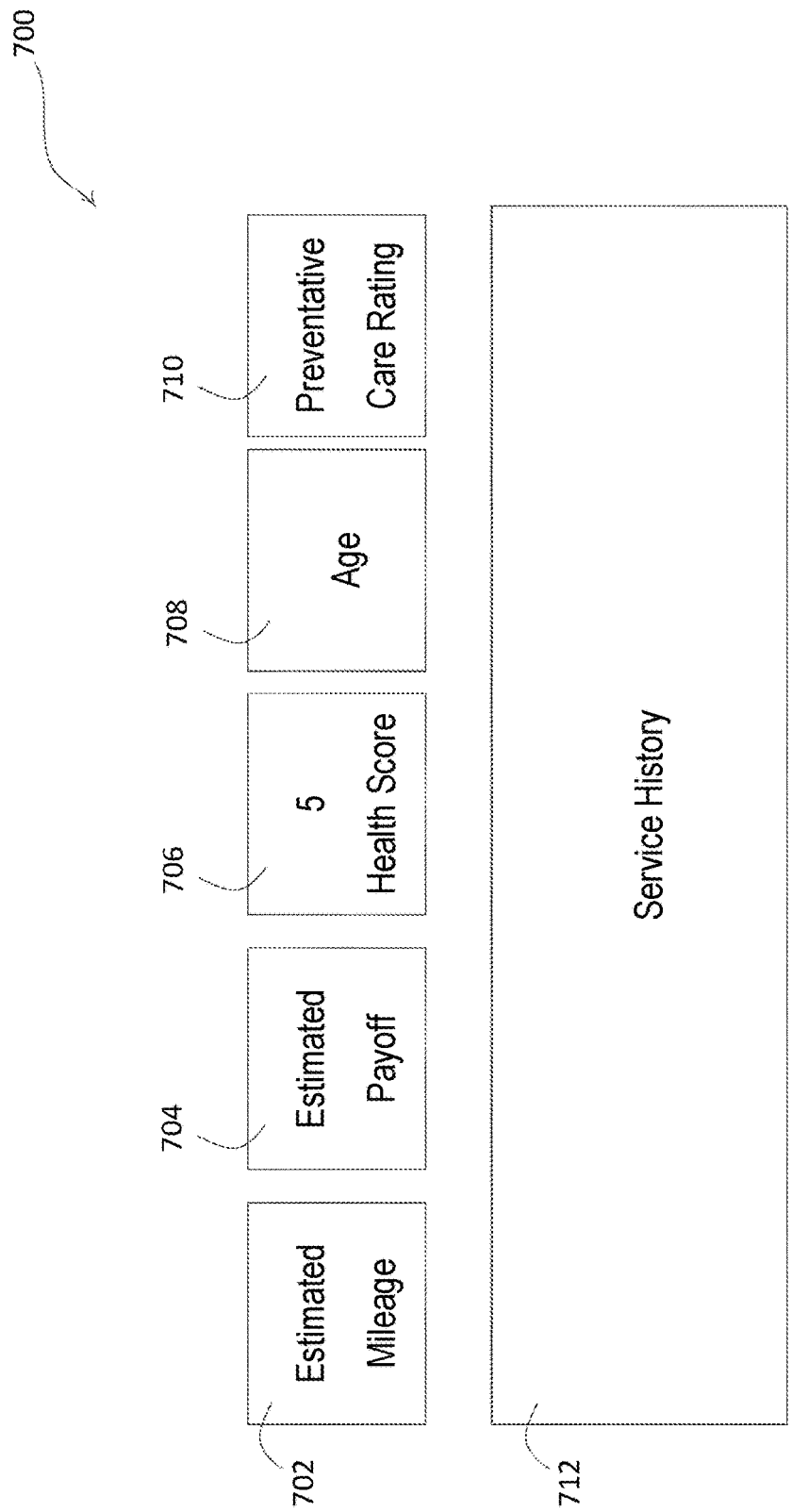
FIG. 7 is an example graphical user interface for a vehicle health assessment.

FIG. 7 is an example GUI 700 for a vehicle health assessment. The GUI 700 may display various parameters associated with a specific vehicle. The GUI 700 may include an estimated mileage block 702. The estimated mileage block 702 may display and/or accept an input from a car owner/operator of how many miles the vehicle has driven. The GUI 700 may include an estimated payoff block 704. The estimated payoff block 704 may indicate how much debt is still valid for the vehicle. The GUI 700 may include a health score block 706. The health score block may display a health score for the vehicle which may be determined as described herein (e.g., such as at 820 of the method 800 shown in FIG. 8). The GUI 700 may include an age block 708. The age block 708 may display an age of the vehicle. The GUI 700 may include a preventive care rating block 710. The preventative care rating block 710 may indicate compliance of the car owner/operator with a preventative care schedule of maintenance associated with the vehicle. The GUI 700 may include a service history block 712. The service history block 712 may display prior service information for the vehicle.

Figure 8:
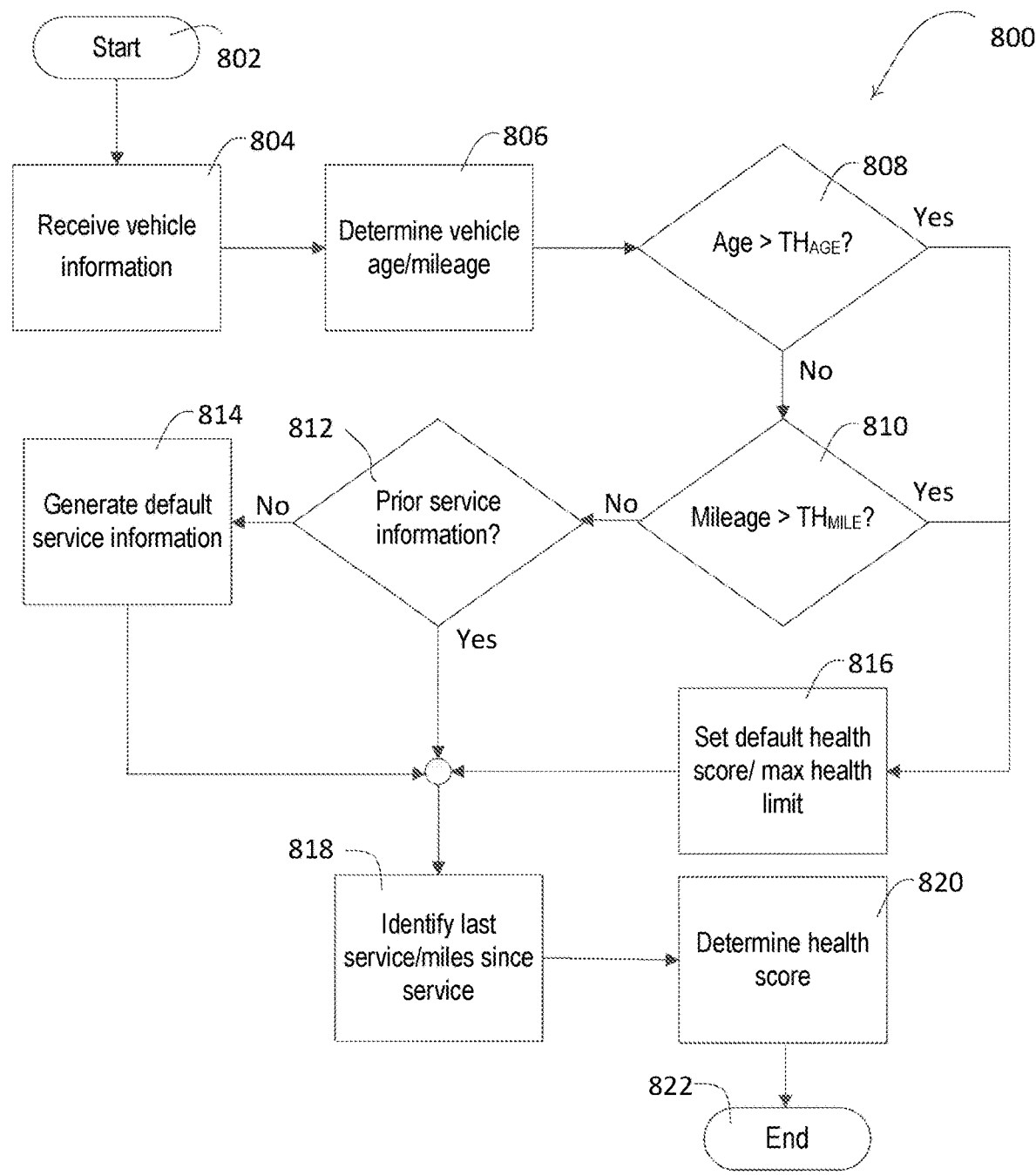
FIG. 8 is a flow diagram illustrating an example method for determining a health score associated with a vehicle.

FIG. 8 is a flow diagram of an example method 800 that may be implemented by one or more computing devices (e.g., such as the computing devices 230*a*-230*n* shown in FIG. 2) to determine a health score associated with a vehicle operated by a user. The method 800, or portions thereof, may be performed to enable engagement with the user based on the vehicle's health score. Engagement with the user may include sending notification(s) to the user, determining one or more advertisements for the user, track service needs for a vehicle owned and/or operated by the user or someone in the user's household, and/or the like. The notification(s) may include emails, text messages, mobile phone notifications, phone calls, advertisements, and/or the like. The method 800, or portions thereof, may be performed at a single computing device or may be distributed across multiple computing devices (e.g., multiple servers and/or an administrative computing device). The method 800, or portions thereof, may be performed to enable users, such as administrative users, to determine that the vehicle requires service. The method 800, or portions thereof, may be performed to enable the administrative users to quantify the overall health (e.g., maintenance) of the vehicle. The method 800, or portions thereof, may be performed to enable adaptive generation of notifications to the user based on the determined health of the vehicle. The method 800 may comprise instructions that may be stored in memory as computer-readable or machine-readable storage media that may be executed by the one or more computing devices for executing the method 800. The method 800, or portions thereof, may reduce the amount of processing resources used by the computing device during a predetermined period (e.g., day). The method 800, or portions thereof, may improve the functionality of a computer network system (e.g., such as the computing network system 200 shown in FIG. 2) associated with engagement of the user. In addition, the method 800, or portions thereof, may implement a distributed network architecture, as shown in FIG. 2, which may reduce the amount of signaling between a user computing device and one or more administrative computing devices (e.g., such as the computing devices 230*a*, 230*b*, 230*n* shown in FIG. 2) and may reduce the amount of processing resources consumed by the administrative computing device(s). The method 800, or portions thereof, may be combined with the method 300, the method 400, method 500, and/or the method 600.

The method 800 may start, at 802, when a user (e.g., an administrative user) initializes an application on a computing device (e.g., such as computing devices 230*a*, 230*b*, 230*n* shown in FIG. 2).

At 804, the computing device (e.g., the application) may request and/or receive the information associated with the vehicle (e.g., vehicle information). The computing device may receive, at 804, the vehicle information from the vehicle, from a mobile device (e.g., such as the computing device 210 shown in FIG. 2) in communication with the vehicle, and/or another computing device associated with the vehicle. The computing device may request and/or receive the vehicle information at regular intervals (e.g., daily, weekly, monthly, etc.). Additionally or alternatively, the computing device may request and/or receive the vehicle information when the vehicle is started, when an operator (e.g., owner, lessee, etc.) of the vehicle initializes an application on their mobile device. Additionally or alternatively, the vehicle may send the vehicle information at specific mileage thresholds (e.g., every 100 miles, every 1,000 miles, etc.). Additionally or alternatively, a user of the vehicle may enter the vehicle information into a GUI (e.g., such as the GUI 700 shown in FIG. 7). The GUI may implement, at 804, gamification features that encourage the user to enter the vehicle information. For example, the GUI may incorporate one or more features (e.g., point scoring, competition with other users, reward earning, etc.) that are designed to motivate consistent participation and long-term engagement of the user(s). The computing device may associate the received vehicle information with the vehicle. The computing device may store the received vehicle information, for example, in a local or cloud-based database.

At 806, the computing device may determine an age of the vehicle and/or a vehicle mileage. The computing device may determine the vehicle age and/or the vehicle mileage based on the vehicle information received at 804. For example, the vehicle age may be determined based on a manufacturing date and/or model year associated with the vehicle. The vehicle information may include a unique identifier of the vehicle (e.g., vehicle identification number (VIN)). The computing device may use the VIN to update the vehicle age. The vehicle information may include the vehicle mileage.

At 808, the computing device may determine whether the vehicle age is greater than a threshold age, $TH_{AGE}$. The threshold age $TH_{AGE}$ may be determined based on a previous determined vehicle age and/or a previous vehicle mileage. The computing device may compare, at 808, the vehicle age against a plurality of threshold ages $TH_{AGE1}$, $TH_{AGE2}$ ... $TH_{AGEN}$. For example, the computing device may determine which of the plurality of threshold ages to compare the vehicle age to based on a previously determined vehicle age.

When the vehicle age is less than the threshold age $TH_{AGE}$, the computing device may determine, at 810, whether the vehicle mileage is greater than a threshold mileage $TH_{MILE}$. The threshold mileage $TH_{MILE}$ may be associated with the previously determined vehicle age and/or the threshold age $TH_{AGE}$. For example, the threshold mileage may define an average mileage for vehicles at the threshold age.

When the vehicle mileage is less than or equal to the threshold mileage $TH_{MILE}$, the computing device may determine, at 812, whether there is any stored prior service information associated with the vehicle. The prior service information associated with the vehicle may indicate previous service performed on the vehicle, for example, oil change(s), brake maintenance, other preventative maintenance, and/or corrective service. The owner/operator of the vehicle may enter service information (e.g., such as via the GUI 700 shown in FIG. 7). The computing device may store the owner/operator entered service information, for example, in the local or cloud-based database.

When there is no prior service information associated with the vehicle, the computing device may generate, at 814, default service information for the vehicle. The default service information may be generated based on manufacturer service schedules for the vehicle (e.g., the make and model of the vehicle). The computing device may query a database for the default service information, for example, using the VIN of the vehicle.

When the vehicle age is determined, at 808, to be greater than the threshold age $TH_{AGE}$ and/or the vehicle mileage is determined, at 810, to be greater than the threshold mileage $TH_{MILE}$ the computing device may determine, at 816, a health score limit and/or a max health limit. For example, the threshold age $TH_{AGE}$ may be associated with a maximum health score such that a vehicle age greater than the threshold must have a health score that is less than or equal to the maximum health score for that threshold age $TH_{AGE}$. Additionally or alternatively, the threshold mileage $TH_{MILE}$ may be associated with a maximum health score such that a vehicle mileage greater than the threshold must have a health score that is less than or equal to the maximum health score for that threshold mileage $TH_{MILE}$.

At 818, the computing device may identify a last performed service on the vehicle. For example, the last performed service may represent the most recent service (e.g., scheduled/unscheduled, maintenance/corrective, etc.). The last performed service may have been performed at a service shop associated with the dealership. The last performed service may have been performed at a third-party service shop. The computing device, at 818, may enable input of information associated with a last performed service at a third-party service shop. The computing device may determine, at 818, a number of miles driven by the vehicle since the last performed service. The computing device may determine a daily drive rate of the vehicle, for example, based on a date of the most recent service and the number of miles driven by the vehicle since the last performed service. Calculation of the daily drive rate may include a linear fit between odometer readings. Additionally or alternatively, the computing device may receive a daily indication (e.g., from the vehicle) indicating the number of miles driven on that respective day.

At 820, the computing device may determine a health score for the vehicle. The health score may be a preventive care rating associated with the vehicle. For example, the health score may indicate how consistently the vehicle is serviced with respect to a recommended service schedule. The health score may be determined, at 820, using an algorithm that is based on one or more of the vehicle age, the vehicle mileage, the prior service information associated with the vehicle, and/or the number of miles driven by the vehicle since the last performed service. The algorithm may incorporate learning such that the algorithm improves (e.g., automatically) as more data is applied to the algorithm. The algorithm may compare the vehicle (e.g., the vehicle age, the vehicle mileage, the prior service information, etc.) against other similar vehicles (e.g., of the same make and model) of similar age and/or mileage. For example, the health score may be a relative health of the vehicle when compared to other similar vehicles having similar age and/or mileage. The health score for the vehicle may be determined, at 820, at regular time intervals (e.g., daily, monthly, bi-monthly, etc.) and/or following specific triggers (e.g., mileage thresholds, service performed, etc.). For example, the health score for the vehicle may be determined, at 820, every night. When the health score of the vehicle is below a certain threshold, the computing device may identify an incentive to send to the owner/operator to increase service frequency. The computing device may be configured to display the health score via a GUI (e.g., such as the GUI 700 shown in FIG. 7). A table depicting example health scores for a vehicle based on various factors is shown in Table 1.

TABLE 1

Example Health Score Calculation

| Health Score | Vehicle Mileage | Vehicle Age | Last Service | Mileage Since Last Service |
|---|---|---|---|---|
| A | — | ≤5 years | ≤6 months | ≤10K |
| B | — | ≤7 years | ≤12 months | ≤10K |
| C | — | ≥3 years | ≤24 months | ≥10K |
| D | — | ≥5 years | >24 months | ≥10K |
| F | >200K | ≥10 years | ≥12 months | ≥10K |

The computing device may determine a future estimated health (e.g., health score) of the vehicle based on the latest daily drive rate calculation. The future estimated health of the vehicle may be a 6-month projection, projected at lease/note maturity, and/or other vehicle milestones. The future estimated health may be used to identify users/vehicles to target in a marketing campaign. For example, the computing device may determine to notify the user of a current health score of their vehicle and/or send a service coupon based on the future estimated health of the vehicle. The future estimated health may be used to identify vehicles to target for trade-in.

The computing device may determine whether to send a notification to the owner/operator of the vehicle based on the health score. For example, when the health score is below a predetermined health threshold, the computing device may send a service notification (e.g., reminder and/or suggestion) and/or a service coupon to the owner/operator of the vehicle. The service notification may include a service reminder, a service warning, and/or a service incentive. Additionally or alternatively, the health score of the vehicle is below the predetermined health threshold, the computing device may identify an incentive to send to the owner/operator to increase service frequency. When the health score is above a predetermined health threshold, the computing device may send a marketing (e.g., trade-in) notification to the owner/operator of the vehicle. The marketing notification may include a trade-in value of the vehicle based on the health score of the vehicle. The marketing notification may suggest one or more vehicles of similar cost, value, and/or monthly payment to the vehicle.

Figure 9:
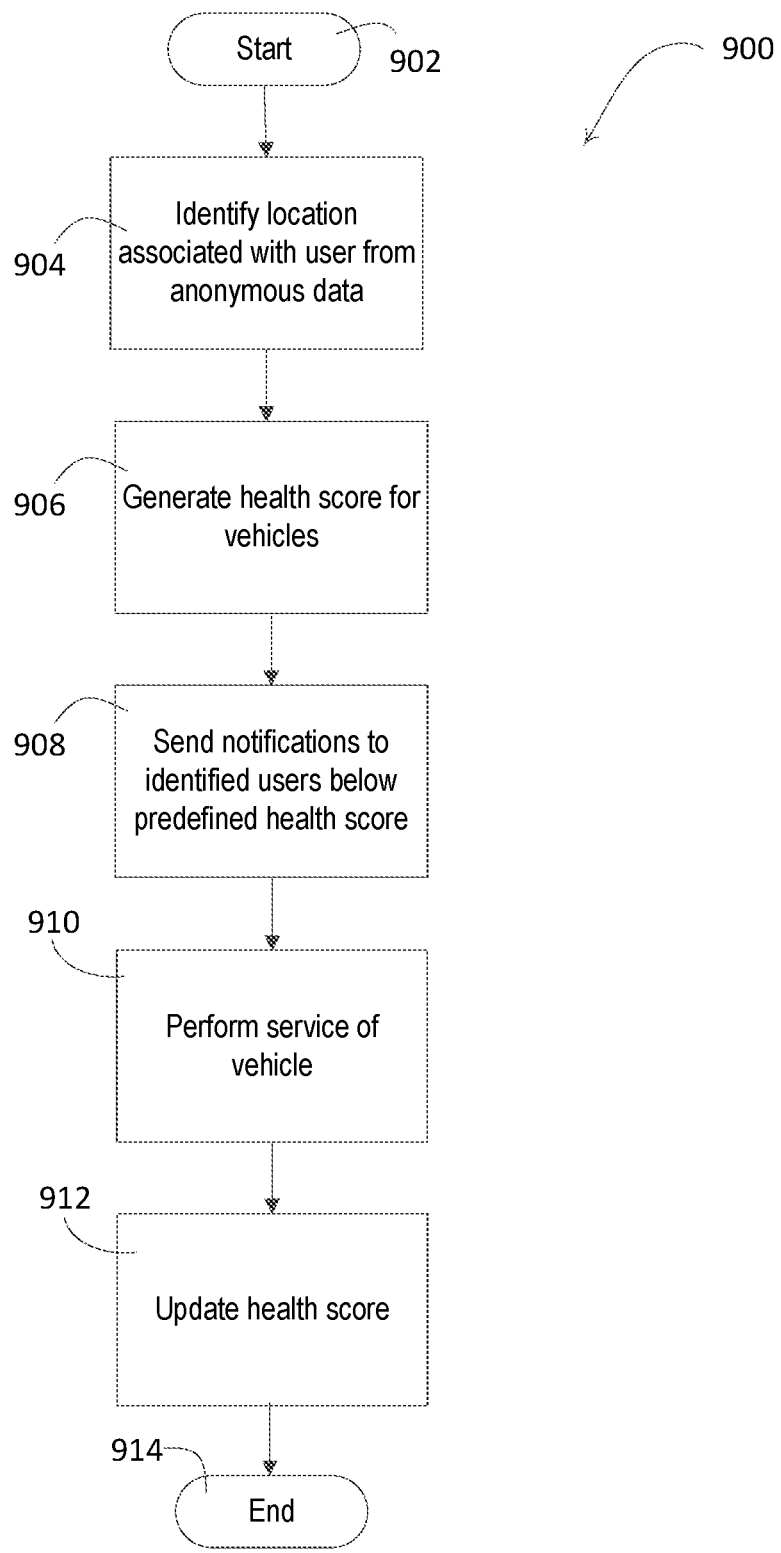
FIG. 9 is a flow diagram illustrating an example method for updating a health score associated with a vehicle.

FIG. 9 is a flow diagram of an example method 900 that may be implemented by one or more computing devices (e.g., such as the computing devices 230a-230n shown in FIG. 2) to update a health score associated with a vehicle operated by a user based on a recently performed service. The method 900, or portions thereof, may be performed to enable engagement with the user based on the vehicle's health score. Engagement with the user may include sending notification(s) to the user, determining one or more advertisements for the user, track service needs for a vehicle owned and/or operated by the user or someone in the user's household, and/or the like. The notification(s) may include emails, text messages, mobile phone notifications, phone calls, advertisements, and/or the like. The method 900, or portions thereof, may be performed at a single computing device or may be distributed across multiple computing devices (e.g., multiple servers and/or an administrative computing device). The method 900, or portions thereof, may be performed to enable users, such as administrative users, to determine that the vehicle requires service. The method 900, or portions thereof, may be performed to enable the administrative users to quantify the overall health (e.g., maintenance) of the vehicle. The method 900, or portions thereof, may be performed to enable adaptive generation of notifications to the user based on the determined health of the vehicle. The method 900 may comprise instructions that may be stored in memory as computer-readable or machine-readable storage media that may be executed by the one or more computing devices for executing the method 900. The method 900, or portions thereof, may reduce the amount of processing resources used by the computing device during a predetermined period (e.g., day). The method 900, or portions thereof, may improve the functionality of a computer network system (e.g., such as the computing network system 200 shown in FIG. 2) associated with engagement of the user. In addition, the method 900, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s). The method 900, or portions thereof, may be combined with the method 300, the method 400, method 500, the method 600, and/or the method 800.

The method 900 may start, at 902, when a user (e.g., an administrative user) initializes an application on a computing device (e.g., such as computing devices 230a, 230b, 230n shown in FIG. 2). For example, the administrative user may initialize a service application, for example, to identify vehicles that need servicing. The service application may enable the administrative user to identify active service customers, recently lost customers, defected customers, and/or never serviced customers. The active service customers may be owners/operators of vehicles that have been serviced by a specific dealer within a predetermined length of time. The recently lost customers may be owners/operators of vehicles that have been serviced by the specific dealer in the past but have not had their respective vehicles serviced by the specific dealer within the last year or two and/or in the most recent two or more consecutive vehicle service intervals. The defected customers may represent customers that are owners/operators of vehicles that have been serviced by the specific dealer in the past; but, have not been serviced by the specific dealer in the last two years. The service application may enable the administrative user to determine whether recently lost customers, defected customers, and/or never serviced customers have visited the dealer's service website and/or accessed a profile associated with their respective vehicle.

As illustrated in FIG. 9, a computing device (e.g., such as computing device 230a, 230b, or 230n shown in FIG. 2) may identify, at 904, location data associated with a user (e.g., owner/operator of a vehicle) based on anonymous data received via a browser session. For example, the data received from the browser session may include the location data. Additionally or alternatively, the computing device may determine the location data using a cookie installed in the browser application on the user computing device. The computing device may determine a physical address (e.g., a postal address) for the browser session using the location data. The physical address may indicate a postal address at which the user accessed the URL in the browser session. For example, the computing device may generate the physical address using a map API (e.g., such as Bing Maps API, Mapbox API, OpenStreetMap API, Leaflet API, OpenLayers API, Google Maps API, and/or another map API). For example, the computing device may translate received latitude and longitude coordinates into the physical address using the map API. The location data may enable the administrative user to determine whether a customer or prospective customer visited a dealer website anonymously (e.g., without logging in).

The computing device may generate a profile for the user, for example, based on an association between a unique identifier and the location data. The user profile may be used to track a plurality of factors associated with the user and the user's activity. For example, the user profile may track which URLs the user accesses, the frequency with which the user accesses the URL(s), demographics associated with the user, the address(es) associated with the user, etc. For example, the computing device may associate multiple unique identifiers having the same location data with the same user profile. The user profile may be used to generate a targeted marketing campaign. Additionally or alternatively, the computing device may associate a service profile with an existing user profile.

At 906, the computing device may determine health scores for a plurality of vehicles. The health scores may be determined, at 906, using an algorithm that is based on one or more of a vehicle age, a vehicle mileage, prior service information associated with the respective vehicle, and/or a number of miles driven by the respective vehicle since the last performed service. The algorithm may compare each of the vehicles (e.g., the vehicle age, the vehicle mileage, the prior service information, etc.) against other similar vehicles (e.g., of the same make and model) of similar age and/or mileage. For example, the health scores may indicate a relative health of the vehicles when compared to other similar vehicles having similar age and/or mileage.

At 908, the computing device may determine to send notification(s) to the owner(s)/operator(s) of one or more of the vehicles based on the determined health scores. For example, the computing device may send one or more notifications to each of the owners/operators of vehicles having a health score below a predetermined health threshold. The predetermined health threshold may be determined based on a safe operation of the vehicle. The predetermined health threshold may be vehicle make, vehicle model, and/or vehicle year specific. The notifications may include a service notification (e.g., reminder and/or suggestion) and/or a service coupon to the owner(s)/operator(s) of the vehicles with health scores below a predetermined health threshold. The service notification may include a service reminder, a service warning, and/or a service incentive.

At 910, the computing device may receive confirmation that a service was performed on a vehicle. The confirmation may be received from the vehicle (e.g., the vehicle computer), a user computing device of the owner/operator of the vehicle, and/or another administrative computing device. Additionally or alternatively, the administrative user may input the service confirmation into the service application for the respective vehicle.

At 912, the computing device may update the health score of the vehicle, for example, based on the recently performed service. The recently performed service may increase the health score associated with the vehicle. The computing device may update the health score of each of the vehicles following any subsequently performed services for the respective vehicles. The method 900 may end at 914.

Figure 10:
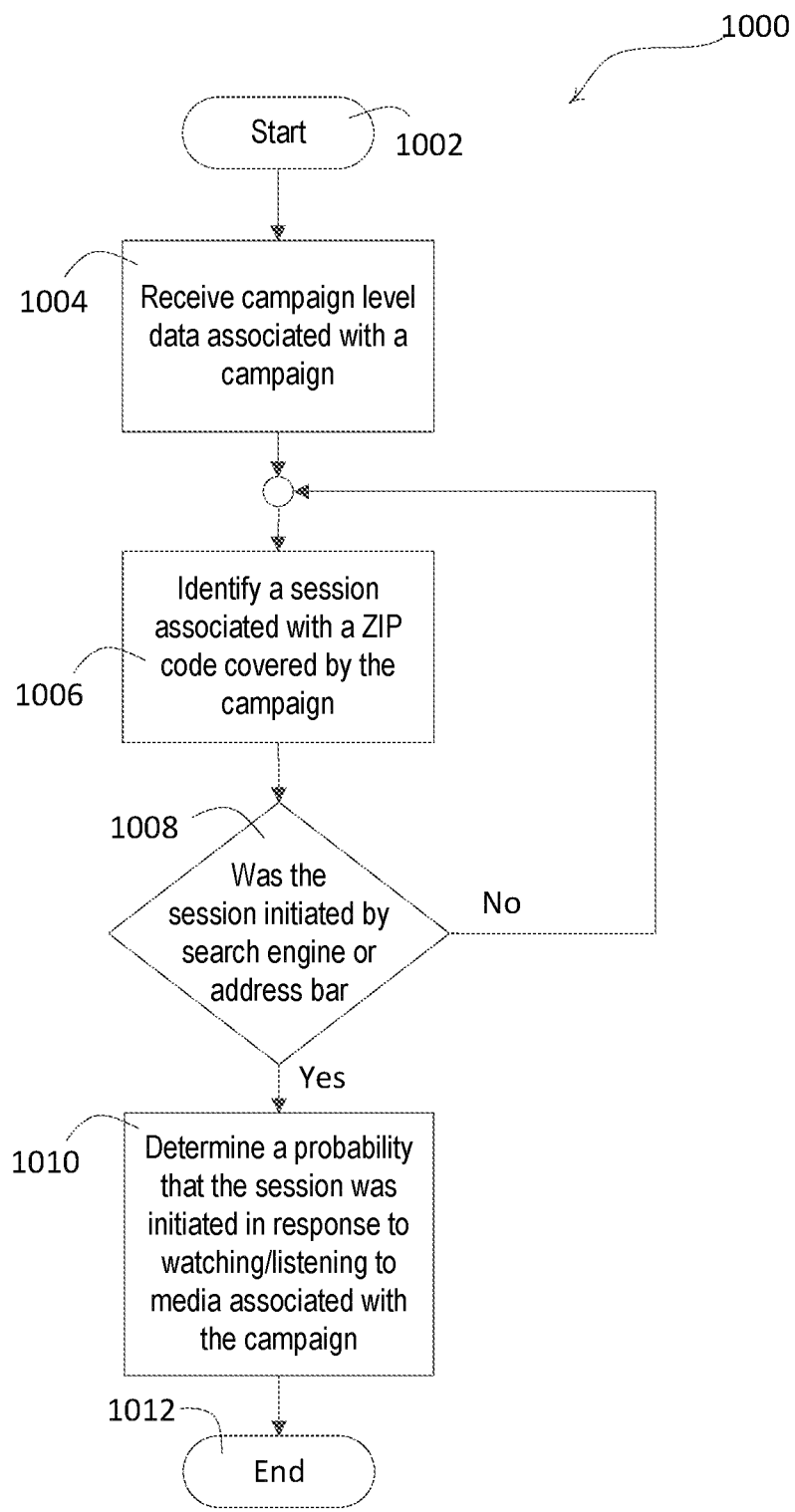
FIG. 10 is a flow diagram illustrating an example method for determining a probability that a browsing session was initiated in response to watching and/or listening to media associated with a campaign.

FIG. 10 is a flow diagram of an example method 1000 that may be implemented by one or more computing devices (e.g., such as the computing devices 230a-230n shown in FIG. 2) to determine a probability that a browsing session was initiated in response to watching and/or listening to media associated with a campaign. The method 1000, or portions thereof, may be performed to estimate an effectiveness of the campaign. For example, the method 1000, or portions thereof, may be performed to determine whether a user associated with the browsing session was influenced by media associated with the campaign to initiate the browsing session. The method 1000, or portions thereof, may be performed at a single computing device or may be distributed across multiple computing devices (e.g., multiple servers and/or a user device). The method 1000, or portions thereof, may be performed to enable the administrative users to quantify a likelihood that the user initiated the browser session in response to watching and/or listening to media associated with the campaign. The method 1000 may comprise instructions that may be stored in memory as computer-readable or machine-readable storage media that may be executed by the one or more computing devices for executing the method 1000. The method 1000, or portions thereof, may improve the functionality of a computer network system (e.g., such as the computing network system 200 shown in FIG. 2) associated with engagement of the user. In addition, the method 1000, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s).

The method 1000 may start, at 1002, when a computing device (e.g., such as computing device 210 shown in FIG. 2) receives campaign level data associated with a campaign. The campaign may comprise one or more messages and/or media that share a theme. For example, the one or more messages and/or media may be associated with a product and/or brand. The one or more messages and/or media may be made available for consumption via mobile technology, television, radio, print, and/or online platforms. It may be desirable to identify whether online activity (e.g., a browser session, traffic to a website, a search query, an online purchase, and/or the like) was initiated by consumption of the one or more messages and/or media associated with the campaign. For example, identifying a likelihood that the online activity was initiated by the consumption of the one or more messages and/or media associated with the campaign may indicate a success of the campaign.

The campaign may be associated with a time period. For example, the campaign may be active during the time period. The campaign level data may include impression data over the time period. Stated differently, the campaign level data may indicate daily impressions (e.g., daily impression data) over the course of the campaign. The daily impression data may include respective impression proportions of campaign impressions for each of a plurality of dates. A campaign impression may include an instance of media associated with the campaign being watched and/or listened to. For example, the campaign level data may indicate the number of impressions of media associated with the campaign in each of a plurality of sub-periods within the time period. The sub-periods may represent days, portions of a day, and/or the like. A table depicting example daily impression data for a campaign is shown in Table 2.

TABLE 2

| Example Daily Campaign Impression Data | | |
|---|---|---|
| Date | Impressions | Proportion |
| Jul. 6 | 1000 | 25% |
| Jul. 7 | 2000 | 50% |
| Jul. 8 | 1000 | 25% |

The campaign level data may include daypart blueprint data. The daypart blueprint data may represent aggregate daypart proportions of impressions for a plurality of (e.g., all) campaigns for which campaign level data is available to the computing device. The daypart blueprint data may be updated periodically (e.g., daily, weekly, monthly, etc.). The daypart proportions may indicate respective daypart proportions for the impressions from the plurality of campaigns. For example, the daypart blueprint data may indicate the percentage of impressions in each of a plurality of dayparts. Stated differently, the daypart proportions may include respective impression proportions of campaign impression for each of the plurality of dayparts. The dayparts may represent a pre-determined portion of a day, for example, such as overnight, early morning, daytime, early fringe, prime access, prime time, and/or late fringe. The daypart proportions may indicate when overall streaming habits. The daypart proportions may be used to assign a daypart factor to each of the dayparts. A table depicting example daypart blueprint data for a plurality of campaigns is shown in Table 3.

TABLE 3

Example Daypart Blueprint Data

| Daypart | Proportion | Min Time | Max Time | Daypart Factor |
| --- | --- | --- | --- | --- |
| Overnight | 14.26% | 12:00 AM | 5:59 AM | 1.5 |
| Early Morning | 19.57% | 6:00 AM | 8:59 AM | 1.6 |
| Daytime | 28.18% | 9:00 AM | 3:59 PM | 1.8 |
| Early Fringe | 9.19% | 4:00 PM | 5:59 PM | 1.3 |
| Prime Access | 9.50% | 6:00 PM | 7:59 PM | 1.3 |
| Prime Time | 14.37% | 8:00 PM | 10:59 PM | 1.5 |
| Late Fringe | 4.93% | 11:00 PM | 11:59 PM | 1.2 |

As illustrated in FIG. 10, a computing device (e.g., such as computing device 230a, 230b, or 230n shown in FIG. 2) may identify, at 1006, a browser session associated with a ZIP code covered by the campaign. For example, the browser session may have been initiated within a specific ZIP code. The campaign may cover (e.g., target) one or more ZIP codes (e.g., devices within the one or more ZIP codes). Each campaign may uniquely identify a set of ZIP codes to cover. The set of ZIP codes may be larger for campaigns aimed at a larger area. For example, local campaigns may cover a smaller area than regional campaigns and national campaigns may cover a larger area than regional campaigns. The computing device may use one or more of the methods disclosed herein to identify, at 1006, the ZIP code associated with the browser session. For example, the computing device may determine location data associated with the browser session. The computing device may determine a physical address for the browser session using the location data. The computing device may determine which ZIP code in which the physical address is located. The computing device may identify that, at 1006, that the determined ZIP code is covered by the campaign. The computing device may determine, at 1006, that a specific URL was visited during the browsing session. The specific URL may be associated with the campaign (e.g., a product, a brand, a service, etc. that is associated with the campaign).

The computing device may determine, at 1008, whether the browsing session initiated by a search engine or address bar (e.g., entering a URL into a browser address bar). Initiating a browser session via a search engine may be referred to as organic traffic. Initiating a browser session via address bar may be referred to as direct traffic. Organic traffic and direct traffic may indicate that a user initiated the browser session with the intent to visit a specific website or a website associated with a specific product or brand. When the computing device determines, at 1008, that the browsing session was not initiated by a search engine or address bar, the method may return to 1006 to identify another browsing session.

When the computing device determines, at 1008, that the browsing session was initiated by a search engine or address bar, the computing device may determine, at 1010, a probability that the browsing session was initiated in response to watching and/or listening to media associated with the campaign. For example, the computing device may use the campaign level data to determine the probability that the browsing session was initiated in response to watching and/or listening to media associated with the campaign. The method 1000 may end at 1012.

Figure 11:
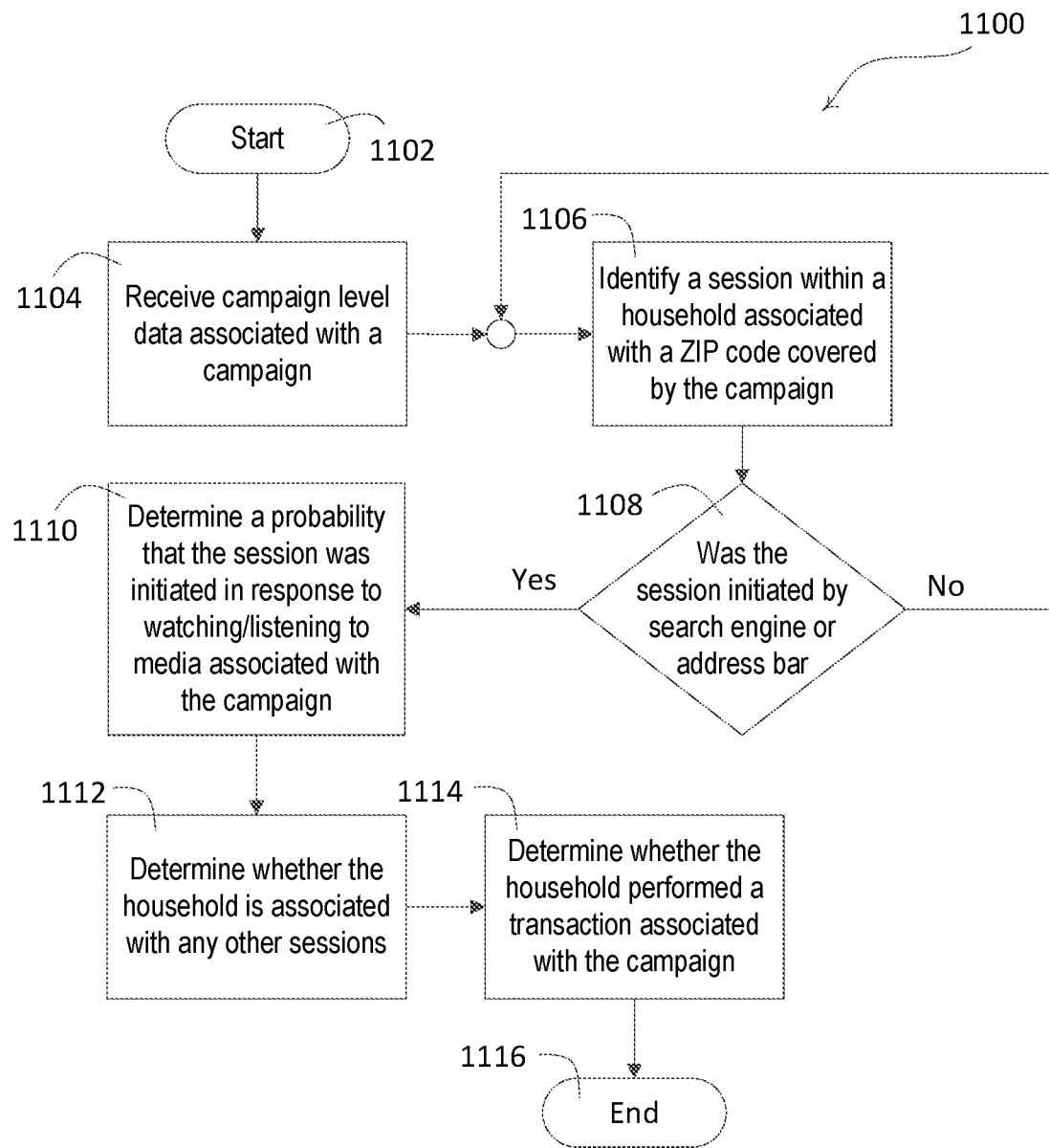
FIG. 11 is a flow diagram illustrating an example method for determining whether a household performed a transaction associated with a campaign.

FIG. 11 is a flow diagram of an example method 1100 that may be implemented by one or more computing devices (e.g., such as the computing devices 230a-230n shown in FIG. 2) to determine whether a household performed a transaction associated with a campaign. The method 1100, or portions thereof, may be performed to estimate an effectiveness of the campaign. For example, the method 1100, or portions thereof, may be performed to determine whether a user associated with the browsing session was influenced my media associated with the campaign to perform the transaction. The method 1100, or portions thereof, may be performed at a single computing device or may be distributed across multiple computing devices (e.g., multiple servers and/or a user device). The method 1100, or portions thereof, may be performed to enable the administrative users to quantify a likelihood that the user initiated the browser session and/or performed the transaction in response to watching and/or listening to media associated with the campaign. The method 1100 may comprise instructions that may be stored in memory as computer-readable or machine-readable storage media that may be executed by the one or more computing devices for executing the method 1100. The method 1100, or portions thereof, may improve the functionality of a computer network system (e.g., such as the computing network system 200 shown in FIG. 2) associated with engagement of the user. In addition, the method 1100, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s).

The method 1100 may start, at 1102, when a computing device (e.g., such as computing device 210 shown in FIG. 2) receives campaign level data associated with a campaign. The campaign may comprise one or more messages and/or media that share a theme. For example, the one or more messages and/or media may be associated with a product and/or brand. The one or more messages and/or media may be made available for consumption via mobile technology, television, radio, print, and/or online platforms. It may be desirable to identify whether online activity (e.g., a browser session, traffic to a website, a search query, an online purchase, and/or the like) was initiated by consumption of the one or more messages and/or media associated with the campaign. For example, identifying a likelihood that the online activity was initiated by the consumption of the one or more messages and/or media associated with the campaign may indicate a success of the campaign.

The campaign may be associated with a time period. For example, the campaign may be active during the time period. The campaign level data may include impression data over the time period. Stated differently, the campaign level data may indicate daily impressions (e.g., daily impression data) over the course of the campaign. For example, the campaign level data may indicate the number of impressions of media associated with the campaign in each of a plurality of sub-periods within the time period. The sub-periods may represent days, portions of a day, and/or the like. A table depicting example daily impression data for a campaign is shown in Table 2.

The campaign level data may include daypart blueprint data. The daypart blueprint data may represent aggregate daypart proportions of impressions for a plurality of (e.g., all) campaigns for which campaign level data is available to the computing device. The daypart blueprint data may be updated periodically (e.g., daily, weekly, monthly, etc.). The daypart proportions may indicate respective daypart proportions for the impressions from the plurality of campaigns. For example, the daypart blueprint data may indicate the percentage of impressions in each of a plurality of dayparts.

Stated differently, the daypart proportions may include respective impression proportions of campaign impression for each of the plurality of dayparts. The dayparts may represent a pre-determined portion of a day, for example, such as overnight, early morning, daytime, early fringe, prime access, prime time, and/or late fringe. The daypart proportions may indicate when overall streaming habits. The daypart proportions may be used to assign a daypart factor to each of the dayparts. A table depicting example daypart blueprint data for a plurality of campaigns is shown in Table 3.

As illustrated in FIG. 11, a computing device (e.g., such as computing device 230a, 230b, or 230n shown in FIG. 2) may identify, at 1106, a browser session associated with a ZIP code covered by the campaign. For example, the browser session may have been initiated within a specific ZIP code. The campaign may cover (e.g., target) one or more ZIP codes (e.g., devices within the one or more ZIP codes). Each campaign may uniquely identify a set of ZIP codes to cover. The set of ZIP codes may be larger for campaigns aimed at a larger area. For example, local campaigns may cover a smaller area than regional campaigns and national campaigns may cover a larger area than regional campaigns. The computing device may use one or more of the methods disclosed herein to identify, at 1106, the ZIP code associated with the browser session. For example, the computing device may determine location data associated with the browser session. The computing device may determine a physical address for the browser session using the location data. The computing device may determine which ZIP code in which the physical address is located. The computing device may identify that, at 1106, that the determined ZIP code is covered by the campaign. The computing device may determine, at 1106, that a specific URL was visited during the browsing session. The specific URL may be associated with the campaign (e.g., a product, a brand, a service, etc. that is associated with the campaign).

The computing device may determine, at 1108, whether the browsing session initiated by a search engine or address bar (e.g., entering a URL into a browser address bar). Initiating a browser session via a search engine may be referred to as organic traffic. Initiating a browser session via address bar may be referred to as direct traffic. Organic traffic and direct traffic may indicate that a user initiated the browser session with the intent to visit a specific website or a website associated with a specific product or brand. When the computing device determines, at 1108, that the browsing session was not initiated by a search engine or address bar, the method may return to 1106 to identify another browsing session.

When the computing device determines, at 1108, that the browsing session was initiated by a search engine or address bar, the computing device may determine, at 1110, a probability that the browsing session was initiated in response to watching and/or listening to media associated with the campaign. For example, the computing device may use the campaign level data to determine the probability that the browsing session was initiated in response to watching and/or listening to media associated with the campaign.

The computing device may determine, at 1114, whether the household performed a transaction associated with the campaign. For example, the campaign may be associated with a product or brand, as described herein. The computing device may determine, at 1114, whether a user in the household purchased the product. Additionally or alternatively, the campaign may be associated with one or more other transactions that include content available for purchase, content available for streaming, creation of a user account, a subscription service, another type of service, deposited money with a banking service, downloaded an application and/or the like. Determining whether the household performed a transaction associated with the campaign may provide further support for determining a success of the campaign. For example, the determination, at 1114, may be aggregated with similar determinations associated with transactions performed by other users to determine the success of the campaign. The method 1100 may end at 1112.

Figure 12:
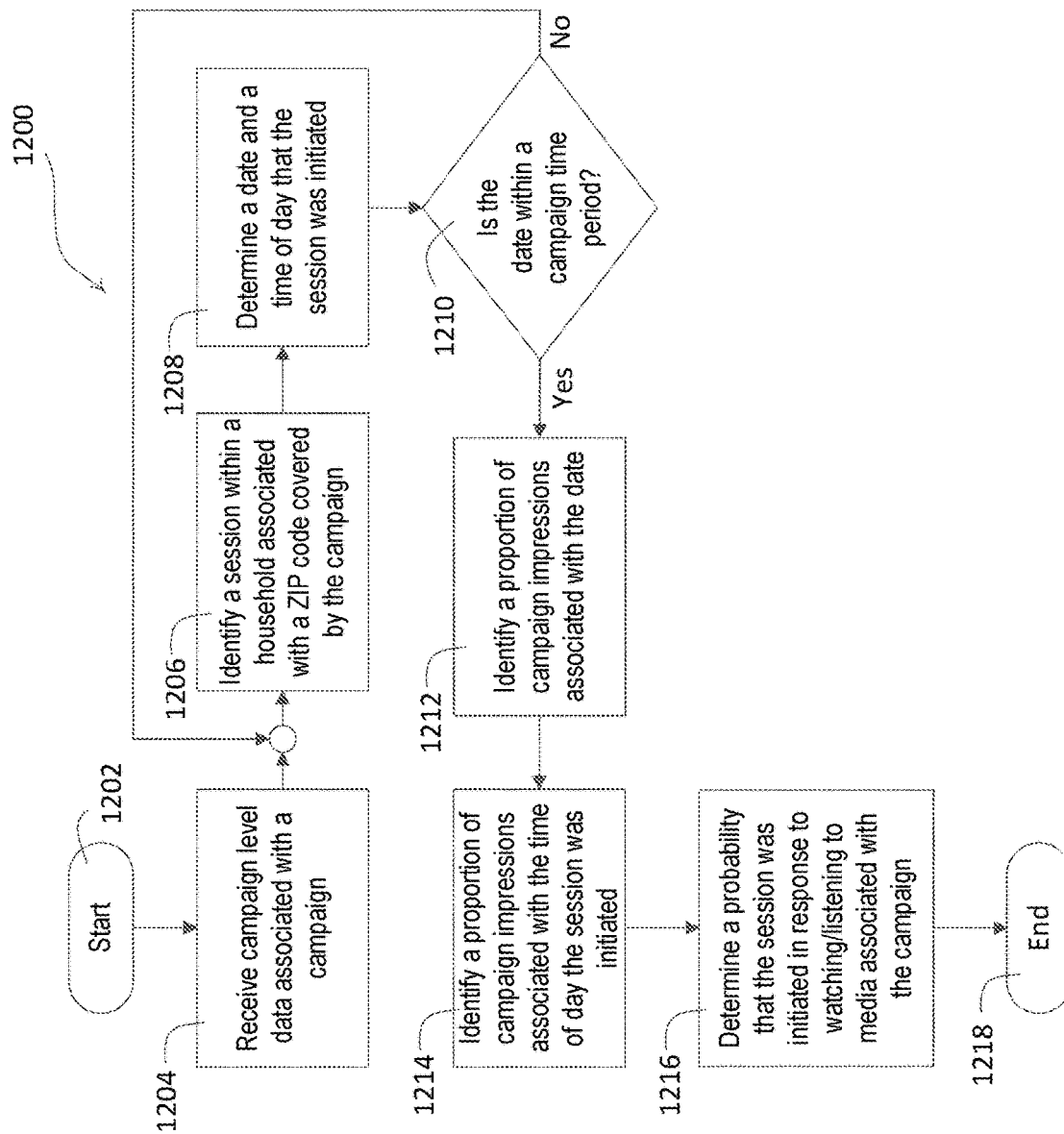
FIG. 12 is a flow diagram illustrating another example method for determining a probability that a browsing session was initiated in response to watching and/or listening to media associated with a campaign.

FIG. 12 is a flow diagram of an example method 1200 that may be implemented by one or more computing devices (e.g., such as the computing devices 230a-230n shown in FIG. 2) to determine a probability that a browsing session was initiated in response to watching and/or listening to media associated with a campaign. The method 1200, or portions thereof, may be performed to estimate an effectiveness of the campaign. For example, the method 1200, or portions thereof, may be performed to determine whether a user associated with the browsing session was influenced by media associated with the campaign to initiate the browsing session. The method 1200, or portions thereof, may be performed at a single computing device or may be distributed across multiple computing devices (e.g., multiple servers and/or a user device). The method 1200, or portions thereof, may be performed to enable the administrative users to quantify a likelihood that the user initiated the browser session and/or performed the transaction in response to watching and/or listening to media associated with the campaign. The method 1200 may comprise instructions that may be stored in memory as computer-readable or machine-readable storage media that may be executed by the one or more computing devices for executing the method 1200. The method 1200, or portions thereof, may improve the functionality of a computer network system (e.g., such as the computing network system 200 shown in FIG. 2) associated with engagement of the user. In addition, the method 1200, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s).

The method 1200 may start, at 1202, when a computing device (e.g., such as computing device 210 shown in FIG. 2) receives campaign level data associated with a campaign. The campaign may comprise one or more messages and/or media that share a theme. For example, the one or more messages and/or media may be associated with a product and/or brand. The one or more messages and/or media may be made available for consumption via mobile technology, television, radio, print, and/or online platforms. It may be desirable to identify whether online activity (e.g., a browser session, traffic to a website, a search query, an online purchase, and/or the like) was initiated by consumption of the one or more messages and/or media associated with the campaign. For example, identifying a likelihood that the online activity was initiated by the consumption of the one or more messages and/or media associated with the campaign may indicate a success of the campaign.

The campaign may be associated with a time period. For example, the campaign may be active during the time period. The campaign level data may include impression data over the time period. Stated differently, the campaign level data may indicate daily impressions (e.g., daily impression data) over the course of the campaign. For example, the campaign level data may indicate the number of impressions of media associated with the campaign in each of a plurality of sub-periods within the time period. The sub-periods may represent days, portions of a day, and/or the like. Example daily impression data for a campaign is shown in Table 2.

The campaign level data may include daypart blueprint data. The daypart blueprint data may represent aggregate daypart proportions of impressions for a plurality of (e.g., all) campaigns for which campaign level data is available to the computing device. The daypart blueprint data may be updated periodically (e.g., daily, weekly, monthly, etc.). The daypart proportions may indicate respective daypart proportions for the impressions from the plurality of campaigns. For example, the daypart blueprint data may indicate the percentage of impressions in each of a plurality of dayparts. Stated differently, the daypart proportions may include respective impression proportions of campaign impression for each of the plurality of dayparts. The dayparts may represent a pre-determined portion of a day, for example, such as overnight, early morning, daytime, early fringe, prime access, prime time, and/or late fringe. The daypart proportions may indicate when overall streaming habits. The daypart proportions may be used to assign a daypart factor to each of the dayparts. A table depicting example daypart blueprint data for a plurality of campaigns is shown in Table 3.

As illustrated in FIG. 12, a computing device (e.g., such as computing device 230a, 230b, or 230n shown in FIG. 2) may identify, at 1206, a browser session associated with a ZIP code covered by the campaign. For example, the browser session may have been initiated within a specific ZIP code. The campaign may cover (e.g., target) one or more ZIP codes (e.g., devices within the one or more ZIP codes). Each campaign may uniquely identify a set of ZIP codes to cover. The set of ZIP codes may be larger for campaigns aimed at a larger area. For example, local campaigns may cover a smaller area than regional campaigns and national campaigns may cover a larger area than regional campaigns. The computing device may use one or more of the methods disclosed herein to identify, at 1206, the ZIP code associated with the browser session. For example, the computing device may determine location data associated with the browser session. The computing device may determine a physical address for the browser session using the location data. The computing device may determine which ZIP code in which the physical address is located. The computing device may identify that, at 1206, that the determined ZIP code is covered by the campaign. The computing device may determine, at 1206, that a specific URL was visited during the browsing session. The specific URL may be associated with the campaign (e.g., a product, a brand, a service, etc. that is associated with the campaign).

The computing device may determine, at 1208, a date and a time of day that the browsing session was initiated. For example, the computing device may determine, at 1208, the date and the time of day that the browsing session was used to visit the specific URL. The computing device may analyze browsing session data to determine the date and time of day that the browsing session was initiated (e.g., to visit the specific URL).

The computing device may determine, at 1210, whether the date the browsing session was initiated is within a time period associated with the campaign. The time period associated with the campaign may be a time period during which the campaign is active. For example, the computing device may determine, at 1210, whether the date the browsing session was used to visit the specific URL within a time period during which the campaign is active. For example, the computing device may compare the date the browsing session was initiated against the dates within the time period (e.g., using the campaign level data). When the date the browsing session was initiated is outside of the time period during which the campaign is active, the method 1200 may return to 1206 to identify another browsing session.

When the computing device determines, at 1210, that the date the browsing session was initiated is within the time period during which the campaign is active, the computing device may identify, at 1212, a first impression proportion (e.g., a date proportion) for the date the browsing session was initiated. The date proportion may indicate a proportion of campaign impressions associated with the date the browsing session was initiated. For example, the computing device may analyze the campaign level data (e.g., the daily impression data) to determine the date proportion for the date the browsing session was initiated.

The computing device may identify, at 1214, a second impression proportion (e.g., a daypart proportion) for the time of day the session was initiated. The daypart proportion may indicate a proportion of campaign impressions associated with the time of day (e.g., daypart) associated with the date the browsing session was initiated. The computing device may analyze the campaign level data (e.g., the daypart blueprint data) to identify the daypart proportion for the time of day the browsing session was initiated. The daypart proportions may provide an overall approximation of general streaming habits. That is, the daypart proportions may indicate when users are most likely to stream audio and/or video.

At 1216, the computing device may determine a probability that the browsing session was initiated in response to watching and/or listening to media associated with the campaign. For example, the computing device may use the date proportion and the daypart proportion to determine, at 1216, the probability that the browsing session was initiated in response to watching and/or listening to media associated with the campaign. The daypart proportion may be associated with a daypart factor. For example, each of the dayparts may be assigned a daypart factor based on the associated proportion. The probability that the browsing session was initiated in response to watching and/or listening to media associated with the campaign may be calculated using Equation 1.

$$\text{probability} = \text{average}(\text{date proportion}, \text{daypart proportion}) * \text{daypart factor} \quad (1)$$

That is, the date proportion and the daypart proportion values may be averaged and then multiplied by the daypart factor (e.g., as shown in Equation 1) to determine, at 1216, the probability that the browsing session was initiated in response to watching and/or listening to media associated with the campaign. The method 1200 may end at 1218.

Figure 13:
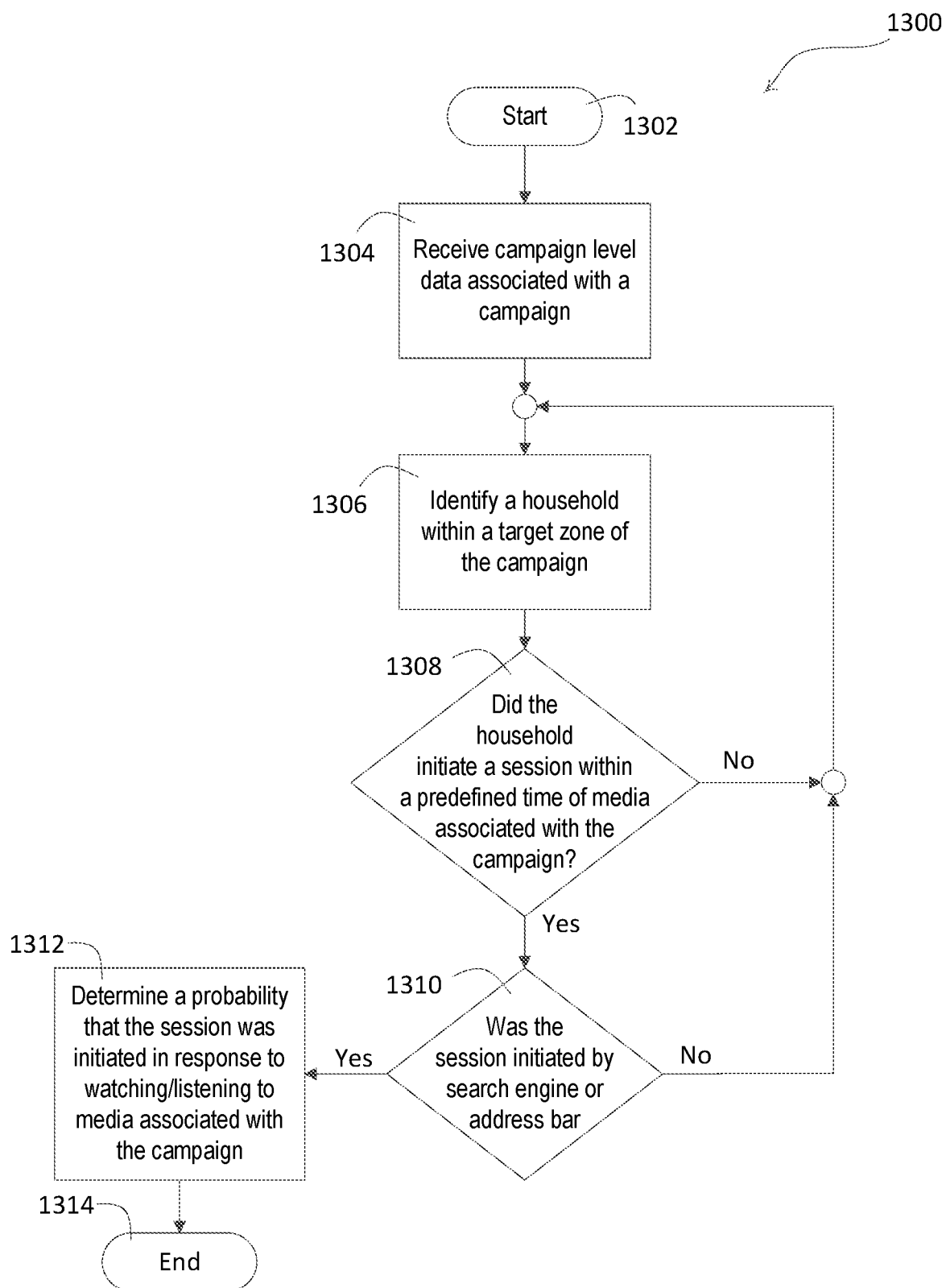
FIG. 13 is a flow diagram illustrating another example method for determining a probability that a browsing session was initiated in response to watching and/or listening to media associated with a campaign.

FIG. 13 is a flow diagram of an example method 1300 that may be implemented by one or more computing devices (e.g., such as the computing devices 230a-230n shown in FIG. 2) to determine a probability that a browsing session was initiated in response to watching and/or listening to media associated with a campaign. The method 1300, or portions thereof, may be used to affirmatively determine that a user watched and/or listened to one or more instances of media associated with the campaign. The method 1300, or portions thereof, may be performed to estimate an effectiveness of the campaign. For example, the method 1300, or portions thereof, may be performed to determine whether a user associated with the browsing session was influenced by media associated with the campaign to initiate the browsing session. The method 1300, or portions thereof, may be performed at a single computing device or may be distributed across multiple computing devices (e.g., multiple servers and/or a user device). The method 1300, or portions thereof, may be performed to enable the administrative users to quantify a likelihood that the user initiated the browser session in response to watching and/or listening to media associated with the campaign. The method 1300 may comprise instructions that may be stored in memory as computer-readable or machine-readable storage media that may be executed by the one or more computing devices for executing the method 1300. The method 1300, or portions thereof, may improve the functionality of a computer network system (e.g., such as the computing network system 200 shown in FIG. 2) associated with engagement of the user. In addition, the method 1300, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s).

The method 1300 may start, at 1302, when a computing device (e.g., such as computing device 210 shown in FIG. 2) receives campaign level data associated with a campaign. The campaign may comprise one or more messages and/or media that share a theme. For example, the one or more messages and/or media may be associated with a product and/or brand. The one or more messages and/or media may be made available for consumption via mobile technology, television, radio, print, and/or online platforms. It may be desirable to identify whether online activity (e.g., a browser session, traffic to a website, a search query, an online purchase, and/or the like) was initiated by consumption of the one or more messages and/or media associated with the campaign. For example, identifying a likelihood that the online activity was initiated by the consumption of the one or more messages and/or media associated with the campaign may indicate a success of the campaign.

The campaign may be associated with a time period. For example, the campaign may be active during the time period. The campaign level data may include impression data over the time period. Stated differently, the campaign level data may indicate daily impressions (e.g., daily impression data) over the course of the campaign. For example, the campaign level data may indicate the number of impressions of media associated with the campaign in each of a plurality of sub-periods within the time period. The sub-periods may represent days, portions of a day, and/or the like. Example daily impression data for a campaign is shown in Table 2.

The campaign level data may include daypart blueprint data. The daypart blueprint data may represent aggregate daypart proportions of impressions for a plurality of (e.g., all) campaigns for which campaign level data is available to the computing device. The daypart blueprint data may be updated periodically (e.g., daily, weekly, monthly, etc.). The daypart proportions may indicate respective daypart proportions for the impressions from the plurality of campaigns. For example, the daypart blueprint data may indicate the percentage of impressions in each of a plurality of dayparts. Stated differently, the daypart proportions may include respective impression proportions of campaign impression for each of the plurality of dayparts. The dayparts may represent a pre-determined portion of a day, for example, such as overnight, early morning, daytime, early fringe, prime access, prime time, and/or late fringe. The daypart proportions may indicate when overall streaming habits. The daypart proportions may be used to assign a daypart factor to each of the dayparts. A table depicting example daypart blueprint data for a plurality of campaigns is shown in Table 3.

As illustrated in FIG. 13, a computing device (e.g., such as computing device 230a, 230b, or 230n shown in FIG. 2) may identify, at 1306, a browser session associated with a ZIP code covered by the campaign. For example, the browser session may have been initiated within a specific ZIP code. The campaign may cover (e.g., target) one or more ZIP codes (e.g., devices within the one or more ZIP codes). Each campaign may uniquely identify a set of ZIP codes to cover. The set of ZIP codes may be larger for campaigns aimed at a larger area. For example, local campaigns may cover a smaller area than regional campaigns and national campaigns may cover a larger area than regional campaigns. The computing device may use one or more of the methods disclosed herein to identify, at 1306, the ZIP code associated with the browser session. For example, the computing device may determine location data associated with the browser session. The computing device may determine a physical address for the browser session using the location data. The computing device may determine which ZIP code in which the physical address is located. The computing device may identify that, at 1306, that the determined ZIP code is covered by the campaign. The computing device may determine, at 1306, that a specific URL was visited during the browsing session. The specific URL may be associated with the campaign (e.g., a product, a brand, a service, etc. that is associated with the campaign).

The computing device may determine, at 1308, whether the household (e.g., a user in the household) initiated a browsing session within a predefined time of consuming media associated with the campaign. The computing device may identify that a user consumed media associated with a campaign. The computing device may determine a household for the user, as described herein. The computing device may then search for any browsing sessions initiated by the user or another user in the same household after the user consumed the media. The computing device may identify whether the browsing session is associated with the campaign. For example, the browsing session may be associated with the campaign when the website visited and/or searched is related to a product, brand, service, etc. promoted by the campaign.

For example, the computing device may determine, at 1308, one or more browsing sessions initiated by one or more users in the household identified, at 1306. The computing device may determine, at 1308, whether any of the one or more browsing sessions were initiated within a predefined time of the respective user consuming media associated with the campaign. For example, the computing may determine a time at which the respective user consumed the media. The predefined time may represent a time represent a short-term memory period of an average person. For example, the predefined time may represent a period of time to which an activity performed by a user can be attributed to media consumed by the user. The predefined time may be based on brand recall and decaying probability of the user taking action after consuming media. For example, the predefined time may be based on a length of time at which a user's memory (e.g., impact) of the media has decayed below a threshold (e.g., an impact threshold). As the period of time between the consumption of media and the activity increases, it becomes more difficult to accurately attribute the activity with the consumption of the media. When a browsing session is initiated within the predefined time, a confidence that the activity is attributable to the consumed media is greater than when the activity is performed outside the predefined time. When the computing device determines, at 1308, that the browsing session was initiated outside (e.g., after) the predefined time, the method 1300 may return to 1306 to identify another browsing session.

When the household initiates the browsing session within a predefined time of consuming media associated with the campaign, the computing device may determine, at 1310, whether the browsing session initiated by a search engine or address bar (e.g., entering a URL into a browser address bar). Initiating a browser session via a search engine may be referred to as organic traffic. Initiating a browser session via address bar may be referred to as direct traffic. Organic traffic and direct traffic may indicate that a user initiated the browser session with the intent to visit a specific website or a website associated with a specific product or brand. When the computing device determines, at 1310, that the browsing session was not initiated by a search engine or address bar, the method 1300 may return to 1306 to identify another browsing session.

When the computing device determines, at 1310, that the browsing session was initiated by a search engine or address bar, the computing device may determine, at 1312, a probability that the browsing session was initiated in response to watching and/or listening to media associated with the campaign. For example, the computing device may use the campaign level data to determine the probability that the browsing session was initiated in response to watching and/or listening to media associated with the campaign. The probability determined, at 1312, may be based on a time delay between watching and/or listening to the media associated with the campaign and initiation of the browsing session. The longer the user waits to initiate the browsing session, the lower the probability that the browsing session was initiated in response to the user watching and/or listening to the media associated with the campaign. For example, the probability may be determined, at 1312, based on an amount of time delay from when the media associated with the campaign was watched and/or listened to. An example probability time decay for a plurality of time delays is shown in Table 4.

TABLE 4

Example Probability Time Decay

| Time Delay (hours) | Traditional Cable | Cord Cutter |
|---|---|---|
| 1 | 99.00% | 65.34% |
| 2 | 97.00% | 64.02% |
| 3 | 95.00% | 62.70% |
| 4 | 93.00% | 61.38% |
| 5 | 90.00% | 59.40% |
| 6 | 87.00% | 57.42% |
| 7 | 82.00% | 54.12% |
| 8 | 77.00% | 50.82% |
| 9 | 70.00% | 46.20% |
| 10 | 57.00% | 37.62% |
| 11 | 40.00% | 26.40% |
| 12 | 15.00% | 9.90% |

As shown in Table 4, the time delay may result in a non-linear relationship with the probability. The non-linear relationship may depend on whether the user (e.g., or the user's household) is a traditional cable television customer or is a cord-cutter customer with a streaming television service. For example, the probability at each of a plurality of time delays may be adjusted by a first time decay factor when the household is a traditional cable television customer and a second time decay factor when the household is a cord-cutter customer. Stated differently, each hour threshold in time delay may be associated with a traditional time decay factor and a cord-cutter time decay factor. The respective time decay factors may represent the respective probability, for the respective time delay household customer type combination, that the user initiated the browsing session in response to watching and/or listening to the media associated with the campaign. The computing device may determine, at 1312, the probability that the browsing session was initiated in response to watching and/or listening to media associated with the campaign using time delay data, for example, as shown in Table 4. The method 1300 may end at 1312.

Figure 14:
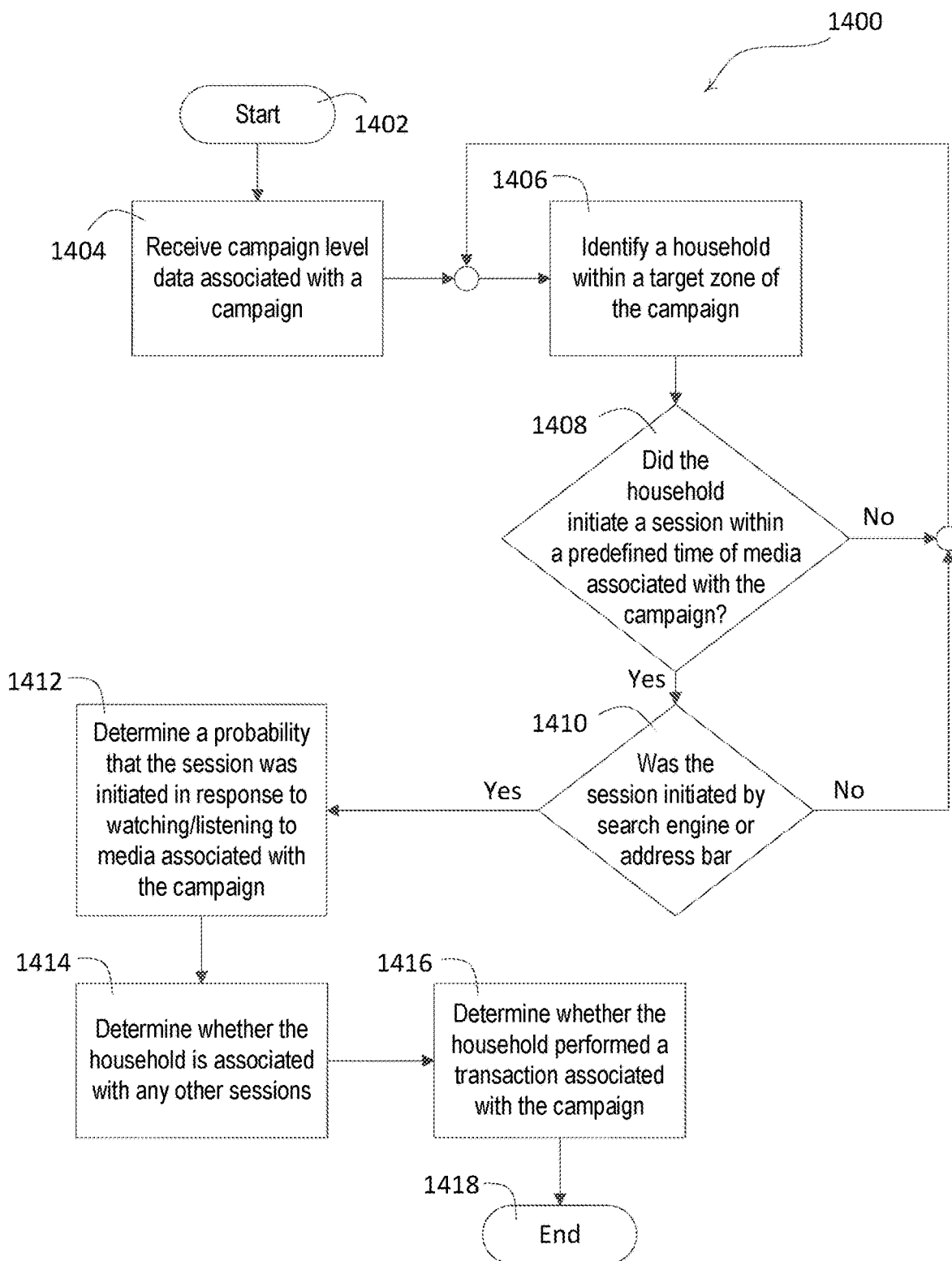
FIG. 14 is a flow diagram illustrating another example method for determining a probability that a browsing session was initiated in response to watching and/or listening to media associated with a campaign.

FIG. 14 is a flow diagram of an example method 1400 that may be implemented by one or more computing devices (e.g., such as the computing devices 230a-230n shown in FIG. 2) to determine a probability that a browsing session was initiated in response to watching and/or listening to media associated with a campaign. The method 1400, or portions thereof, may be performed to estimate an effectiveness of the campaign. The method 1400, or portions thereof, may affirmatively determine that a user watched and/or listened to media associated with the campaign. For example, the method 1400, or portions thereof, may be performed to determine whether a user associated with the browsing session was influenced by media associated with the campaign to initiate the browsing session. The method 1400, or portions thereof, may be performed at a single computing device or may be distributed across multiple computing devices (e.g., multiple servers and/or a user device). The method 1400, or portions thereof, may be performed to enable the administrative users to quantify a likelihood that the user initiated the browser session in response to watching and/or listening to media associated with the campaign. The method 1400 may comprise instructions that may be stored in memory as computer-readable or machine-readable storage media that may be executed by the one or more computing devices for executing the method 1400. The method 1400, or portions thereof, may improve the functionality of a computer network system (e.g., such as the computing network system 200 shown in FIG. 2) associated with engagement of the user. In addition, the method 1400, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s).

The method 1400 may start, at 1402, when a computing device (e.g., such as computing device 210 shown in FIG. 2) receives campaign level data associated with a campaign. The campaign may comprise one or more messages and/or media that share a theme. For example, the one or more messages and/or media may be associated with a product and/or brand. The one or more messages and/or media may be made available for consumption via mobile technology, television, radio, print, and/or online platforms. It may be desirable to identify whether online activity (e.g., a browser session, traffic to a website, a search query, an online purchase, and/or the like) was initiated by consumption of the one or more messages and/or media associated with the campaign. For example, identifying a likelihood that the online activity was initiated by the consumption of the one or more messages and/or media associated with the campaign may indicate a success of the campaign.

The campaign may be associated with a time period. For example, the campaign may be active during the time period. The campaign level data may include impression data over the time period. Stated differently, the campaign level data may indicate daily impressions (e.g., daily impression data) over the course of the campaign. For example, the campaign level data may indicate the number of impressions of media associated with the campaign in each of a plurality of sub-periods within the time period. The sub-periods may represent days, portions of a day, and/or the like. Example daily impression data for a campaign is shown in Table 2.

The campaign level data may include daypart blueprint data. The daypart blueprint data may represent aggregate daypart proportions of impressions for a plurality of (e.g., all) campaigns for which campaign level data is available to the computing device. The daypart blueprint data may be updated periodically (e.g., daily, weekly, monthly, etc.). The daypart proportions may indicate respective daypart proportions for the impressions from the plurality of campaigns. For example, the daypart blueprint data may indicate the percentage of impressions in each of a plurality of dayparts. Stated differently, the daypart proportions may include respective impression proportions of campaign impression for each of the plurality of dayparts. The dayparts may represent a pre-determined portion of a day, for example, such as overnight, early morning, daytime, early fringe, prime access, prime time, and/or late fringe. The daypart proportions may indicate when overall streaming habits. The daypart proportions may be used to assign a daypart factor to each of the dayparts. A table depicting example daypart blueprint data for a plurality of campaigns is shown in Table 3.

As illustrated in FIG. 14, a computing device (e.g., such as computing device 230*a*, 230*b*, or 230*n* shown in FIG. 2) may identify, at 1406, a browser session associated with a ZIP code covered by the campaign. For example, the browser session may have been initiated within a specific ZIP code. The campaign may cover (e.g., target) one or more ZIP codes (e.g., devices within the one or more ZIP codes). Each campaign may uniquely identify a set of ZIP codes to cover. The set of ZIP codes may be larger for campaigns aimed at a larger area. For example, local campaigns may cover a smaller area than regional campaigns and national campaigns may cover a larger area than regional campaigns. The computing device may use one or more of the methods disclosed herein to identify, at 1406, the ZIP code associated with the browser session. For example, the computing device may determine location data associated with the browser session. The computing device may determine a physical address for the browser session using the location data. The computing device may determine which ZIP code in which the physical address is located. The computing device may identify that, at 1406, that the determined ZIP code is covered by the campaign. The computing device may determine, at 1406, that a specific URL was visited during the browsing session. The specific URL may be associated with the campaign (e.g., a product, a brand, a service, etc. that is associated with the campaign).

The computing device may determine, at 1408, whether the household (e.g., a user in the household) initiated a browsing session within a predefined time of consuming media associated with the campaign. The computing device may identify that a user consumed media associated with a campaign. The computing device may determine a household for the user, as described herein. The computing device may then search for any browsing sessions initiated by the user or another user in the same household after the user consumed the media. The computing device may identify whether the browsing session is associated with the campaign. For example, the browsing session may be associated with the campaign when the website visited and/or searched is related to a product, brand, service, etc. promoted by the campaign.

For example, the computing device may determine, at 1408, one or more browsing sessions initiated by one or more users in the household identified, at 1406. The computing device may determine, at 1408, whether any of the one or more browsing sessions were initiated within a predefined time of the respective user consuming media associated with the campaign. For example, the computing may determine a time at which the respective user consumed the media. The predefined time may represent a time represent a short-term memory period of an average person. For example, the predefined time may represent a period of time to which an activity performed by a user can be attributed to media consumed by the user. When a browsing session is initiated within the predefined time, a confidence that the activity is attributable to the consumed media is greater than when the activity is performed outside the predefined time. When the computing device determines, at 1408, that the browsing session was initiated outside (e.g., after) the predefined time, the method 1400 may return to 1406 to identify another browsing session.

When the household initiates the browsing session within a predefined time of consuming media associated with the campaign, the computing device may determine, at 1410, whether the browsing session initiated by a search engine or address bar (e.g., entering a URL into a browser address bar). Initiating a browser session via a search engine may be referred to as organic traffic. Initiating a browser session via address bar may be referred to as direct traffic. Organic traffic and direct traffic may indicate that a user initiated the browser session with the intent to visit a specific website or a website associated with a specific product or brand. When the computing device determines, at 1410, that the browsing session was not initiated by a search engine or address bar, the method 1400 may return to 1406 to identify another browsing session.

When the computing device determines, at 1410, that the browsing session was initiated by a search engine or address bar, the computing device may determine, at 1412, a probability that the browsing session was initiated in response to watching and/or listening to media associated with the campaign. For example, the computing device may use the campaign level data to determine the probability that the browsing session was initiated in response to watching and/or listening to media associated with the campaign. The probability determined, at 1412, may be based on a time delay between watching and/or listening to the media associated with the campaign and initiation of the browsing session. The longer the user waits to initiate the browsing session, the lower the probability that the browsing session was initiated in response to the user watching and/or listening to the media associated with the campaign. For example, the probability may be determined, at 1412, based on an amount of time delay from when the media associated with the campaign was watched and/or listened to. An example probability time decay for a plurality of time delays is shown in Table 4.

As shown in Table 4, the time delay may result in a non-linear relationship with the probability. The non-linear relationship may depend on whether the user (e.g., or the user's household) is a traditional cable television customer or is a cord-cutter customer with a streaming television service. For example, the probability at each of a plurality of time delays may be adjusted by a first time decay factor when the household is a traditional cable television customer and a second time decay factor when the household is a cord-cutter customer. Stated differently, each hour threshold in time delay may be associated with a traditional time decay factor and a cord-cutter time decay factor. The respective time decay factors may represent the respective probability, for the respective time delay household customer type combination, that the user initiated the browsing session in response to watching and/or listening to the media associated with the campaign. The computing device may determine, at 1412, the probability that the browsing session was initiated in response to watching and/or listening to media associated with the campaign using time delay data, for example, as shown in Table 4.

The computing device may determine, at 1414, whether the household is associated with any other browsing sessions. For example, the computing device may determine, at 1414, whether any users in the household initiated any other browsing sessions that are associated with the campaign. For example, the user who initiated the browsing session may initiate another browsing session to revisit a URL (e.g., the specific URL), visit a related URL, and/or visit another URL associated with the campaign. Additionally or alternatively, another member of the same household as the user may initiate another browsing session to visit the URL (e.g., the specific URL) that the user visited, visit a related URL, and/or visit another URL associated with the campaign. For example, the user who initiated the initial browsing session determined at 1408 may discuss the URL (e.g., the specific URL), the product, the service, etc. with another member of their household which may result in the other member of the household initiating a browsing session, for example, to visit the URL (e.g., the specific URL) and/or research the product, the service, etc. When the computing device identifies that the household is associated with one or more other browsing sessions associated with the campaign, the computing device may adjust a confidence rating, as described herein. For example, additional household browsing sessions associated with the campaign may increase the confidence rating associated with the product, service, etc.

The computing device may determine, at 1416, whether the household performed a transaction associated with the campaign. For example, the campaign may be associated with a product or brand, as described herein. The computing device may determine, at 1416, whether a user in the household purchased the product. Additionally or alternatively, the campaign may be associated with one or more other transactions that include content available for purchase, content available for streaming, a subscription service, another type of service, deposited money with a banking service, downloaded an application and/or the like. Determining whether the household performed a transaction associated with the campaign may provide further support for determining a success of the campaign. For example, the determination, at 1416, may be aggregated with similar determinations associated with transactions performed by other users to determine the success of the campaign. The method 1400 may end at 1412.

Figure 15:
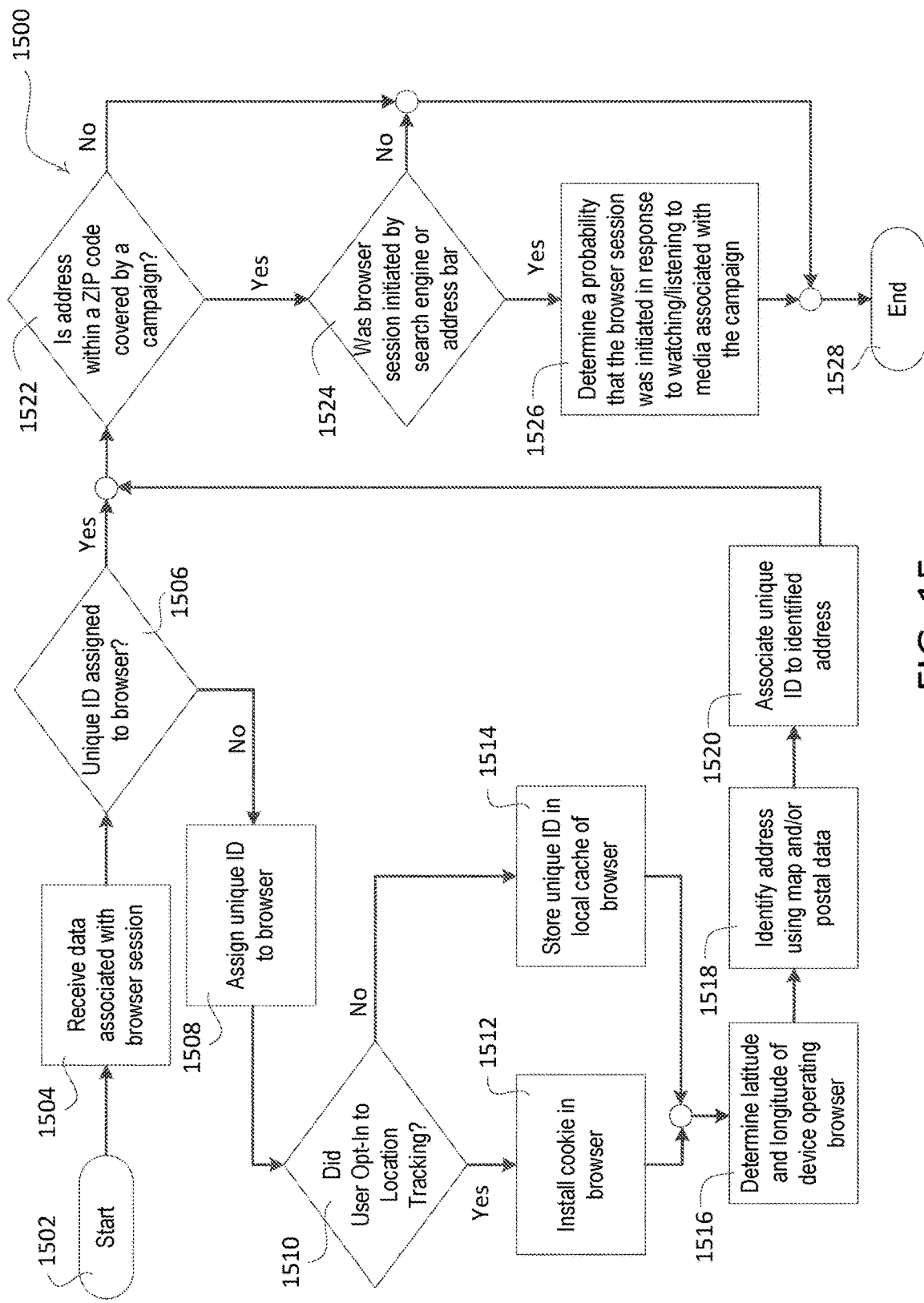
FIG. 15 is a flow diagram illustrating an example method for associating a unique identifier with a physical address associated with a user and then determining a probability that that user initiated a browser session in response to watching and/or listening media associated with a campaign.

FIG. 15 is a flow diagram of an example method 1500 that may be implemented by one or more computing devices (e.g., such as the computing devices 230*a*-230*n* shown in FIG. 2) to associate a unique identifier with a physical address associated with a user and then determine a probability that that user initiated a browser session in response to watching and/or listening media associated with a campaign. The method 1500, or portions thereof, may be performed to enable engagement with the user based on one or more visits to a URL. Engagement with the user may include sending notification(s) to the user, determining one or more advertisements for the user, track service needs for a vehicle operated by the user or someone in the user's household, and/or the like. The notification(s) may include emails, text messages, mobile phone notifications, phone calls, advertisements, and/or the like. The method 1500, or portions thereof, may be performed to estimate an effectiveness of the campaign. For example, the method 1500, or portions thereof, may be performed to determine whether a user associated with the browsing session was influenced by media associated with the campaign to initiate the browsing session. The method 1500, or portions thereof, may be performed at a single computing device or may be distributed across multiple computing devices (e.g., multiple servers and/or a user device). The method 1500, or portions thereof, may be performed to enable users, such as administrative users, to determine that the user has a specific interest in one or more products. The method 1500, or portions thereof, may be performed to enable the administrative users to quantify the user's interest in the product(s). The method 1500, or portions thereof, may be performed to enable adaptive generation of notifications to the user based on the specific interest in the product(s) and/or the physical address associated with the user. The method 1500, or portions thereof, may reduce the amount of processing resources used by the computing device during a predetermined period (e.g., day). The method 1500 may comprise instructions that may be stored in memory as computer-readable or machine-readable storage media that may be executed by the one or more computing devices for executing the method 1500. The method 1500, or portions thereof, may improve the functionality of a computer network system (e.g., such as the computing network system 200 shown in FIG. 2) associated with engagement of the user. In addition, the method 1500, or portions thereof, may implement a distributed network architecture, as shown in FIG. 2, which may reduce the amount of signaling between a user computing device and one or more administrative computing devices (e.g., such as the computing devices 230*a*, 230*b*, 230*n* shown in FIG. 2) and may reduce the amount of processing resources consumed by the administrative computing device(s). The method 1500, or portions thereof, may enable tracking of a user without the use of tracking cookies.

The method 1500 may start, at 1502, when a user computing device (e.g., such as computing device 210 shown in FIG. 2) accesses a URL. For example, a user may initialize a browser application on the user computing device and may navigate to the URL within the browser application using a browser session.

As illustrated in FIG. 15, a computing device (e.g., such as computing device 230*a*, 230*b*, or 230*n* shown in FIG. 2) may receive, at 1504, data from the browser session on the user computing device. The computing device may be associated with the URL. For example, the computing device may be a server that administers and/or manages a resource associated with the URL. The data may be associated with the user, the user computing device, and/or the browser application associated with the browser session. The data may be anonymous data (e.g., data that includes no personally identifiable information associated with the user). The anonymous data may include a time, a date, a webpage URL, a referring URL, a browser type, a language, an IP address, and/or location data. The computing device may determine a device type based on the browser type. For example, the computing device may determine whether the user computing device is a mobile device based on the browser type. The location data may include a latitude coordinate, a longitude coordinate, and/or a device accuracy indication. The device accuracy indication may indicate the accuracy associated with the user computing device's measurements of the latitude coordinate and the longitude coordinate. For example, the device accuracy indication may indicate the accuracy of the user computing device's GPS (e.g., such as the GPS 114 shown in FIG. 1). The device accuracy may depend on the device type. For example, a mobile device may indicate a device accuracy of approximately 2 meters or less and a computer that accesses the URL via a router may indicate a device accuracy of approximately 70 meters. The anonymous data may be included in a header (e.g., a HTTP request header) received from the user computing device, included in the IP address of the user computing device, included in scripts at the application-level, etc.

The computing device may determine, at 1506, whether there is a unique identifier that is associated with the user (e.g., the user computing device, the browser, and/or the browser session) stored on the computing device. The computing device may determine that there is no unique identifier associated with the user computing device when there is no location data stored for the user computing device. For example, the computing device may access a database or other storage location that maintains a mapping of unique identifier to a browser session, a user computing device, and/or location data. Additionally or alternatively, the computing device may determine whether there is a unique identifier for associated with the user based on presence of a tracker (e.g., cookie) installed in the browser application on the user computing device. The tracker may include the unique identifier associated with the user. The tracker may have been installed in the user's browser application (e.g., by the computing device) during a previous visit to the URL via the user's browser application, for example, if the user opted-in to location tracking, as described herein. When the computing device determines, at 1506, that a unique ID is assigned to the browser, the method 1500 may proceed to 1522.

When the computing device determines that there is no unique identifier assigned to the user, the computing device may be configured to generate, at 1508, a unique identifier for the user. The unique identifier may be generated randomly. The unique identifier may be universally unique. That is, the unique identifier may be unique for all browsers, all device types, all locations, etc. Alternatively, the unique identifier may be parsed from the data received in the browser session. Stated differently, the computing device may determine the unique identifier for the user based on the data received, at 1504, via the browser session.

The computing device may determine, at 1510, whether the user opted-in to location tracking. For example, the user may be asked to opt-in to location tracking when accessing the URL. The user may respond to a prompt by opting in or opting out to location tracking.

When the user opts-in to location tracking, the computing device may install, at 1510 a tracker (e.g., a cookie) in the browser application on the user computing device. The cookie may be configured to enable the computing device to retrieve geo-location data from the user computing device. The cookie may enable the computing device to recognize return visits by the user computing device. The cookie (e.g., a tracking cookie, browser cookie, HTTP cookie, etc.) may include a small string or segment of text that may be transmitted to the user computing device and stored at the user computing device by a browser application. For example, the cookie may include one or more name-value pairs containing bits of information such as, user preferences, an identifier (e.g., the unique ID assigned at 1508) for a server-based user session, and/or other data used by the computing device (e.g., a server and/or website). The cookie may be used for authenticating, session tracking (e.g., state maintenance), and/or for tracking specific information about a user, such as site preferences, and/or to maintain data related to the user and/or user computing device during navigation. The cookie may be sent in an HTTP header by the computing device to the browser application at the user computing device. The cookie may be sent back to the computing unchanged by the browser application, for example, each time the browser application accesses the URL, introducing state into what may be otherwise stateless HTTP transactions. The computing device may set the cookie at the user computing device in response to a request for a target website (e.g., the URL), the computing device may generate and transmit an HTTP response that includes an HTTP header that includes the parameters for the cookie (e.g., in the form of text) and/or code (e.g., Set-Cookie) requesting the browser application to set the cookie based on the parameters in the HTTP header.

When the user opts-out of location tracking, the computing device may store, at 1514, a unique ID (e.g., the unique ID assigned at 1508) in a local cache of the user computing device (e.g., of the browser). The unique ID may be stored in the local browser cache, for example, even if the user computing device does not allow cookies (e.g., full cookies). Storing the unique ID in the local browser cache may enable the computing device to recognize return visits by the user computing device via the browser application. The unique ID may be used for authenticating, session tracking (e.g., state maintenance), and/or for tracking specific information about a user, such as site preferences, and/or to maintain data related to the user and/or user computing device during navigation. The unique ID may be sent in an HTTP header by the computing device to the browser application at the user computing device. The computing device may store the unique ID in the local browse cache at the user computing device in response to a request for a target website (e.g., the URL). The user computing device may store the unique ID as key/value (e.g., string to string) in the local browser cache. The unique ID may enable persistence across browser sessions. For example, the unique ID may be recognizable in subsequent browser sessions. The unique ID may remain in the local browser cache, for example, until the local browser cache is explicitly cleared. Storing the unique ID in the local browser cache may not be persistent across browser applications. For example, the unique ID stored in the local browser cache of a one browser application may not be accessible from another browser application.

The computing device may determine, at 1516, a latitude coordinate and a longitude coordinate of the user computing device. For example, the data received from the browser session may include the latitude and longitude coordinates of the user computing device, as described herein. The computing device may use the latitude and longitude coordinates to track a user. Use of the latitude and longitude coordinates for tracking may improve device and/or network security, for example, by eliminating the need for cookies to track the user.

The computing device may determine, at 1518, a physical address (e.g., a postal address) for the browser session using the location data. The physical address may indicate a postal address at which the user accessed the URL in the browser session. For example, the computing device may generate, at 1518, the physical address using a map API (e.g., such as Bing Maps API, Mapbox API, OpenStreetMap API, Leaflet API, OpenLayers API, Google Maps API, and/or another map API). For example, the computing device may translate, at 1514, the received latitude and longitude coordinates into the physical address using the map API.

The computing device may determine an address type (e.g., residential, apartment/condo building, single family home, commercial, and/or the like) based on the physical address. For example, the computing device may determine the address type using a postal service API. The computing device may use the address type to determine a type and/or frequency of notifications sent to the user. The computing device may determine other user information based on the physical address such as a name associated with the user, an age of the user, a gender of the user, demographics associated with the user, and/or psychographics associated with the user. The demographics associated with the user may include race, marital status, household size, occupation, income, education, and/or living status. The psychographics associated with the user may include personality traits, lifestyles, interests, opinions, beliefs, values, etc. The computing device may determine the type and/or the frequency of notifications sent to the user based on the other information. The computing device may determine the content of the notifications based on the other information.

At 1520, the computing device may associate the generated unique identifier with the determined location data. For example, the computing device may map, at 1520, the unique identifier to the location data (e.g., physical address). The mapping between the unique identifier and the location data may enable identification of future visits to the URL by the user. The mapping between the unique identifier and the location data may enable an administrative user to identify who is accessing specific URLs, for example, with or without the use of cookies. For example, the unique identifier and location data may enable convergence of an online and offline footprint for a user.

The computing device may generate a profile for the user, for example, based on the association between the unique identifier and the location data. The user profile may be used to track a plurality of factors associated with the user and the user's activity. For example, the user profile may track which URLs the user accesses, the frequency with which the user accesses the URL(s), demographics associated with the user, the address(es) associated with the user, etc. For example, the computing device may associate multiple unique identifiers having the same location data with the same user profile. The user profile may be used to generate a targeted marketing campaign. When the unique ID is associated, at 1520, to the identified address, the method 1500 may proceed to 1522.

The computing device may determine, at 1522, whether the address associated with the unique ID is within a ZIP code covered by the campaign. For example, the browser session may have been initiated within a specific ZIP code. The campaign may cover (e.g., target) one or more ZIP codes (e.g., devices within the one or more ZIP codes). Each campaign may uniquely identify a set of ZIP codes to cover. The set of ZIP codes may be larger for campaigns aimed at a larger area. For example, local campaigns may cover a smaller area than regional campaigns and national campaigns may cover a larger area than regional campaigns. The computing device may use one or more of the methods disclosed herein to determine, at 1522, whether the address associated with the unique ID is within a ZIP code covered by the campaign. When the computing device determines, at 1522, that the address is within a ZIP code covered by the campaign, the method 1500 may proceed to 1524. When the computing device determines, at 1522, that the address is within a ZIP code not covered by the campaign, the method 1500 may proceed to 1528.

The computing device may determine, at 1524, whether the browsing session initiated by a search engine or address bar (e.g., entering a URL into a browser address bar). Initiating a browser session via a search engine may be referred to as organic traffic. Initiating a browser session via address bar may be referred to as direct traffic. Organic traffic and direct traffic may indicate that a user initiated the browser session with the intent to visit a specific website or a website associated with a specific product or brand. When the computing device determines, at 1524, that the browsing session was not initiated by a search engine or address bar, the method may proceed to 1528.

When the computing device determines, at 1524, that the browsing session was initiated by a search engine or address bar, the computing device may determine, at 1526, a probability that the browsing session was initiated in response to watching and/or listening to media associated with the campaign. For example, the computing device may use the campaign level data to determine the probability that the browsing session was initiated in response to watching and/or listening to media associated with the campaign. The method 1500 may end, at 1528.

Figure 16:
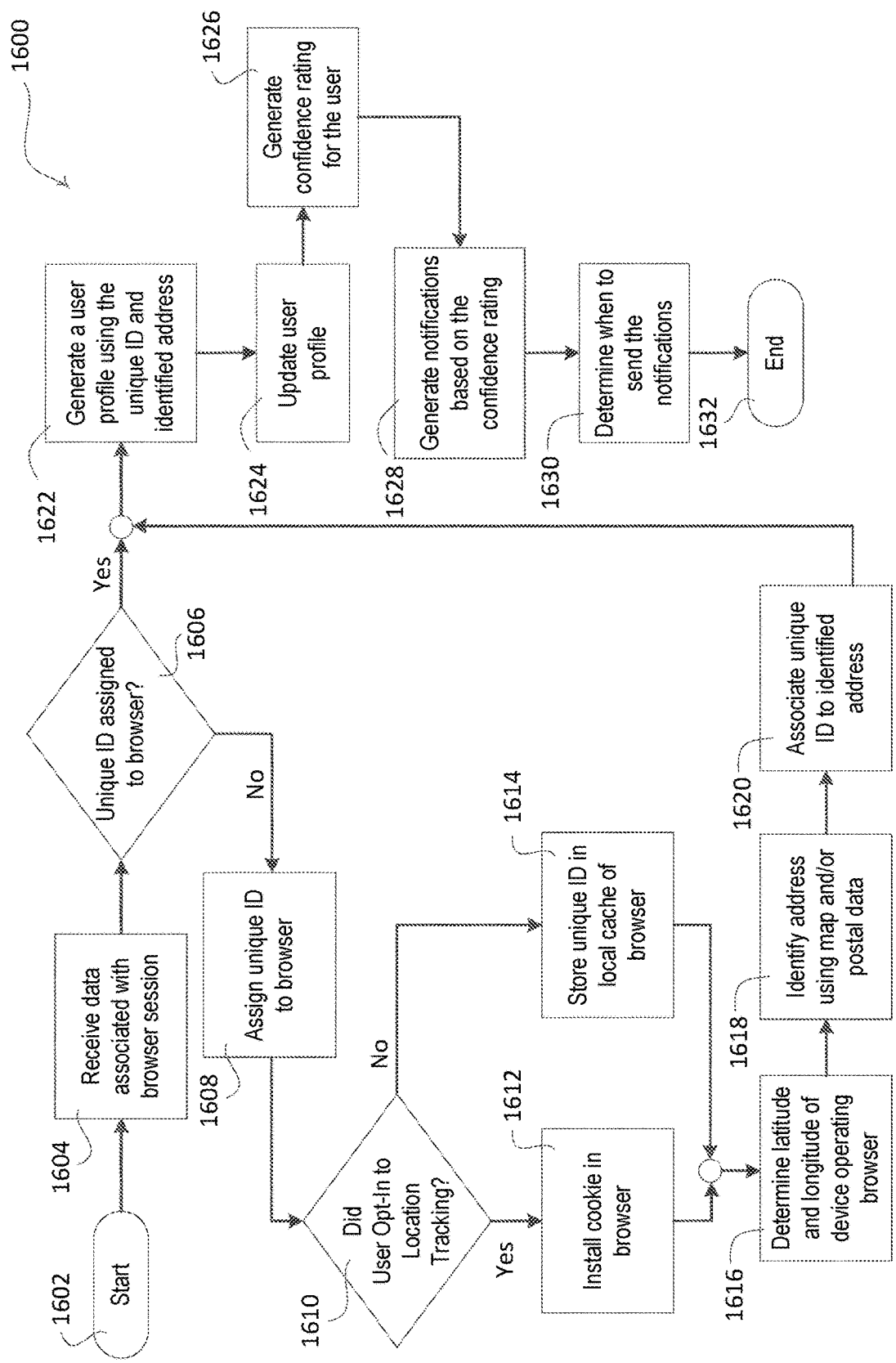
FIG. 16 is a flow diagram illustrating an example method for associating a unique identifier with a physical address associated with a user and then determining when to send notifications to the user.

FIG. 16 is a flow diagram illustrating an example method 1600 that may be implemented by one or more computing devices (e.g., such as the computing devices 230a-230n shown in FIG. 2) for associating a unique identifier with a physical address associated with a user and then determining when to send notifications to the user. The method 1600, or portions thereof, may be performed to enable engagement with the user based on one or more visits to a URL. Engagement with the user may include sending notification(s) to the user, determining one or more advertisements for the user, track service needs for a vehicle operated by the user or someone in the user's household, and/or the like. The notification(s) may include emails, text messages, mobile phone notifications, phone calls, advertisements, and/or the like. The method 1600, or portions thereof, may be performed at a single computing device or may be distributed across multiple computing devices (e.g., multiple servers and/or a user device). The method 1600, or portions thereof, may be performed to enable users, such as administrative users, to determine that the user has a specific interest in one or more products. The method 1600, or portions thereof, may be performed to enable the administrative users to quantify the user's interest in the product(s). The method 1600, or portions thereof, may be performed to enable adaptive generation of notifications to the user based on the specific interest in the product(s) and/or the physical address associated with the user. The method 1600, or portions thereof, may reduce the amount of processing resources used by the computing device during a predetermined period (e.g., day). The method 1600 may comprise instructions that may be stored in memory as computer-readable or machine-readable storage media that may be executed by the one or more computing devices for executing the method 1600. The method 1600, or portions thereof, may improve the functionality of a computer network system (e.g., such as the computing network system 200 shown in FIG. 2) associated with engagement of the user. In addition, the method 1600, or portions thereof, may implement a distributed network architecture, as shown in FIG. 2, which may reduce the amount of signaling between a user computing device and one or more administrative computing devices (e.g., such as the computing devices 230*a*, 230*b*, 230*n* shown in FIG. 2) and may reduce the amount of processing resources consumed by the administrative computing device(s). The method 1600, or portions thereof, may enable tracking of a user without the use of tracking cookies.

The method 1600 may start, at 1602, when a user computing device (e.g., such as computing device 210 shown in FIG. 2) accesses a URL. For example, a user may initialize a browser application on the user computing device and may navigate to the URL within the browser application using a browser session.

As illustrated in FIG. 16, a computing device (e.g., such as computing device 230*a*, 230*b*, or 230*n* shown in FIG. 2) may receive, at 1604, data from the browser session on the user computing device. The computing device may be associated with the URL. For example, the computing device may be a server that administers and/or manages a resource associated with the URL. The data may be associated with the user, the user computing device, and/or the browser application associated with the browser session. The data may be anonymous data (e.g., data that includes no personally identifiable information associated with the user) associated with the browser session. The anonymous data may include a time, a date, a webpage URL, a referring URL, a browser type, a language, an IP address, and/or location data. The computing device may determine a device type based on the browser type. For example, the computing device may determine whether the user computing device is a mobile device based on the browser type. The location data may include a latitude coordinate, a longitude coordinate, and/or a device accuracy indication. The device accuracy indication may indicate the accuracy associated with the user computing device's measurements of the latitude coordinate and the longitude coordinate. For example, the device accuracy indication may indicate the accuracy of the user computing device's GPS (e.g., such as the GPS 114 shown in FIG. 1). The device accuracy may depend on the device type. For example, a mobile device may indicate a device accuracy of approximately 2 meters or less and a computer that accesses the URL via a router may indicate a device accuracy of approximately 70 meters. The anonymous data may be included in a header (e.g., a HTTP request header) received from the user computing device, included in the IP address of the user computing device, included in scripts at the application-level, etc.

The computing device may determine, at 1606, whether there is a unique identifier that is associated with the user (e.g., the user computing device, the browser, and/or the browser session) stored on the computing device. The computing device may determine that there is no unique identifier associated with the user computing device when there is no location data stored for the user computing device. For example, the computing device may access a database or other storage location that maintains a mapping of unique identifier to a browser session, a user computing device, and/or location data. Additionally or alternatively, the computing device may determine whether there is a unique identifier for associated with the user based on presence of a tracker (e.g., cookie) installed in the browser application on the user computing device. The tracker may include the unique identifier associated with the user. The tracker may have been installed in the user's browser application (e.g., by the computing device) during a previous visit to the URL via the user's browser application, for example, if the user opted-in to location tracking, as described herein. When the computing device determines, at 1606, that a unique ID is assigned to the browser, the method 1600 may proceed to 1622.

When the computing device determines that there is no unique identifier assigned to the user, the computing device may be configured to assign (e.g., generate), at 1608, a unique identifier for the user. The unique identifier may be generated randomly. The unique identifier may be universally unique. That is, the unique identifier may be unique for all browsers, all device types, all locations, etc. Alternatively, the unique identifier may be parsed from the data received in the browser session. Stated differently, the computing device may determine the unique identifier for the user based on the data received, at 1604, via the browser session.

The computing device may determine, at 1610, whether the user opted-in to or out of location tracking. For example, the user may be asked to opt-in to location tracking when accessing the URL. The user may respond to a prompt by opting in or opting out to location tracking. The computing device may determine, at 1610, whether the user opted-in to or out of location tracking based on whether a location tracker is installed on the user computing device.

When the user opts-in to location tracking, the computing device may install, at 1610 a tracker (e.g., a cookie) in the browser application on the user computing device. The cookie may be configured to enable the computing device to retrieve geo-location data from the user computing device. The cookie may enable the computing device to recognize return visits by the user computing device. The cookie (e.g., a tracking cookie, browser cookie, HTTP cookie, etc.) may include a small string or segment of text that may be transmitted to the user computing device and stored at the user computing device by a browser application. For example, the cookie may include one or more name-value pairs containing bits of information such as, user preferences, an identifier (e.g., the unique ID assigned at 1608) for a server-based user session, and/or other data used by the computing device (e.g., a server and/or website). The cookie may be used for authenticating, session tracking (e.g., state maintenance), and/or for tracking specific information about a user, such as site preferences, and/or to maintain data related to the user and/or user computing device during navigation. The cookie may be sent in an HTTP header by the computing device to the browser application at the user computing device. The cookie may be sent back to the computing unchanged by the browser application, for example, each time the browser application accesses the URL, introducing state into what may be otherwise stateless HTTP transactions. The computing device may set the cookie at the user computing device in response to a request for a target website (e.g., the URL), the computing device may generate and transmit an HTTP response that includes an HTTP header that includes the parameters for the cookie (e.g., in the form of text) and/or code (e.g., Set-Cookie) requesting the browser application to set the cookie based on the parameters in the HTTP header.

When the user opts-out of location tracking, the computing device may store, at 1614, a unique ID (e.g., the unique ID assigned at 1608) in a local cache of the user computing device (e.g., of the browser). The unique ID may be stored in the local browser cache, for example, even if the user computing device does not allow cookies (e.g., full cookies).

Storing the unique ID in the local browser cache may enable the computing device to recognize return visits by the user computing device via the browser application. The unique ID may be used for authenticating, session tracking (e.g., state maintenance), and/or for tracking specific information about a user, such as site preferences, and/or to maintain data related to the user and/or user computing device during navigation. The unique ID may be sent in an HTTP header by the computing device to the browser application at the user computing device. The computing device may store the unique ID in the local browse cache at the user computing device in response to a request for a target website (e.g., the URL). The user computing device may store the unique ID as key/value (e.g., string to string) in the local browser cache. The unique ID may enable persistence across browser sessions. For example, the unique ID may be recognizable in subsequent browser sessions. The unique ID may remain in the local browser cache, for example, until the local browser cache is explicitly cleared. Storing the unique ID in the local browser cache may not be persistent across browser applications. For example, the unique ID stored in the local browser cache of a one browser application may not be accessible from another browser application.

The computing device may determine, at 1616, a latitude coordinate and a longitude coordinate of the user computing device. For example, the data received from the browser session may include the latitude and longitude coordinates of the user computing device, as described herein. The computing device may use the latitude and longitude coordinates to track a user. Use of the latitude and longitude coordinates for tracking may improve device and/or network security, for example, by eliminating the need for cookies to track the user.

The computing device may determine, at 1618, a physical address (e.g., a postal address) for the browser session using the location data. The physical address may indicate a postal address at which the user accessed the URL in the browser session. For example, the computing device may generate, at 1618, the physical address using a map API (e.g., such as Bing Maps API, Mapbox API, OpenStreetMap API, Leaflet API, OpenLayers API, Google Maps API, and/or another map API). For example, the computing device may translate, at 1618, the received latitude and longitude coordinates into the physical address using the map API.

The computing device may determine an address type (e.g., residential, apartment/condo building, single family home, commercial, and/or the like) based on the physical address. For example, the computing device may determine the address type using a postal service API. The computing device may use the address type to determine a type and/or frequency of notifications sent to the user. The computing device may determine other user information based on the physical address such as a name associated with the user, an age of the user, a gender of the user, demographics associated with the user, and/or psychographics associated with the user. The demographics associated with the user may include race, marital status, household size, occupation, income, education, and/or living status. The psychographics associated with the user may include personality traits, lifestyles, interests, opinions, beliefs, values, etc. The computing device may determine the type and/or the frequency of notifications sent to the user based on the other information. The computing device may determine the content of the notifications based on the other information.

At 1620, the computing device may associate the generated unique identifier with the determined location data. For example, the computing device may map, at 1620, the unique identifier to the location data (e.g., physical address). The mapping between the unique identifier and the location data may enable identification of future visits to the URL by the user. The mapping between the unique identifier and the location data may enable an administrative user to identify who is accessing specific URLs, for example, with or without the use of cookies. For example, the unique identifier and location data may enable convergence of an online and offline footprint for a user. When the unique ID is associated, at 1620, to the identified address, the method 1600 may proceed to 1622.

The computing device may generate, at 1622, a profile for the user, for example, based on the association between the unique identifier and the location data. The user profile may be used to track a plurality of factors (e.g., user profile information) associated with the user and the user's activity. For example, the user profile may include user profile information such as URLs the user accesses, the frequency with which the user accesses the URL(s), demographics associated with the user, the address(es) associated with the user, etc. For example, the computing device may associate multiple unique identifiers having the same location data with the same user profile. The user profile may be used to generate a targeted marketing campaign.

The computing device may update, at 1624, the user profile upon subsequent browsing sessions. For example, the computing device may be configured to determine that the user accessed a URL during a first browser session. The computing device may be configured to recognize a second visit to the URL during a second browser session, for example, using the unique identifier stored in the local browser cache. For example, the computing device may update, at 1624, the user profile information based on anonymous data associated with one or more subsequent browser sessions initialized on the user computing device or another user computing device associated with the identified address.

At 1626, the computing device may generate a confidence rating for the user. The confidence rating may be a measure (e.g., probability) of the user's interest in a product (e.g., such as purchase readiness). The computing device may generate the confidence rating using an algorithm. The algorithm may incorporate learning such that the algorithm improves (e.g., automatically) as more data is applied to the algorithm. The algorithm may determine the confidence rating using one or more general attributes and/or one or more automobile-specific attributes. The one or more general attributes may include distance, devices across family/household, unique pages accessed, a recency multiplier, one or more confidential calculations, the physical address type, demographics associated with the user, psychographics associated with the user, the age of the user, the gender of the user, and/or a frequency of URL visits by the user. The one or more automobile-specific attributes may include finance upgrade segment status, lease upgrade segment status, lease term remaining, lease mileage projection, finance term remaining, equity status, mileage of current vehicle, private shopping mode, opened email, and/or automobile wallet utilization. The confidence rating may be associated with one or more discrete decision values (e.g., researching, interested, ready to buy, and/or purchased). Each of the discrete decision values may be associated with respective thresholds of the confidence rating such that each user's confidence rating is associated with one of the discrete decision values for a present confidence rating. The present confidence rating may be displayed on an administrative graphical user interface (GUI) operating on an administrative user device. The GUI may display information for a plurality of users. For each of the plurality of users, the GUI may display the name of the user, a product the user is interested in, the confidence rating, and/or other information associated with the user. The GUI may include a visual indication (e.g., an indicator) of the confidence rating for each of the plurality of users. The GUI may indicate the decision value associated with the present confidence rating.

At 1628, the computing device may generate one or more notifications based on the confidence rating for the user. For example, the computing device may generate the one or more notifications based on a specific product of interest (e.g., the product the user is most interested in). The one or more notifications may include advertisements associated with the product the user is interested in, coupons for the product the user is interested in, queries for questions about the product the user is interested in, and/or the like. The computing device may determine the content of the notifications based on the other information.

At 1630, the computing device may determine to send the one or more notifications to the user. The computing device may determine the type and/or the frequency of notifications sent to the user based on the other information (e.g., a name associated with the user, an age of the user, a gender of the user, demographics associated with the user, and/or psychographics associated with the user). For example, the computing device may use the confidence rating and/or other information associated with a plurality of users as filtering criteria for a targeted marketing campaign. The filtering criteria may be overlaid on top of the confidence rating, for example, to identify which users to target in the marketing campaign. The method 1600 may end, at 1632.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A method comprising:
   receiving, at one or more server computing devices, a first HTTP request to access a uniform resource locator (URL) from a browser executing on a user computing device during a first browser session, wherein the first HTTP request comprises first anonymous data generated by an HTTP script during the first browser session, wherein the first anonymous data comprises location data associated with the user computing device from which the first HTTP request is received;
   receiving, by the one or more server computing devices, information indicating an inability to access a location tracker cookie at a local browser storage at the user computing device;
   receiving, at the one or more server computing devices, an indication of user input regarding location tracking via the user computing device, wherein the user input is configured to enable or disable location tracking via the user computing device;
   based on the indication of the user input regarding location tracking and the information indicating the inability to access the location tracker cookie at the local browser storage at the user computing device, transmitting a unique identifier generated at the one or more server computing devices for tracking the access of the URL during the first browser session with instructions for storing the unique identifier in the local browser storage at the user computing device, wherein the unique identifier is configured to be stored in the local browser storage at the user computing device while the user computing device is configured not to allow use or storage of location tracker cookies;
   determining, at the one or more server computing devices, a physical address of the user computing device during the first browser session by:
      (1) identifying a latitude coordinate and a longitude coordinate from the location data in the first anonymous data;
      (2) sending the latitude coordinate and the longitude coordinate to a map application programming interface (API); and
      (3) receiving the physical address from the map API;
   storing, at the one or more server computing devices, a user profile for a user that includes an association of the unique identifier and the physical address, wherein the user profile is stored in profile information with a plurality of user profiles including physical addresses of a plurality of users;
   receiving, at the one or more server computing devices, a second HTTP request to access the uniform resource locator (URL) from the user computing device, wherein the second HTTP request comprises second anonymous data generated by the HTTP script during a second browser session, wherein the second anonymous data comprises location data associated with the user computing device from which the second HTTP request is received;
   determining a physical address of the user computing device during the second browser session at the one or more server computing devices by:
      (1) identifying a latitude coordinate and a longitude coordinate from the location data in the second anonymous data;
      (2) sending the latitude coordinate and the longitude coordinate to the map API; and
      (3) receiving the physical address from the map API;
   detecting, by the one or more server computing devices, the second HTTP request as a return visit to the URL based on the unique identifier being stored in the local browser storage of the user computing device and the profile information at the one or more server computing devices by:
      (1) receiving, at the one or more server computing devices, data stored in the local browser storage of the user computing device during the second browser session; and
      (2) comparing the received data at the one or more server computing devices to unique identifiers stored in the plurality of user profiles; and
   updating, at the one or more server computing devices, the profile information to indicate the return visit by the user computing device to the URL from the physical address determined during the second browser session.

2. The method of claim 1, wherein the local browser storage comprises a local browser cache.

3. The method of claim 1, wherein the indication of the user input regarding location tracking via the user computing device indicates that the user has opted out of location tracking using cookies.

4. The method of claim 1, wherein one or more of the first anonymous data or the second anonymous data further comprise one or more of a time, a date, a referring URL, a browser type, a language, or an internet protocol (IP) address.

5. The method of claim 1, wherein the physical address comprises a postal address.

6. The method of claim 1, wherein the physical address of the user computing device during the first browser session comprises a first postal address and the physical address of the user computing device during the second browser session comprises a second postal address, and wherein the first postal address is different than the second postal address.

7. The method of claim 1, further comprising:
receiving, at the one or more server computing devices, a third HTTP request to access the uniform resource locator (URL) from the user computing device, wherein the third HTTP request comprises third anonymous data generated by the HTTP script during a third browser session, wherein the third anonymous data comprises location data associated with the user computing device from which the third HTTP request is received; and
determining a physical address of the user computing device during the third browser session at the one or more server computing devices by:
  (1) identifying a latitude coordinate and a longitude coordinate from the location data in the third anonymous data;
  (2) sending the latitude coordinate and the longitude coordinate to the map API; and
  (3) receiving the physical address from the map API.

8. The method of claim 7, wherein the physical address of the user computing device during the third browser session is different than the physical address of the user computing device during the first browser session and the second browser session.

9. The method of claim 1, further comprising:
comparing the physical address of the user computing device during the first browser session with the physical address of the user computing device during the second browser session; and
identifying, based on the comparison, that the user computing device is accessing the URL from a secondary address.

10. The method of claim 1, further comprising parsing the data at the one or more server computing devices, wherein the received data compared at the one or more server computing devices to unique identifiers stored in the plurality of user profiles comprises the parsed data.

11. The method of claim 1, further comprising:
generating the unique identifier at the one or more server computing devices for tracking the access of the URL during the first browser session after the receipt of the information indicating the inability to access the location tracker cookie at the local browser storage at the user computing device.

12. The method of claim 1, further comprising:
prompting the user via the user computing device with a request for enabling location tracking during the first browser session, wherein the request is configured to solicit the user input regarding location tracking via the user computing device.

13. The method of claim 1, wherein the user computing device comprises a first user computing device, the method further comprising:
receiving, at the one or more server computing devices, a third HTTP request to access the uniform resource locator (URL) from a second user computing device, wherein the third HTTP request comprises third anonymous data generated by the HTTP script during a third browser session, wherein the third anonymous data comprises location data associated with the second user computing device from which the third HTTP request is received; and
determining a physical address of the second user computing device during the third browser session at the one or more server computing devices by:
  (1) identifying a latitude coordinate and a longitude coordinate from the location data in the third anonymous data;
  (2) sending the latitude coordinate and the longitude coordinate to the map API; and
  (3) receiving the physical address from the map API, wherein the physical address of the second user computing device during the third browser session is the same as the physical address of the first user computing device during the first browser session and the second browser session; and
determining the third HTTP request to access the URL from the second user computing device comprises a return visit from the physical address determined during the first browser session and the second browser session by:
  (1) comparing the physical address of the second user computing device during the third browser session with the physical addresses of the plurality of users stored in the profile information; and
  (2) identifying the physical address of the second user computing device as being the same as the physical addresses of the first user computing device stored in the physical addresses of the plurality of users during the first browsing session or the second browsing session;
updating, at the one or more server computing devices, the profile information to indicate the return visit by the second user computing device to the URL from the physical address of the first user computing device determined during the first browser session or the second browser session; and
wherein the unique identifier is a first unique identifier, and wherein the user input is a first user input, the method further comprising:
receiving, at the one or more server computing devices, an indication of a second user input regarding location tracking via the second user computing device, wherein the second user input is configured to enable or disable location tracking via the second user computing device; and
based on the indication of the second user input regarding location tracking and the information indicating the inability to access the location tracker cookie at the local browser storage at the second user computing device, transmitting a second unique identifier generated at the one or more server computing devices for tracking the access of the URL during the first browser session with instructions for storing the second unique identifier in the local browser storage at the second user computing device, wherein the second unique identifier is configured to be stored in the local browser storage at the second user computing device while the second user computing device is configured not to allow use or storage of location tracker cookies.

14. At least one non-transitory, machine-readable storage medium that includes instructions that, when executed by at least one processor of at least one computing device, are configured to cause the at least one processor to:
receive a first HTTP request to access a uniform resource locator (URL) from a browser executing on a user computing device during a first browser session, wherein the first HTTP request comprises first anonymous data generated by an HTTP script during the first browser session, wherein the first anonymous data comprises location data associated with the user computing device from which the first HTTP request is received;
receive information indicating an inability to access a location tracker cookie at a local browser storage at the user computing device;
receive user input regarding location tracking via the user computing device;
based on the user input regarding location tracking and the information indicating the inability to access the location tracker cookie at the local browser storage at the user computing device, transmit a unique identifier generated at the at least one processor for tracking the access of the URL during the first browser session with instructions configured to store the unique identifier in the local browser storage at the user computing device, wherein the unique identifier is configured to be stored in the local browser storage at the user computing device while the user computing device is configured not to allow use or storage of location tracker cookies;
determine a physical address of the user computing device during the first browser session by the instructions being configured to cause the at least one processor to:
 (1) identify a latitude coordinate and a longitude coordinate from the location data in the first anonymous data;
 (2) send the latitude coordinate and the longitude coordinate to a map application programming interface (API); and
 (3) receive the physical address from the map API;
store a user profile for a user that includes an association of the unique identifier and the physical address, wherein the user profile is configured to be stored in profile information with a plurality of user profiles including physical addresses of a plurality of users;
receive a second HTTP request to access the uniform resource locator (URL) from the user computing device, wherein the second HTTP request comprises second anonymous data generated by the HTTP script during a second browser session, wherein the second anonymous data comprises location data associated with the user computing device from which the second HTTP request is received;
determine a physical address of the user computing device during the second browser session by the instructions being configured to cause the at least one processor to:
 (1) identify a latitude coordinate and a longitude coordinate from the location data in the second anonymous data;
 (2) send the latitude coordinate and the longitude coordinate to the map API; and
 (3) receive the physical address from the map API;
detect the second HTTP request as a return visit to the URL based on the unique identifier being stored in the local browser storage of the user computing device and the profile information by the instructions being configured to cause the at least one processor to:
 (1) receive data stored in the local browser storage of the user computing device during the second browser session; and
 (2) compare the received data at the computing device to unique identifiers stored in the plurality of user profiles; and
update the profile information to indicate the return visit by the user to the URL from the physical address determined during the second browser session.

15. The at least one non-transitory, machine-readable storage medium of claim 14, wherein the local browser storage comprises a local browser cache, and wherein the physical address comprises a postal address.

16. The at least one non-transitory, machine-readable storage medium of claim 14, wherein the user input regarding location tracking via the user computing device indicates that the user has opted out of location tracking using cookies.

17. The at least one non-transitory, machine-readable storage medium of claim 14, wherein one or more of the first anonymous data or the second anonymous data further comprise one or more of a time, a date, a referring URL, a browser type, a language, or an internet protocol (IP) address.

18. The at least one non-transitory, machine-readable storage medium of claim 14, wherein the physical address of the user computing device during the first browser session comprises a first postal address and the physical address of the user computing device during the second browser session comprises a second postal address, and wherein the first postal address is different than the second postal address.

19. The at least one non-transitory, machine-readable storage medium of claim 14, wherein the instructions, when executed by the at least one processor, are configured to cause the at least one processor to:
receive a third HTTP request to access the uniform resource locator (URL) from the user computing device, wherein the third HTTP request comprises third anonymous data generated by the HTTP script during a third browser session, wherein the third anonymous data comprises location data associated with the user computing device from which the third HTTP request is received; and
determine a physical address of the user computing device during the third browser session by the instructions being configured to cause the at least one processor to:
 (1) identify a latitude coordinate and a longitude coordinate from the location data in the third anonymous data;
 (2) send the latitude coordinate and the longitude coordinate to the map API; and
 (3) receive the physical address from the map API,
wherein the physical address of the user computing device during the third browser session is different than the physical address of the user computing device during the first browser session and the second browser session.

20. The at least one non-transitory, machine-readable storage medium of claim 14, wherein the instructions, when executed by the at least one processor, are configured to cause the at least one processor to:
compare the physical address of the user computing device during the first browser session with the physical address of the user computing device during the second browser session; and identify, based on the comparison, that the user computing device is accessing the URL from a secondary address.

21. The at least one non-transitory, machine-readable storage medium of claim 14, wherein the instructions, when executed by the at least one processor, are configured to cause the at least one processor to parse the data, wherein the received data compared at the user computing device to unique identifiers stored in the plurality of user profiles comprises the parsed data.

22. The at least one non-transitory, machine-readable storage medium of claim 14, wherein the instructions, when executed by the at least one processor, are configured to cause the at least one processor to generate the unique identifier for tracking the access of the URL during the first browser session after the receipt of the information indicating the inability to access the location tracker cookie at the local browser storage at the user computing device.

23. The at least one non-transitory, machine-readable storage medium of claim 14, wherein the instructions, when executed by the at least one processor, are configured to cause the at least one processor to prompt the user via the user computing device with a request for enabling location tracking during the first browser session, wherein the request is configured to solicit the user input regarding location tracking via the user computing device.

24. The at least one non-transitory, machine-readable storage medium of claim 14, wherein the user computing device comprises a first user computing device, and wherein the instructions, when executed by the at least one processor, are configured to cause the at least one processor to:
  receive a third HTTP request to access the uniform resource locator (URL) from a second user computing device, wherein the third HTTP request comprises third anonymous data generated by the HTTP script during a third browser session, wherein the third anonymous data comprises location data associated with the second user computing device from which the third HTTP request is received; and
  determine a physical address of the second user computing device during the third browser session by the instructions being configured to cause the at least one processor to:
    (1) identify a latitude coordinate and a longitude coordinate from the location data in the third anonymous data;
    (2) send the latitude coordinate and the longitude coordinate to the map API; and
    (3) receive the physical address from the map API, wherein the physical address of the second user computing device during the third browser session is the same as the physical address of the first user computing device during the first browser session and the second browser session; and
  determine the third HTTP request to access the URL from the second user computing device comprises a return visit from the physical address determined during the first browser session and the second browser session by the instructions being configured to cause the at least one processor to:
    (1) compare the physical address of the second user computing device during the third browser session with the physical addresses of the plurality of users stored in the profile information; and
    (2) identify the physical address of the second user computing device as being the same as the physical addresses of the first user computing device stored in the physical addresses of the plurality of users during the first browsing session or the second browsing session;
  update the profile information to indicate the return visit by the second user computing device to the URL from the physical address of the first user computing device determined during the first browser session or the second browser session;
  wherein the unique identifier is a first unique identifier, wherein the user input is a first user input, and wherein the instructions, when executed by the at least one processor, are further configured to cause the at least one processor to:
  receive an indication of a second user input regarding location tracking via the second user computing device, wherein the second user input is configured to enable or disable location tracking via the second user computing device; and
  based on the indication of the second user input regarding location tracking and the information indicating the inability to access the location tracker cookie at the local browser storage at the second user computing device, transmit a second unique identifier for tracking the access of the URL during the first browser session with instructions for storing the second unique identifier in the local browser storage at the second user computing device, wherein the second unique identifier is configured to be stored in the local browser storage at the second user computing device while the second user computing device is configured not to allow use or storage of location tracker cookies.

25. A computing system comprising:
at least one computer readable storage medium having machine-readable instructions stored thereon; and
at least one processor that, when executing the machine-readable instructions, is configured to:
  receive a first HTTP request to access a uniform resource locator (URL) from a browser executing on a user computing device during a first browser session, wherein the first HTTP request comprises first anonymous data generated by an HTTP script during the first browser session, wherein the first anonymous data comprises location data associated with the user computing device from which the first HTTP request is received;
  receive information indicating an inability to access a location tracker cookie at a local browser storage at the user computing device;
  receive user input regarding location tracking via the user computing device;
  based on the user input regarding location tracking and the information indicating the inability to access the location tracker cookie at the local browser storage at the user computing device, transmit a unique identifier for tracking the access of the URL during the first browser session with instructions for storing the unique identifier in the local browser storage at the user computing device, wherein the unique identifier is configured to be stored in the local browser storage at the user computing device while the user computing device is configured not to allow use or storage of location tracker cookies;
  determine a physical address of the user computing device during the first browser session by being configured to:

(1) identify a latitude coordinate and a longitude coordinate from the location data in the first anonymous data;
(2) send the latitude coordinate and the longitude coordinate to a map application programming interface (API); and
(3) receive the physical address from the map API;
store a user profile for a user that includes an association of the unique identifier and the physical address, wherein the user profile is stored in profile information with a plurality of user profiles including physical addresses of a plurality of users;
receive a second HTTP request to access the uniform resource locator (URL) from the user computing device, wherein the second HTTP request comprises second anonymous data generated by the HTTP script during a second browser session, wherein the second anonymous data comprises location data associated with the user computing device from which the second HTTP request is received;
determine a physical address of the user computing device during the second browser session by being configured to:
(1) identify a latitude coordinate and a longitude coordinate from the location data in the second anonymous data;
(2) send the latitude coordinate and the longitude coordinate to the map API; and
(3) receive the physical address from the map API;
detect the second HTTP request as a return visit to the URL based on the unique identifier as being stored in the local browser storage of the user computing device and the profile information by being configured to:
(1) receive data stored in the local browser storage of the user computing device during the second browser session; and
(2) compare the received data to unique identifiers stored in the plurality of user profiles; and
update the profile information to indicate the return visit by the user to the URL from the physical address determined during the second browser session.

26. The computing system of claim 25, wherein the local browser storage comprises a local browser cache, and wherein the user input regarding location tracking via the user computing device indicates that the user has opted out of location tracking using cookies, and wherein one or more of the first anonymous data or the second anonymous data further comprise one or more of a time, a date, one or more URLs, a referring URL, a browser type, a language, or an internet protocol (IP) address, and wherein the physical address comprises a postal address.

27. The computing system of claim 25, wherein the physical address of the user computing device during the first browser session comprises a first postal address and the physical address of the user computing device during the second browser session comprises a second postal address, and wherein the first postal address is different than the second postal address.

28. The computing system of claim 25, wherein the at least one processor, when executing the machine-readable instructions, is further configured to:
receive a third HTTP request to access the uniform resource locator (URL) from the user computing device, wherein the third HTTP request comprises third anonymous data generated by the HTTP script during a third browser session, wherein the third anonymous data comprises location data associated with the user computing device from which the third HTTP request is received; and
determine a physical address of the user computing device during the third browser session by being configured to:
(1) identify a latitude coordinate and a longitude coordinate from the location data in the third anonymous data;
(2) send the latitude coordinate and the longitude coordinate to the map API; and
(3) receive the physical address from the map API; and
wherein the physical address of the user computing device during the third browser session is different than the physical address of the user computing device during the first browser session and the second browser session.

29. The computing system of claim 25, wherein the at least one processor, when executing the machine-readable instructions, is further configured to:
compare the physical address of the user computing device during the first browser session with the physical address of the user computing device during the second browser session; and
identify, based on the comparison, that the user computing device is accessing the URL from a secondary address.

30. The computing system of claim 25, wherein the user computing device comprises a first user computing device, and wherein the at least one processor, when executing the machine-readable instructions, is further configured to:
receive a third HTTP request to access the uniform resource locator (URL) from a second user computing device, wherein the third HTTP request comprises third anonymous data generated by the HTTP script during a third browser session, wherein the third anonymous data comprises location data associated with the second user computing device from which the third HTTP request is received; and
determine a physical address of the second user computing device during the third browser session by being configured to:
(1) identify a latitude coordinate and a longitude coordinate from the location data in the third anonymous data;
(2) send the latitude coordinate and the longitude coordinate to the map API; and
(3) receive the physical address from the map API, wherein the physical address of the second user computing device during the third browser session is the same as the physical address of the first user computing device during the first browser session and the second browser session;
determine the third HTTP request to access the URL from the second user computing device comprises a return visit from the physical address determined during the first browser session and the second browser session by being configured to:
(1) compare the physical address of the second user computing device during the third browser session with the physical addresses of the plurality of users stored in the profile information; and
(2) identify the physical address of the second user computing device as being the same as the physical addresses of the first user computing device stored in the physical addresses of the plurality of users during the first browsing session or the second browsing session;

update the profile information to indicate the return visit by the second user computing device to the URL from the physical address of the first user computing device determined during the first browser session or the second browser session;

wherein the unique identifier is a first unique identifier, wherein the user input is a first user input, and wherein the at least one processor, when executing the machine-readable instructions, is further configured to:

receive an indication of a second user input regarding location tracking via the second user computing device, wherein the second user input is configured to enable or disable location tracking via the second user computing device; and based on the indication of the second user input regarding location tracking and the information indicating the inability to access the location tracker cookie at the local browser storage at the second user computing device, transmit a second unique identifier generated for tracking the access of the URL during the first browser session with instructions for storing the second unique identifier in the local browser storage at the second user computing device, wherein the second unique identifier is configured to be stored in the local browser storage at the second user computing device while the second user computing device is configured not to allow use or storage of location tracker cookies.

* * * * *